United States Patent
Griffis

(10) Patent No.: US 6,392,318 B1
(45) Date of Patent: May 21, 2002

(54) PROGRAMMABLE EMERGENCY-STOP CIRCUIT

(75) Inventor: Michael Griffis, Gainesville, FL (US)

(73) Assignee: Eigenpoint Company, High Springs, FL (US)

( * ) Notice: Subject to any disclaimer, the term of this patent is extended or adjusted under 35 U.S.C. 154(b) by 0 days.

(21) Appl. No.: 09/428,981

(22) Filed: Oct. 28, 1999

Related U.S. Application Data

(60) Provisional application No. 60/141,853, filed on Jul. 1, 1999, and provisional application No. 60/106,051, filed on Oct. 28, 1998.

(51) Int. Cl.[7] .................................................. H01H 9/00
(52) U.S. Cl. ...................... 307/125; 307/130; 307/326; 361/191
(58) Field of Search ................................. 307/125, 130, 307/131, 326–328; 361/191–193; 192/129 R, 131 R, 131 H, 132–135, 129 A

(56) References Cited

U.S. PATENT DOCUMENTS

| | | |
|---|---|---|
| 4,263,647 A | 4/1981 | Merrell et al. |
| 4,349,747 A | 9/1982 | Hasegawa |
| 4,481,449 A | 11/1984 | Rodal |
| 4,839,533 A * | 6/1989 | Aga ........................ 192/129 A |
| 4,912,384 A | 3/1990 | Kinoshita et al. |
| 5,278,454 A | 1/1994 | Strauss et al. |
| 5,319,250 A * | 6/1994 | Windsor ................. 192/129 A |
| 5,319,306 A | 6/1994 | Schuyler |
| 5,394,017 A | 2/1995 | Catano et al. |
| 5,436,788 A | 7/1995 | Wallaert |
| 5,629,864 A | 5/1997 | Noe et al. |
| 5,687,052 A | 11/1997 | Bennett |
| 5,696,679 A | 12/1997 | Marshall et al. |

* cited by examiner

*Primary Examiner*—Fritz Fleming
(74) *Attorney, Agent, or Firm*—Saliwanchik, Lloyd & Saliwanchik

(57) ABSTRACT

The invention comprises a programmable emergency-stop circuit apparatus and method that provides advanced functions not found in other systems. The circuit centralizes the control of high voltage motor power into one place, by providing connections for, in its minimum configuration, several different kill switches, a motors-on button, and an AC motor power relay coil. In the present invention, kill switches, emergency-stop and motors-on buttons, computer ready and watchdog signals are all conveniently connected in one location, alongside the AC motor power relay coil driver.

37 Claims, 16 Drawing Sheets

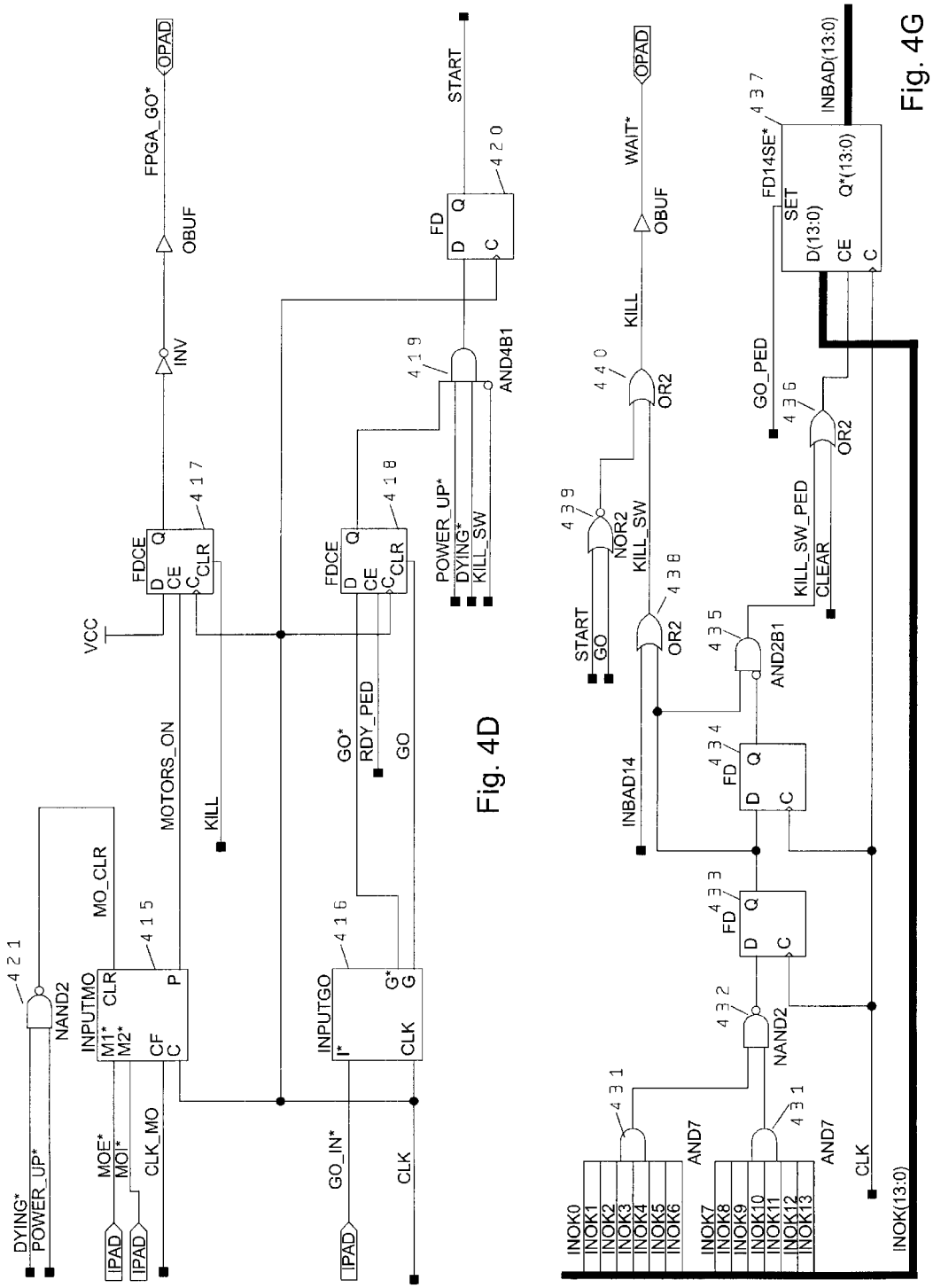

PROGRAMMABLE EMERGENCY-STOP CIRCUIT

CROSS-REFERENCE TO RELATED APPLICATIONS

This application claims priority from provisional application U.S. Serial No. 60/141,853, filed Jul. 1, 1999 and provisional application U.S. Serial No. 60/106,051, filed Oct. 28, 1998, incorporated herein by reference.

FIELD OF INVENTION

The present invention relates to an emergency-stop circuit, which is an integral part of the typical industrial machine. More particularly, this invention relates to a centralized switching system and method for an emergency stop circuit.

BACKGROUND INFORMATION

In industrial equipment, the traditional emergency-stop circuit consists of a "self-latching" relay that contains a number of closed (kill) switches which are connected in series, and when any one of the switches is opened, the relay is de-energized. Power is restored when all kill switches are closed, and a "motors-on" momentary switch (e.g., push-button switch) manually closes the contacts of the relay. The relay contacts are the last link in the serial chain of switches that energizes the coil of the relay. It is self-latching in the sense that when the motors-on switch is released, the contacts are in the coil energizing circuit that keep them closed in the first place. The coil energizing circuit is referred to herein as the emergency-stop circuit.

A robust, traditional circuit may have many kill switches in the emergency-stop circuit. These switches are typically distributed all over the machine. For example, lever-type switches are installed on door panels, so that power is killed (i.e., shut off) when one of the doors opens. This is referred to as the normally open configuration (NO), which means that the switch must be tripped to conduct. This kind of kill switch is the first to be defeated in practice. It is often taped or strapped closed so that a door may remain open during operation of the machine. (A common purpose for the defeat is debugging by a maintenance technician.) When there are several doors defeated in this manner located throughout a large machine, the probability is higher than desirable for a maintenance technician to inadvertently leave a switch defeated and return the machine to what will be unsafe use. Also, the cycle of taping/strapping and removal thereof causes wear and tear on the lever-type switch for which it was not designed.

Other types of kill switches used in the industry include over-travel switches. These switches normally operate in the closed configuration (NC), which means that tripping of the switch opens the circuit. These switches include lever-type, magnetic, infrared, or the like. To defeat over-travel switches, the switches are temporarily removed, terminals jumpered, mounting screws loosened, and brackets are slid out of the way. This also creates opportunity for mistakenly leaving kill switches defeated (or misaligned) throughout the machine when it is returned to service.

Another example of a kill switch is an air pressure switch sensing an air line that delivers required air to an air bearing spindle. In a demonstrating test, or debug mode, the machine may be run without the spindle running (no air supplied or air temporarily unavailable). This requires the jumpering of the kill switch during such time. Afterwards, forgetting to re-enable the switch allows running of the spindle without air, which leads to hardware damage.

Evidently, safe use of the traditional emergency-stop circuit requires experience and diligence on the part of the maintenance technician who attempts to temporarily bypass sections of the circuit in order to test or debug the system. Oversight due to distribution of the switches over numerous parts of the machine/device can cause him to forget to re-enable a kill switch before returning equipment back to duty.

Additionally, in order to test and debug, the technician must also disable certain devices whose power is controlled by the emergency-stop circuit. There is no straightforward, universal way to do this other than disconnecting the power to the device. This may be easy in some cases or not possible, very cumbersome, or unsafe in others.

A final consideration for these testing and debugging methods is the time required for a technician to trace through a machine in order to determine where to disable a kill switch or where to disconnect power to a device. Additionally, managerial time may be spent generating documentation in order to aid the technician's task. This becomes apparent when one considers a factory floor that possesses a vast array of one-of-a-kind machines, all of which utilize some variant of the traditional emergency-stop circuit. Here, hypothetically, each circuit possesses essentially the same topology but utilizes different components that are located in different places and connected by a slightly different wiring scheme.

In spite of this, implementation of traditional emergency-stop circuits that are intrinsically "safe" is certainly feasible and has been done for many years. There are reasons for the apparent success. It is a simple circuit, even though it is distributed throughout the machine. It well established. There are few components. But these are also the reasons why the circuit has not matured.

Typically, experienced engineers are reluctant to add new parts and kill switches to the circuit in an effort to "keep it simple." In developing prototypes or one-of-a-kind machines, important kill switches such as a watchdog circuit and a computer ready are often omitted. Also, some kill switches having solid state outputs (e.g. NPN) do not fit into the serially connected topology. Each requires an extra part, such as an intermediate electro-mechanical relay, whose contacts are in the kill switch chain, and whose coil is controlled by the solid state output. Because of this, sensors employing solid state outputs are avoided, and their less reliable mechanical counterparts are used instead.

Essentially, there is a mindset among skilled engineers concerning the altering of the traditional circuit's topology. Typically, the skilled engineer begins a new project assuming that he will use the traditional circuit. Valuable time is spent on other areas and is not devoted to re-engineering the architecture for the traditional circuit or evaluating its expanded role in the project. In fact, it is not obvious to the skilled engineer to change the traditional circuit in any way in order to add functionality that can be safely incorporated within it. Such functionality, if implemented, is therefore left to be distributed throughout the remainder of the system, intermingled with unsafe subsystems such as the computer.

When implemented, for example, secondary outputs, such as amplifier "enable" or "inhibit" signals, are not usually incorporated into an emergency-stop circuit. If driven at all, a software program running on a computer having optically isolated digital outputs usually drives them. Furthermore, other feedback signals, such as "status" or "fault" signals, are not used in emergency-stop circuits as kill inputs. This is generally because each signal is in a non-conducting state when the circuit is killed, which prevents the traditional circuit from restarting. If used at all, these feedback signals are likewise connected to the computer for the purposes of monitoring.

Designing in this way fosters subtle system-wide shortcomings, which can permit potentially unsafe or undesirable operation. Resulting failures or odd performance is not attributed to the emergency-stop circuit, since its simple circuitry and lack of substantial functionality are not directly responsible. Consequently, effort is typically not expended to evaluate its functionality.

One of the shortcomings becomes apparent when the traditional system enters into a power-loss period, which generally begins when the emergency-stop circuit is killed and ends when all residual power has been dissipated. During this brief period (e.g., 2 sec.), uncontrolled motion of motors can occur for some designs, because the motors are not being controlled, yet they are still technically powered by residual power in the system. In order to suppress this, designers have used the computer-controlled secondary outputs (enable, inhibit) in conjunction with the emergency-stop circuit to simultaneously cut power and disable the connected devices. This works in most cases, but is tedious to design, not flexible, and application specific. One case when this design fails is when the building power fails, which causes the computer to also cease functioning. Here the inhibit signal may not get to the device, which again creates an environment for briefly uncontrolled motion.

Most of the examples found in existing technology are concerned with passive monitoring of the emergency-stop circuit. This approach is useful in determining which kill input was responsible for stopping the circuit, but it does not provide any configuration options for startup or power-loss periods. The following patents, each of which is incorporated herein by reference, demonstrate this approach: U.S. Pat. No. 4,263,647 to Merrell, et al, entitled "Fault Monitor for Numerical Control System"; U.S. Pat. No. 5,451,879 to Moore, entitled "Electromechanical Relay Monitoring System with Status Clocking"; U.S. Pat. No. 4,616,216 to Meirow, et al., entitled "Emergency Stop Monitor"; and U.S. Pat. No. 5,263,570 to Stonemark, entitled "Conveyor Belt Emergency Stop Indicator Light System." Configuration options do exist in the above noted patents but only in the form of providing cascaded inputs and outputs so that multiple groups of sensors may be monitored. Other patents of interest include the following: U.S. Pat. No. 4,912,384 to Kinoshita, et al., entitled "Emergency Stop Control Circuit" discloses the traditional active portion of the emergency-stop circuit; U.S. Pat. No. 5,319,306 to Schuyler entitled "Portable Electrical Line Tester Using Audible Tones to Indicate Voltage" discloses circuits that provide audio status in the form of line testers, where the leads are brought into contact after the line is energized to check it.

Traditional approaches to supplying power to motors during a power-loss period (period beginning with the loss of AC motor power and ending with either the total loss of all stored DC motor power or the loss of regulation of any associated logic power supply, whichever comes first) have focused on coarse (non-servo) control or decelerating motors to full stop. However, no approach exists that relates to fields employing emergency-stop circuitry.

Other patents in this general field are also noted. For example, U.S. Pat. No. 5,278,454 to Strauss, et al. discloses an invention related to the heating, ventilation, and air conditioning field. It describes a motion control system that senses a loss of incoming power and utilizes a dedicated pre-charged circuit to act as a short duration power supply to effect gross motion of a motor to close a damper. U.S. Pat. No. 5,426,355 to Zweighaft, et al., entitled "Power-Off Motor Deceleration Control System" discloses an invention related to the tape drive industry in which a motion control system whose amplifier stores a dedicated internal PWM signal responsible for supplying open-loop deceleration commands for a given configuration of the tape drive system that is experiencing a power-loss period. U.S. Pat. No. 4,481,449 to Roda entitled "Power Fail Servo System" discloses an invention that also relates to the tape drive field which describes the use of several "power fail" signals that work in harmony to decelerate the motor towards full stop and uses the technique of dynamic braking to harness excess power in the storage capacitor. A signal exists in this example which monitors the logic power supply and appropriately disables (free wheels) the motor once the supply is out of regulation.

BRIEF SUMMARY OF THE INVENTION

The present invention solves the problems in the art by providing a centralized programmable emergency-stop circuit that controls the flow of the power necessary for a machine to move its working elements. The invention possesses various levels of programmability that facilitate use of the same circuit across a wide variety of industrial applications and designs, as well as across a wide variety of operational scenarios for the same machine.

The circuit of the present invention includes various types of custom programmable kill inputs. These inputs are signals that, subject to their programming, can kill an energized emergency-stop circuit or prevent a killed circuit from energizing (startup). A given kill input can also be programmed to be ignored totally, to kill when inactive, or to also prevent startup when inactive. A given kill input can be programmed so that it only affects the energized circuit and does not restrict startup, and consequently, it may be inactive at startup. Such a programmed kill input is referred to herein as a "falling-type," because once it does go active, it is the active-to-inactive or falling transition that kills the circuit. Additional programming for the kill inputs exists such as digital filter parameters, clock selection, and the like, as well as time-out options for the falling-type kill inputs, which require them to go active within some period after startup.

The present invention also provides programming options to specify conditions for a motors-on signal to energize the circuit and for the control of secondary outputs. While the primary output of the circuit controls the flow of bulk power to working elements, it is the secondary outputs that connect in parallel to the working elements in order to inhibit or enable them. The method of programming secondary outputs determines their behavior, i.e., whether they are disabled entirely for the session, enabled only when the circuit is energized, or enabled based on one of the kill input signals. This latter setting permits a computer to keep a device enabled during a power-loss period, so that a reactionary movement can be effected which drains residual power left in the dying system.

In order to improve an emergency-stop circuit that controls the flow of bulk power needed for a machine to move its elements, it is the object of this invention to provide additional features and programmability that improves performance during the period immediately following the application of electrical power needed to power circuit logic.

Specifically, it is the object of the invention to inhibit energizing the circuit for a prescribed interval of time. Additionally, it is the object of the invention to provide programmability so that the interval may be changed.

In order to further improve performance during the period immediately following the application of electrical power needed to power circuit logic, it is the object of the invention to provide additional features and programmability. Specifically, it is the object of the invention to provide circuitry that determines whether the circuit has been energized at least once. Furthermore, it is the object of the invention to provide further additional circuitry that drives a dedicated power-up/reset error code which indicates electrical power has just been applied to the circuit logic. The power-up/reset error code therefore supersedes the conventional error code that is generated from all possible kill input sources. Additionally, it is the object of the invention to provide a clear signal capable of clearing the power-up/reset error code (so that the conventional error code may be revealed) and also capable of refreshing conventional error codes thereafter. It is also the object of the invention to provide programmability so that a set of clear input sources may be pre-selected from all available input sources.

Finally, in order to further improve performance during the period immediately following the application of electrical power needed to power circuit logic, it is the object of the invention to provide additional features and programmability. Specifically, it is the object of the invention to employ a start signal that when inactive inhibits the initial energizing of the circuit. Activation of the start signal occurs in response to the final cycle of a specified number of deactivation and reactivation cycles of a ready-type input signal, and deactivation of the start signal occurs when the circuit is energized. Additionally, it is the object of the invention to provide programmability so that (1) the ability of the start signal to inhibit energizing is optional, (2) the specified number of cycles can be adjusted, and (3) a set of ready-type input signals may be pre-selected from all available input sources.

It is also the object of the invention to further employ the same start signal in subsequent energizing cycles in order to further improve performance. Specifically, a second specified number of deactivation and reactivation cycles is required in order to activate the start signal. Additionally, it is the object of the invention to provide programmability so that the second specified number of cycles can be adjusted.

In order to improve an emergency-stop circuit that controls the flow of bulk power needed for a machine to move its elements, it is the object of this invention to provide additional features and programmability that improves how the circuit is commanded to energize. Specifically, it is the object of the invention to provide for additional nominal requirements for the activation of a motors-on signal, such as (1) requiring it to be previously inactive and (2) requiring it to be active for a prescribed interval or longer. Additionally, it is the object of the invention to provide programmability so that (1) the interval may be changed, (2) the requirement to be previously inactive is optional, and (3) a set of motors-on-type input sources may be pre-selected from all available input sources. Finally, it is the object of the invention to provide programmability so that (1) a set of monitor contact-type input sources may be pre-selected from all available input sources, where each monitor contact signal is active when the circuit is killed and the associated, downstream monitored relay has fully disengaged and (2) the requirement for a given monitor contact signal to be active for the motors-on signal to be active is optional.

In order to further improve the manner in which the circuit is energized, it is the object of the invention to employ a second start signal that when inactive inhibits the energizing of the circuit. Activation of the start signal occurs when all kill input sources are active, where programmability provides for a set of kill sources to be selected from all available input sources. Deactivation of the start signal occurs when the circuit is energized or when one or more of the kill input sources become inactive. Additionally, it is the object of the invention to provide status for the start signal. Furthermore, it is the object of the invention to accommodate watchdog-type kill input sources that toggle on-and-off repeatedly at a rate faster than a prescribed value, where the toggling is the requirement for the watchdog-type kill input to be active. It is also the object of the invention to provide programmability for this so that (1) the requirement for toggling is optional and (2) the minimum rate is programmable. Finally, it is the object of the invention to include in the generation of the start signal an additional, dedicated kill input source that indicates whether an internal circuit error exists.

In order to further improve an emergency-stop circuit that controls the flow of bulk power needed for a machine to move its elements, it is the object of this invention to provide additional features and programmability that improves performance during the period immediately following energizing (right after it is started). Specifically, it is the object of the invention to provide audio status for a prescribed interval. Additionally, it is the object of the invention to provide programmability so that the interval may be changed.

In order to improve an emergency-stop circuit that controls the flow of bulk power needed for a machine to move its elements, it is the object of this invention to provide additional features and programmability that improves the manner in which the circuit is de-energized (killed) or prevented from energizing. Specifically, it is the object of the invention to employ a kill signal that when active de-energizes the circuit or prevents it from energizing. Activation of the kill signal occurs when one or more kill sources become inactive, where programmability provides for a second set of kill sources to be selected from all available input sources. Deactivation of the kill signal occurs when all kill sources from the second set become active. Additionally, it is the object of the invention to include in the generation of the kill signal an additional, dedicated kill input source that indicates whether an internal circuit error exists.

In order to further improve performance for the manner in which the circuit is de-energized (killed) or prevented from energizing, it is the object of the invention to provide additional programmability so that pre-selected additional input sources can be dynamically added to the second set of kill sources at some point of time after the circuit becomes energized and subsequently removed at such time that the circuit is de-energized. A given, dynamically added input source may be programmed to be added immediately after the input source becomes active. Additionally, or alternatively, it can be added after a prescribed interval of time following the energizing of the circuit. It is also the object to provide programmability so that this prescribed interval can be adjusted.

In order to further improve performance for the manner in which the circuit is de-energized (killed) or prevented from energizing, it is the object of the invention to provided additional programmability so that one of the dynamically added input sources is dedicated to sensing the presence of the bulk power controlled by the circuit. Additionally, it is the object that this input source is an alternating-current type that generates a strobing signal indicative of the active state of the bulk power, where the strobing occurring at a rate faster than a prescribed value is the requirement that the kill input source is active. Finally, it is the object that the minimum rate is programmable.

In order to further improve an emergency-stop circuit that controls the flow of bulk power needed for a machine to move its elements, it is the object of this invention to provide additional features and programmability that improves performance during the period immediately following de-energizing (right after it is killed). Specifically, it is the object of the invention to inhibit the re-energizing of the circuit for a prescribed interval of time after it is killed. Additionally, it is the object of the invention to provide programmability so that the interval for the dying period may be changed. Also, it is the object to provide audio or visual status during the dying period.

In order to further improve an emergency-stop circuit whose primary output controls the flow of bulk power needed for a machine to move its elements and whose secondary output controls the enable or inhibit of an element, it is the object of this invention to provide additional features and programmability for the circuit so that the source of the secondary output may be selected from a set of available sources. Specifically, it can be selected from the following sources: (1) none so that the element is always disabled, (2) from a signal that is active when the circuit is energized so that the element is enabled only when the circuit is energized, or (3) a dedicated enable-type input source, so that the element is enabled whenever the enable-type input source is active. It is also the object of the invention to provide additional programmability for the third case, which places a programmable pair of restrictions on when the enable-type input source has an effect so that it is used when (1) the circuit is energized or in the dying period that immediately follows de-energizing and otherwise, the element is disabled and (2) a watchdog-type input source is active and otherwise, the element is disabled. The requirement for the watchdog-type input source to be active is that it must toggle on-and-off repeatedly at a rate faster than a prescribed value. Finally, it is the object of the invention to provide additional programmability so that (1) the minimum rate for the watchdog-type input is programmable, (2) the enable-type input source may be pre-selected from all available input sources, and (3) the watchdog-type input source may be pre-selected from all available input sources.

Accordingly, it is the object of the present invention to provide a programmable emergency-stop circuit that allows various options for the manner in which kill inputs affect the system and further provides options for the manner in which outputs are activated and deactivated. Furthermore, it is an object of the invention to provide programmability to specify the manner and timing for dynamically adding a given input source to the active set of kill inputs. Finally, it is an object of the invention to emp e circuitry that generally avoids software or a microprocessor, so that new functionality coupled with programmability may be safely incorporated within the emergency-stop circuit.

One important feature of the invention is its state machine, which provides a framework from which the invention operates. Defined by a set of internal signals that includes start and kill-type signals, the state machine specifies when the circuit may be energized, when it is killed, and when startup is inhibited. The internal signals are generated as a programmable function of time and input source states. Other features include audio status for startup and kill, requirements for startup that ensures desired energizing, requirements for a computer ready signal that ensures synchronization with software running on a computer, provisions for a dedicated error-code that identifies power glitches, and the safe oversight of a power-loss period during which a servo-controlled reflex action may be implemented.

The primary advantage for using the invention is that a centralized single circuit can be programmed and employed in a wide variety of machine designs. For a given machine design, for example, the circuit can be reprogrammed and thereby adapted to a different set of operational scenarios. When designing a machine or a plurality of machine/devices, the designer is able to associate any given input source with a desired kill input type that specifies how the input source affects the system. Furthermore, once operational in the field, for example, the machine will require maintenance, and to assist this, the circuit can be definitively reprogrammed from a central location so that certain inputs are temporarily but safely ignored and certain outputs are forced disabled during the maintenance operation.

Other advantages of the invention are related to timing, filtering, and synchronization. One such advantage is the accuracy, and hence repeatability, that can be applied to timing the motors-on button's active period as well as to the timing of the start-up delay that prevents the immediate re-start during the DYING state of a freshly killed circuit. The use of timing and other related digital filters significantly reduces the susceptibility of the circuit to background noise. It is also an advantage from a system performance standpoint that the emergency-stop circuit causes the computer program and, thereby, the entire system to be in synchronization via several novel methods.

The invention will now be described, by way of example and not by way of limitation, with reference to the accompanying sheets of drawings and other objects, features and advantages of the invention will be apparent from this detailed disclosure and from the appended claims. All patents, patent applications, provisional applications, and publications referred to or cited herein, or from which a claim for benefit of priority has been made, are incorporated by reference in their entirety to the extent they are not inconsistent with the explicit teachings of this specification.

DETAILED DISCLOSURE OF THE INVENTION

Figure 1A:
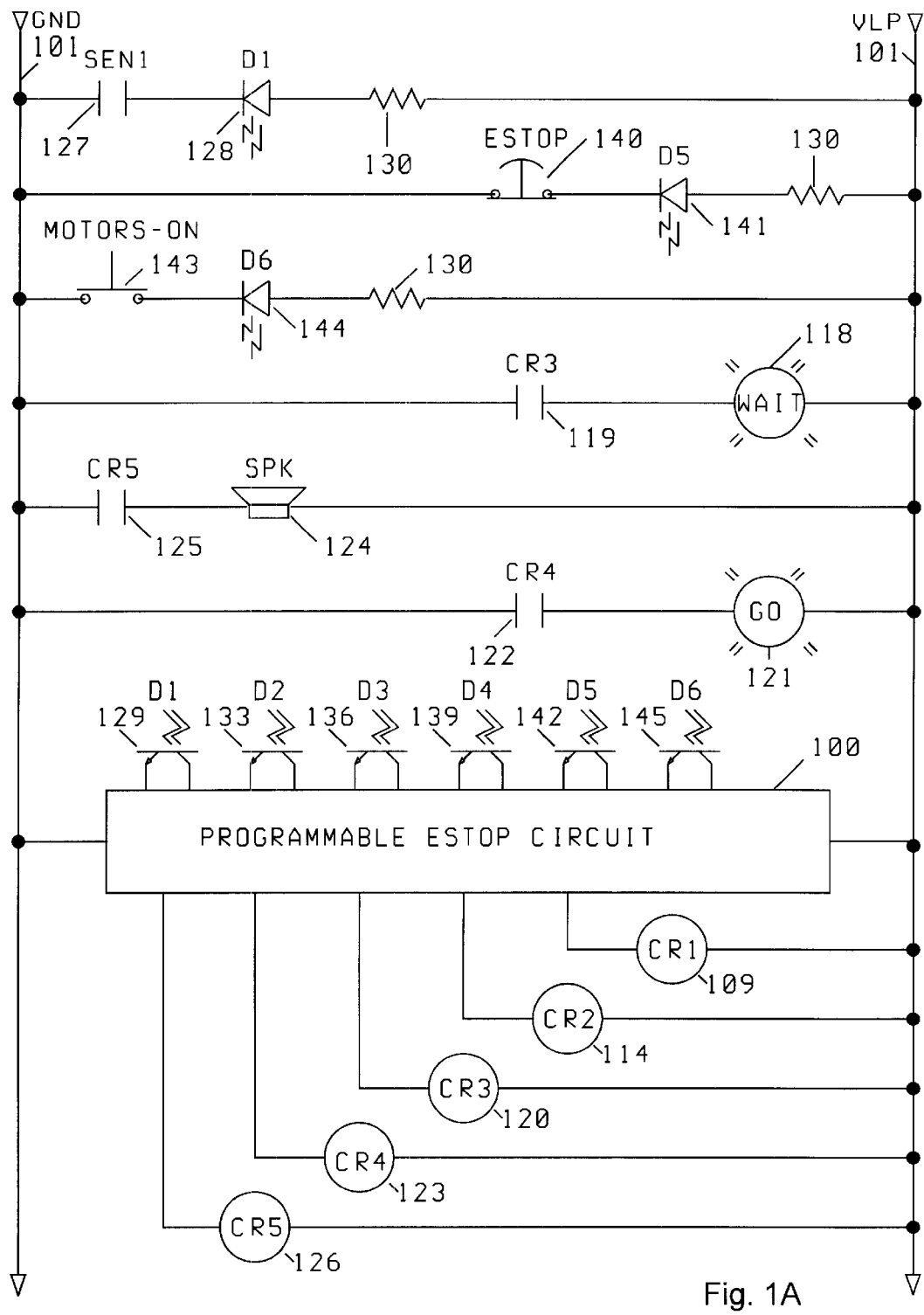
FIGS. 1A–1B illustrates a preferred embodiment of the emergency-stop circuit of the present invention used to control a device having a motion controller.

Referring now to the figures in which like numerals represent like elements throughout several views, the present invention comprises a programmable emergency-stop circuit 100 that is programmable on multiple levels and provides advanced functions not found in other systems. The circuit centralizes the control of high voltage motor power into one place, by providing connections for, in its minimum configuration, several different kill switches, a motors-on button, and an AC motor power relay coil. In contrast with the traditional emergency-stop circuit, which has a serially connected architecture, distributed throughout the machine, the present circuit adopts a more centralized topology. Kill switches, emergency-stop and motors-on buttons, computer ready and watchdog signals are all conveniently connected in one location, alongside the AC motor power relay coil driver.

As described in more detail hereinafter, the invention enhances the traditional emergency-stop circuit by (1) providing programmability so that a single centralized emergency-stop circuit accommodates different kinds of kill switches as well as different kinds of controlled devices in flexible combinations and (2) providing functionality that has either not been achieved prior or achieved in unsafe ways. The programmability facilitates easier, faster design and redesign and safer maintenance operation. The extra functionality is concerned with (1) conducting states of the kill inputs and the secondary outputs with respect to the energizing of the emergency-stop circuit and (2) issues regarding the power-up of the circuit logic.

There are two recognized types of emergency-stop circuits: stop category 0 and stop category 1. Stop category 0 covers a design where immediate stop is achieved by switching off the primary energy source (uncontrolled stop). Stop category 1 covers the design where after the signal to kill has been given, power remains supplied to the control system until the machine has come to a standstill (controlled stop). The approach adopted by the present invention is generally a combination of these two categories.

Finally, there are many terms used in the present disclosure that are either new, such as "motors-on," or do not conform with standard terms in industry such as "reset." As such, a centralized listing of nomenclature is provided hereinafter as Table A to assist the reader.

TABLE A

| Nomenclature | |
|---|---|
| Emergency-stop circuit | the circuit responsible for controlling power to the AC motor power relay coil. |
| AC motor power | the AC power that flows through the contacts of the relay which the emergency-stop circuit controls. |
| AC system power | the AC power at entry that powers the entire system and is used to feed the AC motor power. |
| AC motor power relay/AC relay/AC relay coil/AC relay coil driver | the relay, its coil, or a pilot driver for its coil, which controls the flow of power from the AC system power to the AC motor power. |
| DC motor power/DC motor power supply/DC storage capacitor/high voltage DC | the power and the stored energy available after the transformation of AC motor power into a DC power via a diode bridge and filtering capacitor. |
| Logic power/DC power supplies | power supplies that are required to power sensors or to power digital logic required to drive control signals, including but not limited to the emergency-stop circuit. |
| Energize/kill/re-energize/start/re-start/startup | terminology used to describe what is done to the emergency-stop circuit, specifically regarding the starting or the stopping of flow of current to the AC motor power relay coil. |
| Power-up/reset | the application of power to the emergency-stop circuit that is required to power its digital logic and begin operation or refers to resetting the digital logic to the same state attained at power-up. |
| Power glitch event | refers to a momentary interruption in AC system power that causes a reset of the emergency-stop circuit's digital logic, because of a momentary loss of regulation of the logic power. |
| Primary output | the AC motor power relay coil driver signals (RELAY+/−), their required control signals (GO*), other state indicator signals (WAIT*), and any isolated versions (e.g., CGO*, CWAIT*, WAITL+/−, GOL+/−). |
| Enable/inhibit | refers to a digital control signal that is required by equipment in order to function (enable) or in order to stop function (inhibit). An enable is a contact that must be closed for the connected equipment to function (called a normally open NO switch). An inhibit is a contact that must be open for the connected equipment to function (called a normally closed NC switch). These signals are typically logic level signals, unless used to engage or disengage a brake or solenoid. |
| Computer enable | a control signal (CE*) sent by the computer and fed through the emergency-stop circuit for the primary purpose of controlling enable or inhibit signals, which are sent to connected equipment such as power amplifiers. |

TABLE A-continued

Nomenclature

| | |
|---|---|
| Secondary output | enable or inhibit connections at the emergency-stop circuit, which are controlled by either GO* or CE*. |
| Kill input/kill switch | a connection to the emergency-stop circuit that is capable of stopping the flow of current to the AC motor power relay coil thereby killing or keeping killed the emergency-stop circuit. This is also called a "safety switch". |
| Active/inactive | the state of a kill input or an enable-type secondary output, i.e., whether it is currently conducting or not or refers to the state of an inhibit-type secondary output, i.e., whether it is currently open or not. |
| PPGA | a Field Programmable Gate Array, which for this design controls the bulk of the logic for effecting the emergency-stop circuit function. |
| Motors-on/motors-off | the state of the emergency-stop circuit, i.e., whether or not it is energized, which is indicated by the ENERGIZED state indicator, GOL+ (motors-on lamp driver). Motors-on also refers to a momentary push-button switch that plays a role in startup. Others in industry use the word "reset" to refer to the "motors-on" function, and it should be noted that this usage of "reset" conflicts with the usage of "reset" adopted here (see above - Power-up/reset). |
| First motors-on | the period leading up to the first energizing of the emergency-stop circuit since the last power-up/reset. |
| Waiting-for-motors-on (WAITING) | a state of the emergency-stop circuit, when it is ready to energize but needs the operator to press the motors-on button, which is indicated by the WAITING state indicator, WAITL+/− (waiting-for-motors-on lamp driver). |
| Motors-on startup equations | the logic required to energize the emergency-stop circuit that examines the states of kill inputs and motors-on buttons and controls the primary outputs. |
| Kill equations | the logic required to de-energize the emergency-stop circuit. |
| Use/ignore/falling-type (USE, IGNORE, FALL, FALL-TO): | the configuration of a kill input, in order to specify whether the kill input should be used or ignored in the motors-on startup and kill equations or treated as a falling-type input, which is used only in the kill equations. |
| Select/defeat/bypass | whether a kill input is used or ignored. |
| Clear | returning an inactive kill input to an active (conducting) state. Also refers to clearing the power-up/reset error code that is displayed immediately after power-up/reset. |
| Computer ready | an active low signal (CRDY*) that is used by the computer and the emergency-stop circuit to keep the computer program and emergency-stop circuit in synchronization: the computer uses it to tell the emergency-stop it is safe to energize or to remain energized. |
| Computer watchdog | a signal the computer changes periodically to show the emergency-stop circuit that the program is running normally. The software on the computer must periodically "feed the watchdog", e.g. 0 to 5VDC, 5VDC to 0, and then repeat. The circuit will kill power when sufficient time has elapsed since the last toggle, a situation which is indicative of a poorly running or locked-up computer program. |
| Assert/de-assert/reassert/ reactivate | turning a control signal "on" (assert) or "off" (de-assert). Note that "on" is a low voltage for an active low signal which is denoted by an asterisk (e.g. CRDY*). |
| Recycle | de-asserting a signal that is on and then reasserting it. |
| Motion controller | the hardware and software required for intelligent, servo motion control of a device (where position or velocity is being controlled). |
| Power-loss period | period beginning with the loss of AC motor power and ending with either the total loss of all stored DC motor power or the loss of regulation of any associated logic power supply, whichever comes first. |
| Computer Go (CGO*) | handy communication bus that is used to communicate emergency-stop circuit status with a plurality of motion controllers. |
| Servo reflex/responsive movement | a movement of short duration in a desirable direction that is in response to a signal which indicates a power-loss period has begun. |
| Power-Loss Broadcast | the use of the Computer Go (CGO*) signal to inform all motion controllers that a power-loss period has begun so that a responsive movement should be started, if desired. |
| Opto-coupler | a device that provides optical isolation between two circuits, used to separate kill inputs from the emergency-stop circuit's local signals and secondary outputs from the emergency-stop circuits local signals. |

TABLE A-continued

Nomenclature

| | |
|---|---|
| State Machine | consists of five states that provides the structure for the operation of the circuit. Being in a given state controls whether or not a given input has an effect. |

General Features

The emergency-stop circuit 100 of the present invention, as illustrated in FIG. 1A, comprises a basic means for configuration (e.g., jumpers), which permits the controlled defeating (bypassing) of selected kill inputs. Visual status indicators (e.g., LEDs) identify the states of the inputs (active or inactive) and the mode of use (e.g., IGNORE, FALL, or USE). These features together with the circuit's centralized location facilitates quick and accurate assessment of configuration status and integrity. Kill switches are easily connected to the circuit 100. In a preferred configuration, when not defeated, the switches provide a DC signal that conducts (active) to keep the emergency-stop circuit energized. When configured for USE, the switches are also active before the motors-on button can be utilized to re-energize a killed circuit.

Figure 1B:
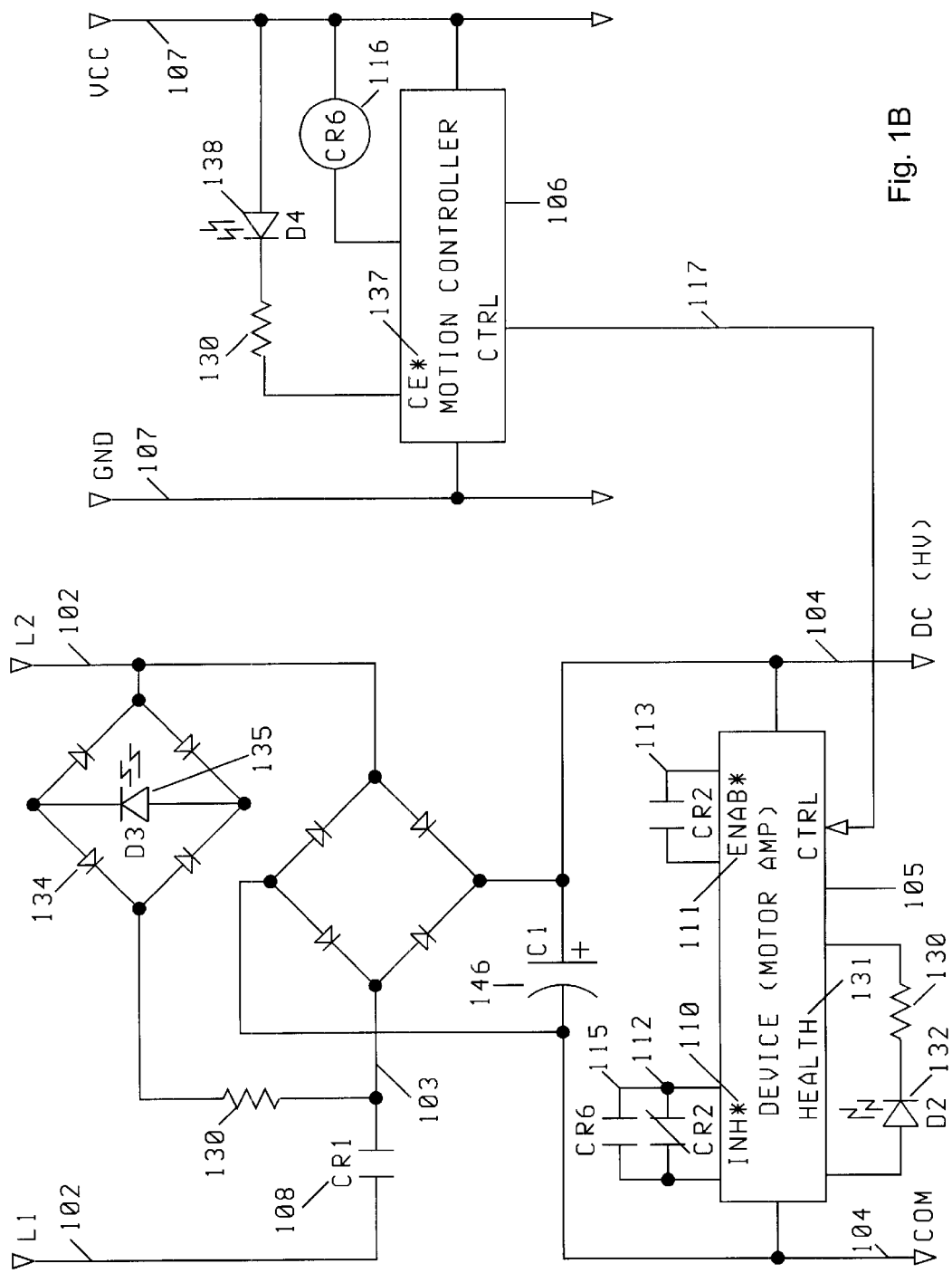

FIGS. 1A and 1B illustrate an example of the invention used in practice. FIG. 1A illustrates connections to the programmable emergency-stop circuit 100, as well as some of the other connections requiring DC logic power 101. Also shown in the figure are the AC system power 102, the AC motor power 103, the DC motor power 104, a typical device 105 powered by DC motor power, a motion controller (computer) 106, and the logic power supply 107 for the motion controller. Note that implicitly, the logic power supplies 101, 107 are derived from 102.

In a unique departure from the traditional circuit, kill inputs of the present invention may alternatively be configured as "falling inputs." As such, these kill inputs will only kill an energized circuit, and will not affect the motors-on startup equation. Specifically, this type of input kills on transition from active to inactive and is useful for connection to a status signal that only becomes active after the emergency-stop circuit becomes energized. Once active, the status signal can go inactive to signify some fault, which in-turn kills the emergency-stop circuit. An example of an input signal requiring this is a health signal that is output by an amplifier whose power is controlled by the emergency-stop circuit. In other words, the health signal cannot conduct until power is applied to the amplifier.

Although handled in a unique way, the feedback monitoring of the AC motor power relay contact voltage is also an example of a falling input, the falling (lowering) of which signifies that there is a power outage. Additionally, these falling inputs (normal or AC-type) can also be assigned a timeout value, which requires that the input become active within a programmed interval after the circuit is energized, and if it does not the circuit is (re-)killed. Other inputs handled by the circuit include computer ready, watchdog, emergency-stop buttons, and the like. A comprehensive list of preferred input types is listed in the following Table B, which provides a brief description of each:

TABLE B

| Input Types of Preferred Embodiment | |
|---|---|
| Type A: | kill input that expects a DC signal, may be configured to be ignored, used or treated as a falling-type. |
| Type B: | kill input that expects a DC signal, may be configured to be ignored or used. |
| Type WD: | watchdog kill input that expects a strobing signal which is indicative of a properly running computer program. It may be configured to be ignored or used. |
| Type R: | computer ready kill input that when active signifies the computer is ready for the emergency-stop circuit to be energized. It possesses additional features and may be configured to be ignored or used. |
| Type AC: | kill input that senses an AC-type strobing signal such as the 60Hz feedback signal from the AC motor power relay contacts. It may be configured to be ignored or used. |
| Type ATO: | a Type A kill input that also includes a time out feature, so that when configured as a falling-type, the freshly energized circuit is killed in the event that the kill input does not become active within a programmed interval. |
| Type ACTO: | a Type AC kill input that also includes a time out feature, so that when configured as used, the freshly energized circuit is killed in the event that the kill input does not begin strobing within a programmed interval. |
| Type CE (CETO): | a dedicated Type A (or ATO) kill input that also performs a mutually exclusive function related to the control of the secondary outputs. It is usually configured to be ignored when used to control secondary outputs. |
| Type ES: | a kill input that is dedicated for an emergency-stop button, is hardwired to be used. |
| Type MO: | a motors-on signal input that is not a kill input, but rather represents the final command to energize the emergency-stop circuit. |

TABLE B-continued

Input Types of Preferred Embodiment

| | |
|---|---|
| Type MC: | a monitor contact signal that is also not a kill input, but rather represents a check that is done when the circuit is killed to ensure that a downstream relay controlled by the primary output of the emergency-stop circuit has fully disengaged (contacts are not welded closed). This type of signal is currently used in practice to qualify the motors-on signal, i.e. it can inhibit the motors-on signal from becoming active. |
| Type CLEAR: | a clear signal input that clears a power-up/reset error code in order to reveal a second error code responsible for preventing first motors-on. It can also be used to determine whether a higher priority error code is present. |

The inputs of Table B control the behavior of the preprogrammed core logic of the emergency-stop circuit. The following provides an overview of the basic programmable capabilities of the invention, for example, whether to use or ignore a given kill input or whether to immediately disable or not disable a connected device during the DYING state. This programmability provides the sought after consistent environment for both design and maintenance. The engineer can use these capabilities to ease and accelerate the design and re-design process, to create a machine that may be adaptable to different operating conditions or application functions, or to create a fault tolerant machine that may be easily reconfigured so that continuously failing kill input path can be ignored, thereby permitting additional work to be accomplished. And the technician may quickly see which kill input is causing a shutdown or he can quickly, safely, and consistently disable parts of any given machine in order to test or debug.

Figure 2:
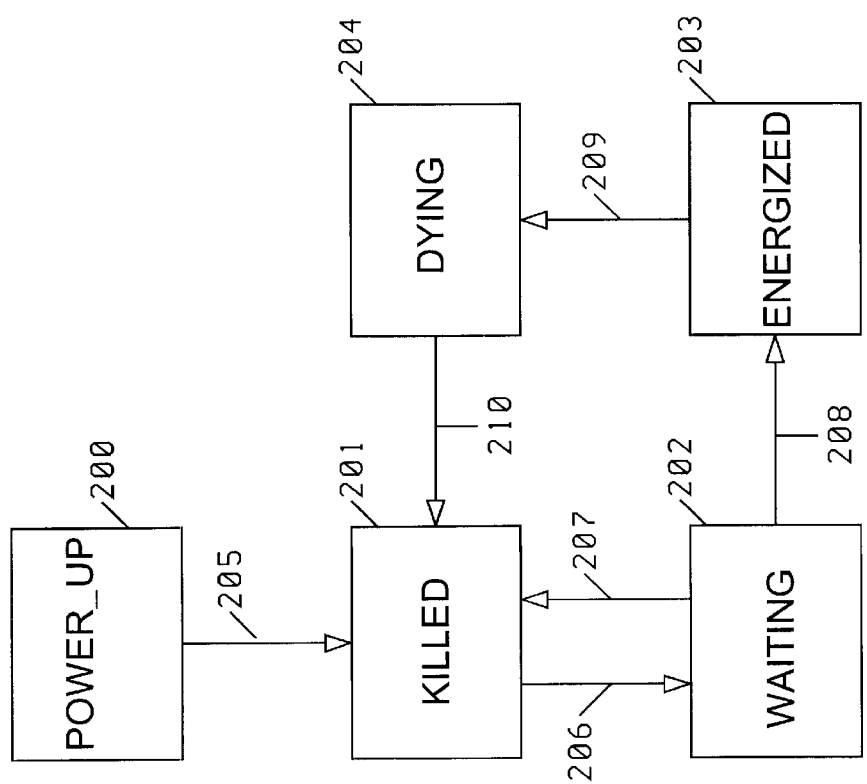
FIG. 2 illustrates a preferred state machine for the present invention.

Let us consider a large subsection of this logic that controls the "primary outputs" and that this portion always emulates a stop category 0 type of emergency-stop circuit. Among other things, this means that this portion of the logic is in one of at least two states: ENERGIZED 203 or KILLED 201 (FIG. 2).

Now, the internal logic of the circuit assembles a vector of "health signals" from the above set of (kill) input types such that the value of the real signal is fed through when the associated kill input is "used" and an active signal is substituted for the kill input temporarily when it is a falling-type or permanently when it is ignored. Consider that the logic is in the KILLED state 201. Once all of the kill inputs and their configurations generate a vector of active health signals, then the logic changes to a third WAITING state 202. This means that the logic is waiting for one of the Type-MO inputs to go active (i.e., waiting for the operator to press a motors-on button). The logic has been designed to wait for an inactive-to-active transition on this input and wait an additional period during which the input must remain stable and active. Once these criteria are satisfied, the logic changes to the ENERGIZED state 203.

It is during the ENERGIZED state 203 that all of the primary outputs are active. The primary outputs are the AC Motor Power Relay Coil Driver (RELAY+/−), Computer Go (CGO*) and Computer Waiting-for-Motors-On (CWAIT*). Although not physically leaving the main circuit board, there are two additional internal signals that are regarded as primary outputs, and they are GO* and WAIT*. Additionally, there are monitors for the above signals (GOL+/−, WAITL+/−), which do leave the main circuit board. Of these signals, the ones associated with the WAITING state are also active during the WAITING state (WAIT*, CWAIT*, WAITL+/−). (Refer to listing of signal names and connector pin-outs for the preferred design hereinafter.)

Once in the ENERGIZED state 203, the logic remains in that state until such time that the vector of health signals contains at least one inactive component. Once this occurs, the logic disables all primary outputs and enters the fourth state: DYING 204. (When entering this state, the vector of health signals is latched, so that the culprit may be identified via an error code.) Now, this state is a transition state that lasts for a programmed interval (e.g., 2 sec.). During this state, the circuit is inhibited from re-starting, and status for this state is provided to the operator using an audible signal. Once the interval expires, the logic transitions back to the KILLED state 201, where nominally, the cycle repeats.

It was noted that the above subsection of logic behaves as a stop category 0 emergency-stop circuit, but this is specifically with regards to controlling the flow of AC motor power. This means that the AC motor power only flows whenever the state is ENERGIZED 203, and this power is removed whenever it is not in that state. This constitutes the overall behavior of this subsection of the core logic. Attention will now be given to the secondary outputs and their use in tailoring the behavior of various connected devices whose power is controlled by the emergency-stop circuit.

Recall from the background material that it is prudent to utilize an enable or inhibit logic level signal in conjunction with the removal of power when optimally suppressing a device from exhibiting uncontrolled motion during a power-loss period. Therefore, when it is desirable that a connected device (e.g. a servo motor with amplifier) behave with stop category 0 characteristics, it should be additionally disabled whenever GO* is inactive, which will disable the power stage of an amplifier or engage a brake. Note that this is one path which a designer may adopt for a particular device.

Alternatively, upon entering the DYING state 204, it is clear that the power-loss period begins. Here, motion controllers may be able to use residual power in the system (e.g., DC motor power) to effect a reactionary movement in a desirable direction. The motion controllers recognize the DYING state 204 by examining the primary outputs.

Immediate knowledge of the beginning of a power-loss period enables a motion controller to perform a "servo-controlled reflex action," which is the responsive movement in a desirable direction. The design of the circuit permits this because of close coupling of signals with the motion controller. (Provisions are required to exist in the motion controller to accommodate and use these signals in order to effect the responsive movement.) The challenge here, though, is to ensure that the device is disabled at some later time, particularly whenever the logic power supply for the motion controller has fallen out of regulation.

Therefore, utilizing the present invention, the designer may adopt a second course for some particular device so that the device behaves with characteristics more akin to stop category 1. Specifically, this means that power remains supplied to the control system albeit for a short period of time, permitting the device a period of time to perform a reactionary movement and come to a controlled stop.

Specifically, the emergency-stop circuit 100 is programmed so that a given device whose power is controlled by the emergency-stop circuit will either be immediately disabled or not immediately disabled when the circuit enters the DYING state 204. This is accomplished by programming the secondary outputs (SO) that are enable or inhibit signals which are prevalent in machine subsystems such as lasers, robots, and servo motor amplifiers. The source of each enable (or inhibit) may be set (e.g., using configuration jumpers) to GO* or CE* (Computer Enable) to control the behavior of the connected device during a power-loss period. Furthermore, each of the secondary outputs may be programmed to be OFF, which disables the connected device regardless of emergency-stop circuit status. This latter setting is useful during a test or debug mode so that the power to the device is not required to be removed or re-wired. Also, a device, such as a robot, can remain on-line (powered, disabled, but communicating) so that it could continue to communicate with the local computer via a serial port connection, for example. Visual status for the secondary output preferably identifies the states of the outputs (active/inactive) and the mode of use (USE_GO*, USE_CE*, or OFF).

The present invention also provides two additional levels of programmability. The next higher level of programmability permits the selection of the type of kill input that is connected to a given input. For example, a given kill input may be programmed to act as either a Type A or a Type ATO, depending on the setting of a multiplexor. Other more elaborate combinations are obviously available. Though in practice, this requires plenty of logic, and this may not be necessary, when one considers the highest level of programmability.

The highest level of programmability is found, for example, when one considers that the core logic of the invention is implemented using a Field Programmable Gate Array (FPGA). Here, the totality of the logic is downloaded to the circuit in the field. Conceivably, this logic could be altered in the field so that the machine would adapt to differing operational environments as needed. First of all, digital filters that are embedded within the input types could be altered in order to better handle a particular operational scenario (e.g., noise concerns). Moreover, motors-on timing and DYING state intervals may be reprogrammed. Also, important watchdog and Type ATO timeout periods may be reprogrammed in the field so that they are tailored to specific conditions. For example, setting up a machine to run faster usually requires a shorter watchdog period for the same level of safety. Furthermore, kill input types can be re-associated with particular inputs, obviating the need for the aforementioned multiplexors. Finally, the lowest level of programmability may be completely hard-coded, thereby fully establishing the usage of the kill inputs and the behavior of the secondary outputs.

In addition to the above-noted programmability, in other embodiments, the present invention also provides audio status to simulate mechanical relay sounds. It has been observed that solid state relays make no noise when they are energized and are becoming more prevalent, replacing the standard electromechanical type. The use of audio status (a speaker) in the present invention is novel to simulate the audible closure of the contacts of an electromechanical relay whenever the actual relay is solid state. The audio status mechanism will emit a chirp (high frequency or short duration) when the circuit is energized, and a dull buzz (low frequency or longer duration) whenever the circuit is killed. The FPGA (Field Programmable Gate Array) digital logic section of the main circuit board controls the frequency and/or duration of the speaker signal. A simple decrementing counter operating at a desired frequency can be used. Typical application will simply use an internal signal that is active when the circuit is in the DYING state (the period when it is inhibited from restarting) to control the dull buzz.

Another novel feature of the present invention is the *Power-Loss Broadcast*. This occurs during the power-loss period, which is the period beginning with the loss of AC motor power and ending with either the total loss of all stored DC motor power or the loss of regulation of any associated logic power supply, whichever comes first.

Via the broadcast, immediate knowledge of the state of AC motor power failure allows the controllers time to initiate a servo-controlled reflex action, which is a responsive movement in a desirable direction. This responsive movement can be used, for example, to lift a spindle from the material in which it is cutting. Power for the responsive movement is garnered, for example, from the large storage capacitor that is filtering the high voltage DC motor power supply. Once this power has expired and the motors have stopped, no further motion can be achieved until the emergency-stop circuit is re-energized.

The Power-Loss Broadcast enables multiple axes of a machine to simultaneously react to AC motor power failure and move the system as a whole towards a more desirable configuration. An example of Power-Loss Broadcast requiring multiple axes is a robotic grinder. The part can be saved, should AC motor power fail during operation, if the axes of the robotic grinder were to react in a coordinated fashion, so that grinder is removed from the workpiece surface. In this case, the Power-Loss Broadcast is an enabling technology, since the motion controllers (or motion control system) must still know how far and in which direction to move the individual axes. Note that this is a common problem formulation in robotics referred to as a reverse analysis, where given the desired displacement of the end-effector (grinder) of the robot, it is necessary to calculate the individual axis displacements.

The Power-Loss Broadcast feature is activated when AC motor power is killed, either because the emergency-stop circuit killed it after a kill input went inactive or through the loss of incoming AC system power. The circuit has been designed so that the difference between these two cases is minimal.

In the first case, the emergency-stop circuit decides when, based on conditions such as status of kill inputs, to open the AC Relay Coil Driver (RELAY+/−), thereby killing AC motor power. It then broadcasts this state by driving the Computer Go (CGO*) signal inactive (primary outputs are de-asserted). The emergency-stop circuit behaves in the exact same way in the second case, when the emergency-stop circuit senses (via a dedicated Type-AC kill input) that AC motor power is dying as a result of the loss of incoming AC system power. Here though, DC power powering the logic on the emergency-stop circuit is also failing, but the assumption here is that this DC power remains stable for a short period of time.

In practice, the only difference between these two cases is the length of the power-loss period. For the first case, it depends only on how long the energy stored in the DC motor power supply lasts, while in the second case it also depends on how long the associated logic power supplies remain in regulation. When these logic supplies remain in regulation longer than the energy stored in the DC motor power supply lasts, then effectively, there is no difference. This effect can be achieved through the use of short duration uninterruptable power supplies.

In order to take advantage of this feature during the power-loss period, it is important that the motion controller be allowed to function to effect the responsive movement. In other words, the amplifier section should not be disabled (inhibited). This is true with the caveat that associated logic power supplies must be functional (in regulation).

A further novel feature of the present invention deals with the computer ready signal. The unique approach taken in the current design regarding the use of the computer ready signal is safety conscious to ensure that the computer software is synchronized with the emergency-stop circuit. Whenever the emergency-stop circuit has been killed because of an inactive kill input, a recycling of the Computer Ready (CRDY*) signal (the Type R input) is required in order to re-energize the circuit, which means an active computer ready signal must be de-asserted and then reactivated to acknowledge that the circuit was killed. The motivation for this is to force the computer program to be synchronized with the emergency-stop circuit. In the special case when the computer ready was the signal that killed the emergency-stop circuit (by going inactive), additional toggling is not required, because the logic contained in the FPGA section needs to ordinarily see an inactive-to-active transition on the computer ready signal to satisfy the motors-on startup equations, and the simple re-assertion of the computer ready satisfies this requirement.

A further scenario arises worthy of note is concerned with the requirements of the computer ready signal just after the power-up or reset of the main circuit board for the emergency-stop circuit. (A discussion of the computer program's recognition of this condition follows.) In this case, multiple recycles are required—three or more inactive-to-active transitions—in order to safely energize the circuit for the first motors-on period. It is assumed that three recycles would not occur naturally due to the simple application of power to the computer hardware which drives the CRDY* signal. If this three-active-edge technique were not adopted and if the computer hardware design were to force the CRDY* signal to begin in an active state (low), then the emergency-stop circuit would incorrectly recognize an inactive-to-active transition as a valid one, even though the software is not yet running.

Therefore, when three such recycles do occur after the computer boots, it is considered to be the result of safe, desired toggling controlled by the computer program which communicates with the emergency-stop circuit.

Finally, an obvious design change should be noted here. The Type R input could also be programmed to require three inactive-to-active transitions for each motors-on period (not just the first). Like the Type WD input, this helps to cover the case when a computer is rebooted.

A further novel feature is the dedicated power-up/reset error code and its use as well as how error codes are used in general. A dedicated error code is driven in response to a main circuit board power-up/reset to signify that a logic power supply fault has occurred, and this condition is used by the computer to suspect that sensors connected to the same or other power supplies have had a power interruption. For example, such a sensor could be a motor encoder, which is mounted on a motor to provide pulses in response to motor shaft movement. These pulses are counted at the motion controller to keep track of incremental displacements from a known home position. An interruption of power to the motor encoder could conceivably result in lost pulses that causes the motion controller to lose track of the motor shaft's real position, a condition which requires re-initialization (re-homing).

The preferred design employs a 2-digit seven-segment LED to display error codes and drives the code at the computer signals connector. (Refer to pinouts of all of the connectors for the preferred design hereinafter.) The manner in which error codes are shown on the 2-digit LED display and driven at the computer signals connector differs depending upon whether the emergency-stop circuit has been energized at least one time, i.e., before or after "first motors-on." The logic of the FPGA keeps track of whether motors have been powered since the logic began functioning, which begins after the FPGA has downloaded configuration data from a serial EPROM in response to a reset cycle controlled an industry standard power supply monitor (MAX705). The power supply monitor monitors the integrity of the incoming 5VDC power and asserts a RESET* signal whenever the incoming power dips below 4.65VDC and de-asserts (releases) RESET* when the incoming power rises above an acceptable level. The release of the RESET* signal begins configuration of the FPGA, resets the internal state (clears all internal flip-flops) of the FPGA, and finally starts the functioning of the FPGA logic.

Because the FPGA begins with cleared logic after configuration, the circuit cannot distinguish between a power-up from a cold start and a power glitch that causes a reset cycle. This should not be an issue when using the power-up/reset error code in practice, since either should be followed by an initialization of sub-systems, that is to say that homing commands should be sent to the motion controllers. The greatest benefit for the use of the error code is found in the event that a power glitch occurs such that the computer remains running but the logic supply powering the encoders (and emergency-stop circuit) fails. Here, the computer program continues running throughout the glitch and depends upon this error code to tell it that a glitch has occurred and that re-home commands should be sent to the motion controllers.

Specifically, immediately after power-up/reset and FPGA configuration, the 2-digit LED display shows a unique code (E.P. in the preferred design) and drives the code of 15 at the computer signals connector on the CERR signals. (See table of error codes for the preferred design hereinafter.) Unless cleared by the pressing of a dedicated button (CLEAR) on the main circuit board or by the use of a Type CLEAR input, this error code remains displayed regardless of the condition of other kill inputs until such time as the first motors-on occurs, at which time normal operation commences.

Normal operation with motors-on consists of an error code of 0 (no error) being shown on the 2-digit LED display and being driven on the computer signals connector. Subsequently, normal operation continues with motors-off whenever the circuit is killed due to an inactive kill signal. Then, the 2-digit display shows and the signals drive the code that is indicative of the source of the killed circuit. The error code remains displayed in this way until either the motors are restarted or until a second error code is found, which may occur before the motors are restarted but after the first error code is cleared (returned to a conducting state). The second error code is useful for deducing which kill input is now inactive and preventing the motors from restarting. The cycle of clearing a kill input and the displaying of a different error code continues until such time that the operator is able to restart motor power. The operator knows when the kill input—corresponding to last error code displayed—has been cleared, because the waiting-for-motors-on LED and lamps are lit and the CWAIT* signal is being driven at computer signals connector. Under normal operations, the computer program can use the CERR and CWAIT* signals to inform the operator which kill input needs to be cleared and whether it has been cleared, and when all is ready, the computer program can inform him to restart motors by pressing the motors-on button.

The design of the logic forces the display of the power-up/reset error code until first motors-on, which is necessary so that other codes do not overwrite it. (For example, immediately overwriting the code of 15 with 1, should Input #0 be used and inactive, would prevent the software program running on the computer from determining that a power glitch has occurred.) For the case of an inactive kill input before first motors-on, the computer program realizes that one exists because the waiting-for-motors-on signal (CWAIT*) is not active. In this case, the computer program logs the power glitch event corresponding to the power-up/reset error code and then instructs the operator to press the dedicated CLEAR button on the main circuit board so that a new error code may be displayed indicative of the actual kill input preventing the first motors-on. Then, after the CLEAR button has been pressed, normal operations commence with motors-off. In the case when CWAIT* is active before first motors-on, the use of the CLEAR button is not required, and the computer program can simply log the power glitch event and then command the operator to press the motors-on button, at which time normal operations commence with motors-on.

Finally, regarding normal operations for error codes, it is useful to note what happens in the case where multiple kill inputs are inactive. To accommodate this, a hierarchy has been established which means that the error code displayed is the one possessing the highest priority within the group of inactive kill inputs. In the design that was implemented to verify the invention, the power-up/reset error code (15) has the highest priority, the Input #0 error code (1) has the next highest, and the e-stop button error code (14) has the lowest.

The state machine of the present invention will now be described with reference to FIG. 2. The state machine provides a framework from which the invention operates. It is defined by five states (POWER-UP 200, KILLED 201, WAITING 202, ENERGIZED 203, and DYING 204) and those conditions that change the present state to the next state. These items will discussed in a general way here.

The emergency-stop circuit begins operation in the POWER-UP state, and while in this state, the circuit is inhibited from being energized to give adequate time for the digital filters of the circuit to initialize. After a programmed interval, the state changes into the KILLED state, and while in this state, the circuit is likewise inhibited from energizing. The state remains in the KILLED state 201 until the following conditions occur:

a) the Types A, B, R, ATO, CE, CETO kill inputs that are programmed for USE are active, b) the Type WD kill inputs that are programmed for USE are active (i.e. each strobes at an interval that is faster than its corresponding programmed interval), c) the Type ES kill inputs are active, d) the Type R kill input (if existing and used) has been recycled the appropriate number of times (3 if first motors-on or 1 if not), and e) the circuit does not have any internal errors. Once the above transpires, the circuit transitions into the WAITING state 202.

Once in the WAITING state 202, the circuit is ready to energize, and the outputs associated with the WAITING state become active (e.g., WAIT*, CWAIT*, WAITL+/−). Changing from the WAITING state nominally requires two conditions from one of the motors-on input signals: (1) an inactive-to-active transition and (2) a stable active signal for a programmed interval. Following this, the state transitions into the ENERGIZED state 203. On the other hand, if while in the WAITING state, one of the following conditions occurs, the state will return to the KILLED state 201;

a) one of the Types A, B, R, ATO, CE, CETO kill inputs that is programmed for USE becomes inactive, b) one of the Type WD kill inputs that is programmed for USE goes inactive (i.e. it does not change value during its corresponding programmed interval), c) one of the Type ES kill inputs is inactive, or d) the circuit has an internal error.

Once in the ENERGIZED state 203, the remaining primary outputs are enabled (e.g. RELAY+/−, GO*, CGO*, GOL+/−). The state remains in the ENERGIZED state until one or more of the following happens:

a) one of the Types A, B, R, ATO, CE, CETO kill inputs that is programmed for USE changes from active to inactive, b) one of the Type WD kill inputs that is programmed for USE goes inactive (i.e., it does not change value during its corresponding programmed interval), c) one of the Type ES kill inputs is inactive, d) one of the Types A, ATO, CE, or CETO kill inputs that is programmed for FALL or FALL-TO becomes active then changes to inactive, e) one of the Type ATO or CETO kill inputs that is programmed for FALL-TO does not become active within a programmed interval, f) one of the Types AC or ACTO kill inputs that is programmed for USE begins strobing, but then stops, g) one of the Type ACTO kill inputs that is programmed for USE does not begin strobing within a programmed interval, or h) the circuit finds an internal error.

Whenever one of the above occurs, the state changes to DYING 204. In the DYING state, the circuit is inhibited from restarting. The circuit remains in the DYING state a programmed period of time, and then it transitions back to the KILLED state 201, where nominally, the cycle repeats.

Finally, regarding specific features of the invention, there are novel features of the invention that relate to the use of solid-state circuitry. The introduction of solid-state circuitry in the application of emergency-stop circuitry is necessary in order to achieve the benefits that have been presented here. In general, solid-state components are more reliable and more accurate than their electromechanical counterparts. But, on the downside, they are more susceptible to noise, which presents a major hurdle that is necessary to overcome before the technology can be safely employed. It is believed that the novel redundancies inherent in the current design are more than sufficient to make the circuit impervious to background electrical or magnetic noise. It is anticipated that additional redundancy not disclosed herein may be employed in the practice of the invention, as it is done now for similar circuits, for example, employing dual identical circuits.

The use of solid-state also requires DC logic power, but it is anticipated that this power is required anyway in applications where the circuit will be used. Here the circuit also monitors the logic power, so that it then becomes a known-good supply which can be used to power motor encoders and the like.

The use of solid-state technology and specifically the Field Programmable Gate Array technology is novel when applied to the emergency-stop circuit. This provides the best of two worlds. The circuit can be programmed and reprogrammed, even though it runs no software and has no processor. Once configured at power-up/reset, it functions as electronic hardware, an assemblage of gates and flip-flops. The serial kill switch topology seen in the traditional circuit is replaced by a centralized kill input topology wherein the kill inputs and their configuration signals are filtered and gated inside the FPGA in order to generate a composite kill signal.

It is important to note that the ability to be reprogrammed in the field permits the adjustment of internal settings so that the circuit may be tailored to a specific application. For example, the de-bounce filter parameters or the computer watchdog timeout can be altered to provide different circuit behavior that is better suited for a particular application.

One of the greatest benefits enjoyed when employing this technology is the accuracy, and hence repeatability, that can be applied to timing the motors-on button's active period as well as to the timing of the start-up delay that prevents the immediate re-start during the DYING state of a freshly killed circuit.

Configuration of a Preferred Use of the Invention

FIGS. 1A and 1B illustrate an example of a preferred embodiment of the invention. FIG. 1A illustrates circuit connections to the programmable emergency-stop circuit 100, as well as some of the other connections requiring DC logic power 101. Also shown in the figure are the AC system power 102, the AC motor power 103, the DC motor power 104, a typical device 105 powered by DC motor power, a motion controller (computer) 106, and the logic power supply 107 for the motion controller. Note that implicitly, the logic power supplies 101, 107 are derived from 102.

In this preferred embodiment, the outputs from the emergency-stop circuit 100 control the coils of five relays. The AC motor power 103 is controlled by CR1 relay NO contacts 108 via CR1 relay coil 109. The inhibit input 110 to the device 105 is controlled by the CR2 relay NC contacts 112 via CR2 relay coil 114, or the enable input 111 is controlled by CR2 relay NO contacts 113 via CR2 relay coil 114. (The CR2 is shown as a Form C contact, but in practice either the NC or NO connection is omitted depending on whether the device possesses only an enable or inhibit input.) The WAITING state indicator 118 is controlled by CR3 relay contacts 119 via CR3 relay coil 120. The ENERGIZED state indicator 121 is controlled by CR4 relay contacts 122 via CR4 relay coil 123. The final output shown is the speaker 124 which is controlled by CR5 relay contacts 125 via CR5 relay coil 126.

Also, in the example, the emergency-stop circuit has six inputs which are driven by detectors of six optical isolators. Sensor SEN1 127 sends current limited by resistor 130 through the emitter 128 of an optical isolator, which controls the detector 129 connected to the circuit. Likewise, the HEALTH 131 of the device 105 sends current through the emitter 132 of a second optical isolator, which controls the detector 133 connected to the circuit. The AC diode bridge 134 uses low currents limited by resistor 130 in order to send current through the emitter 135 of the third optical isolator, which controls the detector 136 of the circuit. The motion controller 106 uses the Computer Enable signal 137 to send current through the emitter 138 of the fourth optical isolator, which controls the detector 139 of the circuit. The emergency-stop button 140 sends current through the emitter 141 of the fifth optical isolator, which controls the detector 142 of the circuit. Finally, the motors-on button 143 sends current through the emitter 144 of the sixth optical isolator, which controls the detector 145 connected to the circuit. These inputs may be thought of as assuming the types listed in the following table.

TABLE 1

Types of switches used in example

| Switch in Example | Type of Switch |
|---|---|
| D1  SEN1 127 | Type A, ATO, B, R, or WD |
| D2  HEALTH 131 | Type A or ATO (set to IGNORE or FALL) |
| D3  AC motor power feedback 134 | Type AC or ACTO |
| D4  Computer Enable 137 | Type CE or CETO |
| D5  Emergency-stop button 140 | Type ES |
| D6  Motors-on button 143 | Type MO |

The motion controller 106 is shown in the figure in order to rally address the power-loss period issues. The motion controller commands the device 105 via control signals 117. The motion controller may inhibit the device at the inhibit input 110, by using the CR6 NO relay contacts 115 via CR6 relay coil 116. The final connection to the motion controller is the Computer Enable.

FIG. 2 illustrates the state machine for the invention, which illustrates the five preferred states previously described: POWER-UP 200, KILLED 201, WAITING 202, ENERGIZED 203, and DYING 204. The conditions that cause changes in state were also previously described: programmed interval elapsed 205, circuit health, activation of used and Type ES kill inputs and proper recycling of Computer Ready signal 206, circuit not healthy or deactivation of a used or Type ES kill input 207, motors-on button requirements satisfied 208, circuit killed 209, and programmed interval elapsed 210.

For the example illustrated, the following table shows the values of the outputs relative to each of the five states. There are three entries for CR2, depending on whether the secondary output has been configured for USE_GO*, USE_CE*, or OFF.

TABLE 2

Outputs as a function of state

| | Power-up | Killed | Waiting | Energized | Dying |
|---|---|---|---|---|---|
| CR1 | OFF | OFF | OFF | ON | OFF |
| CR2, configured for USE_GO* | OFF | OFF | OFF | ON | OFF |
| CR2, configured for USE_CE* | OFF | OFF | OFF | Depends on Computer Enable (D4) | Depends on Computer Enable (D4) |
| CR2, configured for OFF | OFF | OFF | OFF | OFF | OFF |
| CR3 (WAIT state indicator) | OFF | OFF | ON | ON | OFF |
| CR4 (ENERGIZED state indicator) | OFF | OFF | OFF | ON | OFF |
| CR5 | OFF | OFF | OFF | ON then OFF | ON ON |

It is worthwhile to revisit the navigation of the state machine specifically applied to the example shown in FIG. 1. Here, after power-up, the DC logic power supply 101 becomes stable, and the emergency-stop circuit begins operation in the POWER-UP state. It remains in this state for a programmed interval that permits the circuit ample time to initialize all filters. During his state, all outputs are inhibited, which is exemplified in Table 2. Following this, the circuit enters the KILLED state, where again all outputs are inactive. The circuit remains in this state until all of the following happens, which transitions the state to WAITING:

a) the circuit does not have any internal errors,
b) emergency-stop switch 140 is closed,
c) the kill input 139 corresponding to CE* 137 is active if configured for USE,
d) the kill input 129 corresponding to SEN1 127 satisfies the criteria that depends on its type (see Table 3).

TABLE 3

WAITING state criteria for first kill input

| Input Type | Criteria |
| --- | --- |
| Type A | If set to USE, the kill input must be active. |
| Type B | If set to USE, the kill input must be active. |
| Type WD | If set to USE, the kill input must be active. It must change (strobe) at regular intervals at a rate faster than a programmed value. |
| Type ATO | If set to USE, the kill input must be active. |
| Type R | If set to USE, the kill input must recycle the appropriate number of times and then remain active. It must be recycled three times if the circuit has not energized at least once, and one time if it has. |

Once the circuit is in the WAITING state, the circuit is ready to energize, and the outputs are as described in Table 2. In order to change from this state, the circuit requires that the motors-on momentary button 143 be pressed and remain pressed for a programmed interval. Following this, the circuit transitions into the ENERGIZED state, for which in general all of the outputs become active (see Table 2). On the other hand, the circuit may revert back to the KILLED state from the WAITING state if one of the following occurs:

a) the circuit finds an internal error,
b) emergency-stop switch 140 opens,
c) the kill input 139 corresponding to CE* 137 becomes inactive if configured for USE,
d) the kill input 129 corresponding to SEN1 127 does not satisfy the criteria that depends on its type (see Table 3).

However, once the circuit does enter the ENERGIZED state, the circuit remains in that state until such time as one of the following occurs:

a) the circuit finds an internal error,
b) emergency-stop switch 140 opens,
c) the kill input 139 corresponding to CE* 137 does one of the following:
  i) becomes inactive if configured for USE,
  ii) it goes active and then inactive if configured for FALL (or FALL-TO), or
  iii) if programmed as a Type CETO and is configured for FALL-TO, it does not become active within the programmed interval,
d) the kill input 136 corresponding to the AC motor power sense line 134 if configured for USE begins strobing, but then ceases,
e) the kill input 136 corresponding to the AC motor power sense line 134 is programmed as a Type ACTO input, is configured for USE, and does not begin strobing within a programmed interval,
f) the kill input 133 corresponding to the HEALTH 131 of the device 105 if configured for FALL (or FALL-TO) becomes active and then goes inactive,
g) the kill input 133 corresponding to the HEALTH 131 of the device 105 if programmed as a Type ATO input that is configured for FALL-TO does not become active within a programmed interval, or
h) the kill input 129 corresponding to the SEN1 127 satisfies a criterion listed in Table 4 that depends on the programmed input type.

TABLE 4

Situations where first kill input kills circuit

| Input Type | Criteria |
| --- | --- |
| Type A | programmed for USE and changes from active to inactive, or programmed for FALL, becomes active, and then goes inactive, |
| Type B | Programmed for USE and changes from active to inactive, |
| Type WD | Programmed for USE and does not change value within the programmed interval, |
| Type ATO | programmed for USE and changes from active to inactive, programmed for FALL-TO, becomes active then goes inactive, or programmed for FALL-TO, and does not become active within the programmed interval, |
| Type R | Programmed for USE and changes from active to inactive, |

Whenever one of the above occurs, the state changes to DYING. In the DYING state, the circuit is inhibited from restarting. The circuit remains in the DYING state a programmed period of type, and when it transitions back to the KILLED state, where nominally, the cycle repeats.

The use of the secondary output(s) for FIG. 1 will now be described. The current invention is able to accommodate traditional technology that depends upon enabling and/or inhibiting servo amplifiers, and the example illustrated in FIGS. 1A and 1B demonstrate this, when one considers the device 105 to be a servo motor amplifier. Now, a traditional motion controller 106 is closely coupled to the computer, and the enable or inhibit (e.g. 115) connection is typically made from the computer or motion controller directly to the motor power amplifier via an opto-coupler, thereby bypassing the emergency-stop circuit 100. Consider this as wiring option #1, which was discussed in the background material along with its shortcomings.

On the other hand, allowing the new emergency-stop circuit 100 to directly control the inhibit using 112 (or enable using 113) is considered here to be appropriate, but in light of the typical circuit, it is not obvious. Consider this as wiring option #2. With the secondary output (SO) connected to CR2 relay coil 114 programmed to USE_GO*, the amplifier is immediately disabled (inhibited) when AC motor power 103 is killed and remains so throughout the remaining power-loss period. There does not exist the possibility of powered, uncontrolled motion even if charge in the DC storage capacitor 146 outlasts the lives of the DC logic power supply 101 powering the emergency-stop circuit and the DC logic power supply 107 powering the motion controller and/or computer.

This is good design practice, although in the case of startup when the motion controller may or may not be ready to perform feedback control. To accommodate this, consider that the inhibit input at the amplifier is an active low signal (e.g. INH* 110) which has a pull-up resistor to ordinarily keep the amplifier active, and that the emergency-stop and motion controller both have connections to it as explicitly shown in FIG. 1B. Consider this as wiring option #3. In this design, either the emergency-stop circuit or the motion control circuit may inhibit the amplifier. In practice, both sources drive the signal to inhibit the amplifier, with the emergency-stop circuit leading the motion controller circuit during a power-loss period. On startup, the emergency-stop circuit also leads the motion controller's release of the inhibit, with the latter executing software to begin feedback control. This is a better design in the sense that the amplifier 105 is inhibited whenever AC motor power 103 is killed, associated logic power supplies 101, 107 are dead, or whenever the motion controller 106 is not ready to drive motor position.

If, however, the designer wishes to take advantage of the Power-Loss Broadcast in the traditional motion controller configuration, he should program the secondary output to USE_CE*, and configure the computer to drive CE* (Computer Enable 137). The signal CE* is basically a feed through of inhibit control from the computer through the emergency-stop circuit to the amplifier, although programming options do exist internally to "qualify" the signal. Note that because of this signal, the in-parallel signal (e.g. CR6 relay contacts 115) from the computer directly to the amplifier may not be required, and if it is not used, then CE* kill input corresponding to D4 139 should be programmed to IGNORE so that the signal does not kill the circuit. This latter case reverts us back to wiring option #2 but offers different behavior than that explained above because of the different programming of the secondary output.

Now, while employing the computer enable and USE_CE* option, the computer or motion controller may keep the amplifier enabled during the power-loss period so that the motion controller can appropriately move the motor using residual power from the DC storage capacitor 146. This shifts control of the amplifier inhibit circuit in favor of the computer and motion controller. However, the emergency-stop circuit can still inhibit the amplifier 105 in this power-loss period scenario. At some time after failure of AC system power 102, the DC logic power supply 107 powering the computer will fall out of regulation, which is distinguished by the computer no longer driving CE*. The emergency-stop circuit senses the loss of CE* and in-turn inhibits the amplifier. Alternatively, the DC logic power supply 101 for the emergency-stop circuit may cease to function first, which because of the circuit design (employing the CR2 NC relay contacts 112) also has the desirable effect of inhibiting the amplifier. (Note: The logic supply powering the emergency-stop circuit typically also powers the feedback sensor, so an amplifier inhibit is considered necessary, since reliable feedback control is no longer possible.)

These power fail issues justify the use of CE* and its feed through to the amplifier via the emergency-stop circuitry. This is true for either wiring options #2 or #3. It creates an environment that allows safe use of the Power-Loss Broadcast and associated responsive movement in the traditional motion controller-amplifier design. As in the case of USE_GO*, there does not exist the possibility of powered, uncontrolled motion even if charge in the DC storage capacitor 146 outlasts the lives of the DC power supplies 101, 107 powering the emergency-stop circuit, motion controller, and/or computer.

Internal Circuitry

Figure 3:
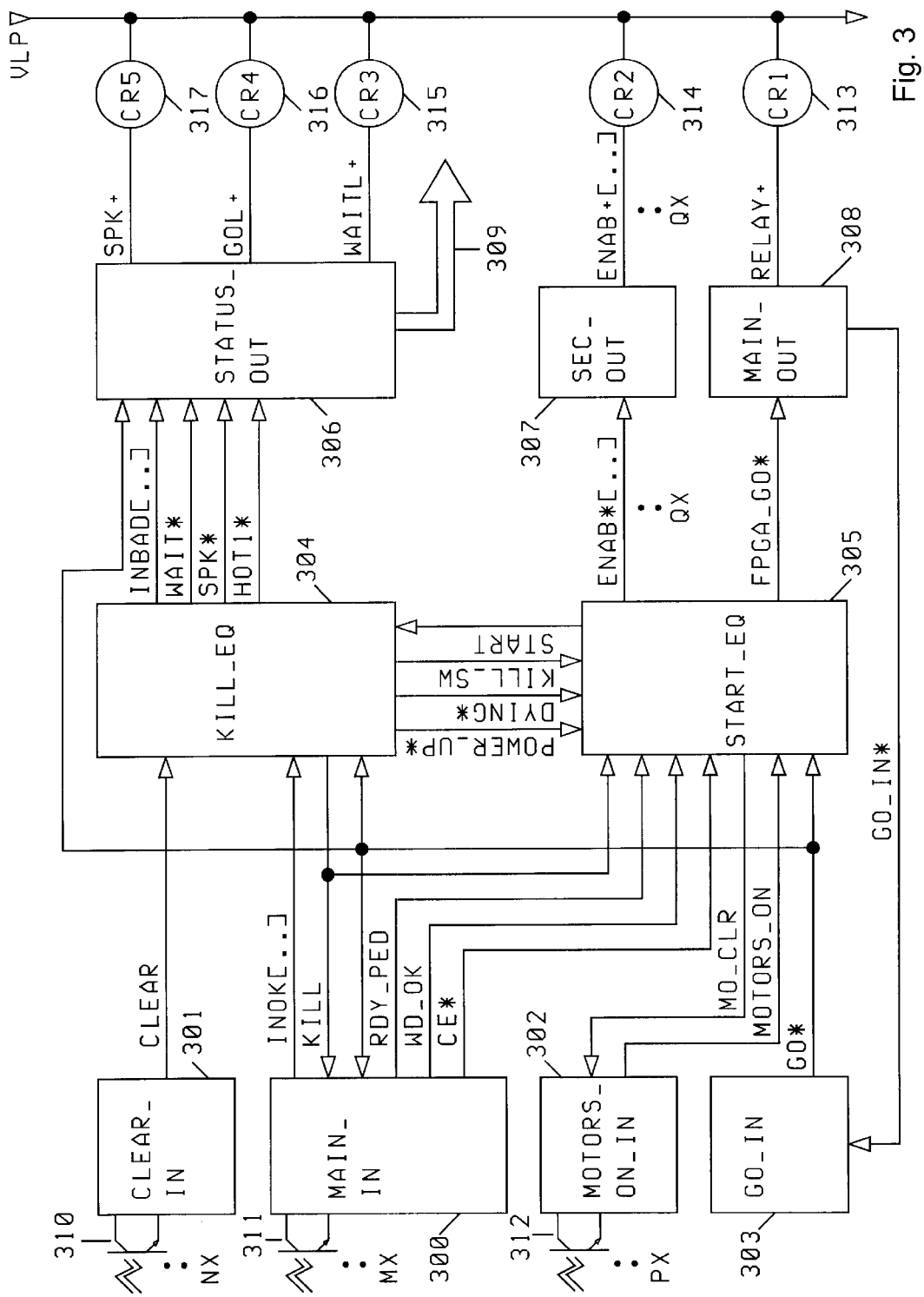
FIG. 3 illustrates a top-level schematic for the internal logic of the emergency-stop circuit of the present invention.

FIG. 3 illustrates an overview of the internals of the circuit that illustrates the main sections of the emergency stop circuit MAIN_IN 300, CLEAR_IN 301, MOTORS_ON_IN 302, GO_IN 303, KILL_QEQ 304, START_EQ 305, STATUS_OUT 306, SEC_OUT 307, and MAIN_OUT 308. This figure serves as an introduction to the more encompassing FIG. 4 that provides the top-level schematic for the FPGA digital logic. As such, input and secondary output signals have been generalized with respect to what was shown in FIG. 1. In other words, what is described here is the internals of a generalized version of the emergency-stop circuit 100 shown in FIG. 1. Finally, implicitly added to FIG. 3 are the configuration means and the other output status signals 309 (e.g. CGO*, CWAIT*, and CERR[..]).

Inputs to the circuit are the kill inputs 311 (quantity M), clear inputs 310 (quantity N), and motors-on inputs 312 (quantity P). Outputs to the circuit are the AC motor power relay coil driver signals RELAY+/− that drives the coil CR1 313, and the enable signals ENAB+/−[..] (quantity Q), each of which drives a dedicated secondary output coil CR2 314. Additional outputs are the WAITING state indicator (WAITL+/−) which drives the coil CR3 315, the ENERGIZED state indicator (GOL+/−), which drives the coil CR4 316, and the speaker signal SPK+/−, which drives the coil CR5 317. Note that signals such as SPK+/− are isolated versions of their local counterparts such as SPK*, and that FIG. 3 illustrates only the positive end of the signal (e.g. SPK+) with the negative end being implicitly grounded in the example.

FIG. 3 also illustrates a number of internal signals, the most pertinent of which are the KILL, WAIT*, START, FPGA_GO*, POWER_UP*, DYING*, and SPK* signals because of the roles they play in determining the state of the circuit. The descriptions for these signals are provided in Table 5 together with descriptions for the remaining internal signals shown in the figure.

TABLE 5

Internal signals

| Signal Name | Description |
|---|---|
| CLEAR | This signal generated by CLEAR_IN is a composite clear signal that is sent to KILL_EQ in order to latch a new error and activate HOT1* to clear the power-up/reset code. |
| INOK[..] | This is a vector of health signals generated by MAIN_IN and sent to KILL_EQ. |
| KILL | This signal generated by KILL_EQ is active during the KILLED and DYING states. It is sent to START_EQ to deactivate FPGA_GO* and to MAIN_IN to activate the INOK signals for inputs configured to be falling-types. |
| RDY_PED | This signal generated by MAIN_IN is a one clock period pulse signifying that the Type R input has had the appropriate number of inactive-to-active transitions. |

TABLE 5-continued

Internal signals

| Signal Name | Description |
| --- | --- |
| WD_OK | This signal generated by MAIN_IN is active when the computer watchdog is active or programmed to IGNORE. |
| CE* | This signal generated by MAIN_IN is active when the Type CE (or CETO) kill input is active. |
| MO_CLR | This signal generated by START_EQ tells MOTORS_ON_IN whether startup is currently inhibited. |
| MOTORS_ON | This signal generated by MOTORS_ON_IN is a one clock period pulse instructing START_EQ that a valid motors-on signal has been detected. |
| GO* | This signal generated by GO_IN is active whenever MAIN_OUT has activated the primary output RELAY+/−, and GO* is sent to the following places: MAIN_IN so that Types ATO, CETO, and ACTO inputs can begin timeout counting, START_EQ to disable the START signal, KILL_EQ to replace the falling START signal, and STATUS_OUT for driving status signals. |
| GO_IN* | This signal is raw feedback from MAIN_OUT that goes to GO_IN for filtering. It is active based on FPGA_GO* and the redundancy contained within MAIN_OUT. |
| INBAD[..] | This is a vector of latched, inverted versions of INOK[..]. |
| WAIT* | This signal is a buffered equivalent to KILL that is used to provide status of the circuit. |
| SPK* | This signal generated by KILL_EQ is active during the DYING state and the initial part of the ENERGIZED state, and it is sent to STATUS_OUT in order to generate an audible sound. |
| HOT1* | This signal generated by KILL_EQ is continuously active following first motors-on or following the activation of the CLEAR signal. |
| POWER_UP* | This signal generated by KILL_EQ is active during the POWER_UP state, and it is sent to START_EQ in order to inhibit energizing whenever logic power has just been applied to the circuit. |
| DYING* | This signal generated by KILL_EQ is active during the DYING state, and it is sent to START_EQ in order to inhibit energizing whenever the circuit has just been killed. |
| KILL_SW | This signal, generated by KILL_EQ from INOK[..], is active during the KILLED and DYING states. |
| START | This signal, generated by START_EQ and sent to KILL_EQ, is active during the WAITING period. |
| ENAB*[..] | Secondary outputs generated by START_EQ are active based on programmed mode and CE*, GO* signals. |
| FPGA_GO* | This signal generated by START_EQ is active during the ENERGIZED state, and it is sent to MAIN_OUT which energizes the AC motor power relay coil driver (RELAY+/−). |

Now, the MAIN_IN 300 section is responsible for generating the vector of health signals INOK[..] from the kill inputs based on the states of KILL and GO* as well as internal programming. Also included as a component of INOK[..] is an internal signal that validates the health of the circuit, and this together with the external kill inputs provides the complete vector INOK[..]. While generating the INOK bus, the section also generates the RDY_PED, CE*, and WD_OK signals. Note that this section is passive with respect to controlling the state of the circuit (e.g. KILLED, WAITING, etc). This section requires the following programming steps:

a) setting up an input type (e.g. Type A, Type R) for each kill input 311;

b) setting the main clock signal;

c) setting up digital filters, timeout parameters, and related clocks; and d) setting up the configuration of each kill input (e.g. USE, IGNORE, or FALL).

The vector of health signals INOK[..] is uniquely determined based on the above programming, the functionality of the particular input types, the kill input 311 signals, and the KILL and GO* signals. Specifically, the KILL signal goes to Type A, ATO, CE, CETO, AC, and ACTO inputs so that a given input can temporarily deliver an active health signal whenever it is configured to be a falling-type. Additionally, the GO* signal goes to Type ATO, CETO, and ACTO inputs so that these inputs can begin timeout counting after the signal becomes active.

Peripheral functions for the MAIN_IN section include generating a RDY_PED signal, which a one main clock period pulse delivered in response to the appropriate filtered transitions of the Type R input signal. Alternatively, the RDY_PED is continuously high if the Type R input is absent or ignored. Also, the section generates the CE* signal which is active only when the Type CE (or CETO) input is present and active. Finally, the WD_OK signal is generated by the section to be active whenever the computer watchdog is absent, ignored, or used and properly strobing.

The CLEAR_IN 301 section is responsible for generating the composite CLEAR signal based on the input signals 310 as well as internal programming. Programming this section amounts to setting the main clock signal and digital filter parameters. Similar to the MAIN_IN section, this section also has no bearing on the state of the circuit. Functionally, the section delivers a filtered, composite CLEAR signal whenever any of the input signals 310 becomes active.

The MOTORS_ON_IN 302 section is responsible for generating a MOTORS_ON pulse based on the input signals 312, the inhibit signal MO_CLR, and internal programming. Programming the section amounts to
   a) setting up an input type (e.g. Type MO or Type MC) for each input source 312,
   b) setting the main clock signal,
   c) setting the digital filters, related clocks, and
   d) setting the interval that specifies how long a motors-on signal (Type MO input) must be active.

Similar to the MAIN_IN and CLEAR_IN sections, this section is also passive and does not actively affect the state of the circuit. Functionally, the section delivers a one main clock period pulse at MOTORS_ON whenever the MO_CLR signal is inactive and the filtered version of one of the motors-on (Type MO input) signals becomes active and remains active for the programmed duration. This can be inhibited whenever one or more of the Type MC monitor contact signals are inactive.

The GO_IN 303 section is responsible for generating the GO* signal based on the raw GO_IN* signal and internal programming. Programming the section amounts to setting the main clock and digital filter parameters. This section together with the START_EQ and MAIN_OUT does control whether the state is ENERGIZED.

The KILL_EQ 304 section is responsible for implementing the kill equations based on the GO*, CLEAR, and START signals as well as the vector of health INOK signals and internal programming. The kill equations comprise the logic necessary to generate the POWER_UP*, DYING*, KILL_SW, KILL, INBAD[..], WAIT*, SPK*, and HOT1* signals. Programming the section amounts to setting up the main clock signal and setting up the clock and timeout parameters for three periods: startup (beginning of ENERGIZING state), DYING, and POWER_UP. This section plays the biggest role in controlling the state of the circuit, specifically controlling whether the state is POWER_UP, KILLED, DYING or WAITING. The set of values for the pertinent signals always uniquely specify the state of the circuit. This is demonstrated in Table 6.

TABLE 6

Values of pertinent internal signals and the states

|  | Power up | Killed | Waiting | Energized | Dying |
|---|---|---|---|---|---|
| KILL | Don't care | Active | Inactive | Inactive | Active |
| WAIT* | Don't care | Inactive | Active | Active | Inactive |
| START | Inactive | Inactive | Active | Inactive | Inactive |
| FPGA_GO* (GO*) | Inactive | Inactive | Inactive | Active | Inactive |
| POWER_UP* | Active | Inactive | Inactive | Inactive | Inactive |
| DYING* | Don't care | Inactive | Inactive | Inactive | Active |
| SPK* | Don't care | Inactive | Inactive | Active, then Inactive | Active |

While implementing its logic, the KILL_EQ section performs three important functions. First, it activates the KILL_SW signal whenever any of the INOK[..] health signal components goes inactive. When this happens, the INOK[..] health signals are latched and inverted to create the INBAD[..] vector. This second vector is cleared when the circuit is energized. Secondly, the section generates the HOT1*, POWER_UP*, DYING*, and SPK* signals as programmable functions of time and the GO* and CLEAR signals. Finally, the KILL signal is assembled as the logical OR of the KILL_SW signal and a second signal (not shown) that is active only when GO* and START both are inactive, and consequently, this creates two sources that kill the circuit: (1) from a known source identified by INBAD[..] through KILL_SW and (2) from the second signal when START is inactive and for an unknown reason, GO* has deactivated. The latter case can occur when the MAIN_OUT section has an internal failure or a redundancy related issue exists there.

The START_EQ 305 section is responsible for implementing the startup equations based on the four signals from the KILL_EQ section plus the MOTORS_ON, RDY_PED, WD_OK, CE*, and GO* signals. The startup equations comprise the logic necessary to generate the FPGA_GO*, ENAB*[..], START, and MO_CLR signals. Programming the section amounts to the following steps:
   a) setting the main clock signal;
   b) setting up the relationship between CE* and the actual signal used on its behalf to generate the secondary output signals that are configured for USE_CE*, i.e. specifying the option for qualifying CE* to generate CE2* (signal not shown in FIG. 3);
   c) setting up the configuration of each secondary output (USE_GO*, USE_CE*, or OFF).

A comprehensive description for the options regarding how the CE* signal is qualified is forthcoming in the FIG. 4 description.

Functionally, the START_EQ section performs four important tasks. First, it generates the aforementioned CE2* signal. Secondly, it generates the vector of ENAB*[..] secondary output signals based on their programming and the CE2* and GO* signals. Thirdly, it generates the FPGA_GO* signal by activating it in response to a MOTORS_ON pulse and always deactivating it in response to an active KILL signal. This function also generates the MO_CLR signal to inhibit the MOTORS_ON pulse whenever the state is either DYING or POWER_UP. Lastly, the section generates the START signal, which is active only when the state is WAITING (see above for transitioning into the WAITING state).

Now, pending compatible inputs, the START_EQ section initiates the transfer to the ENERGIZED state by asserting FPGA_GO*. The MAIN_OUT section with its redundancy follows suit to assert RELAY+/− (AC motor power relay coil driver), which activates the raw feedback GO_IN* signal. Finally, the GO_IN section plays its role (see above) and activates GO*, and in the START_EQ section deactivates START. Recall that the second source that generates KILL in the KILL_EQ section comes from both START and GO* being inactive. The fact that START deactivates after GO* becomes active keeps that second source from normally being an issue.

The STATUS_OUT 306 section performs basic isolation functions that do not warrant explanation here but also performs an important function that generates error codes based on the INBAD[..] and HOT1*. This is the section that prioritizes the components in INBAD[..] and sets the corresponding error code in the ERR[..] vector, e.g. 309. This is the case unless HOT1* is not active (before first-motors-on), which supersedes the INBAD[..] generated error code with the dedicated power-up/reset error code.

The SEC_OUT 307 and MAIN_OUT 308 sections each possess straightforward functionality essentially isolating and/or transforming their respective inputs into their respective outputs. They do not require programming and do not warrant further description here.

Figures 4A, 4E:
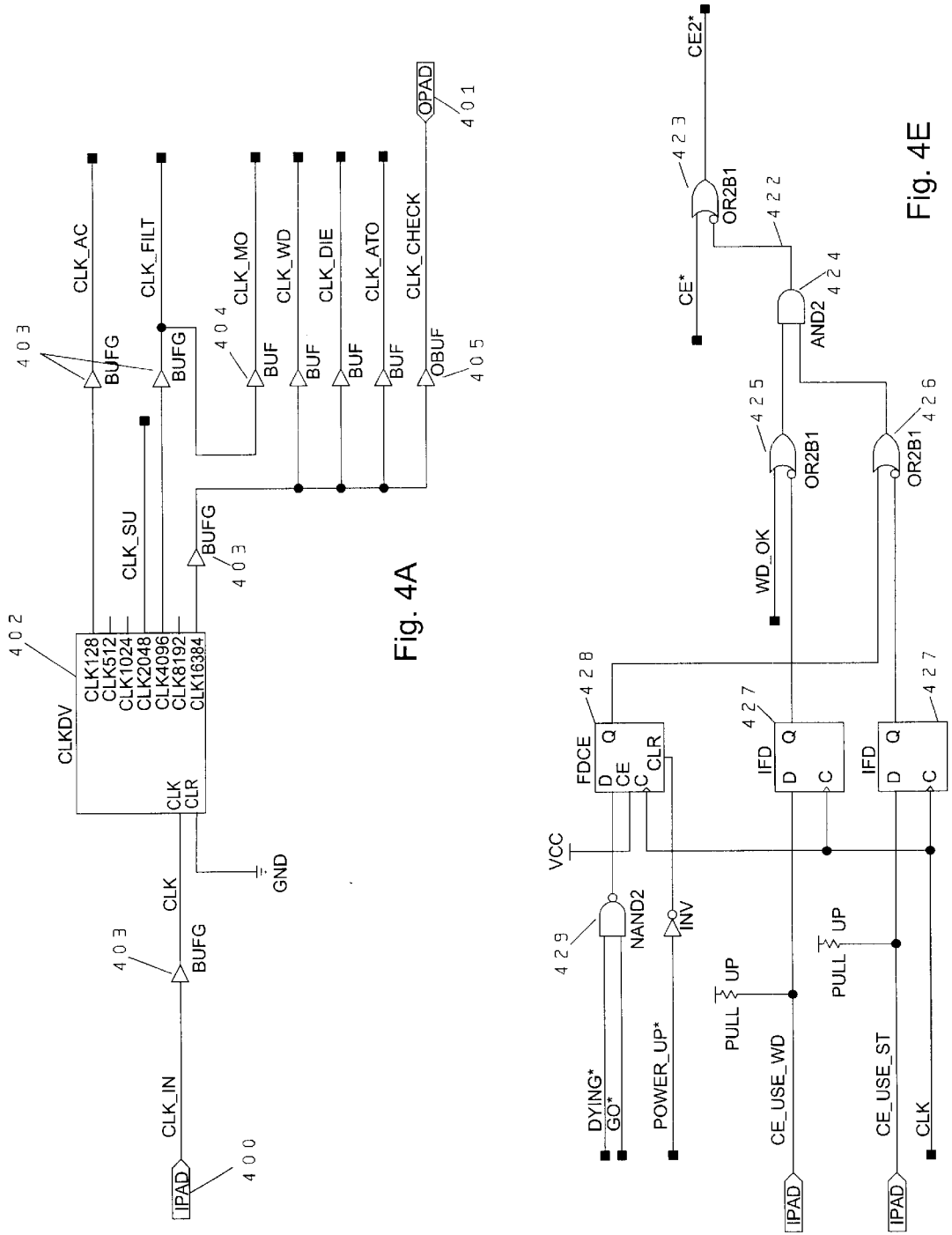
FIGS. 4A–4I illustrate detailed field programmable gate array (FPGA) schematics for the internal logic of the preferred embodiment.

FIGS. 4A–4I illustrate the detailed schematic for the actual logic used within the FPGA in the preferred design. This logic specifies exactly how the input signals to the FPGA are used in order to establish what the states of the output signals will be. Note that as shown in FIG. 4A, the input signals to the FPGA are illustrated with input pads 400, and the output signals from the FPGA are illustrated with output pads 401.

Relative to FIG. 3, the logic within the FPGA chip has been partitioned into additional subsections, e.g. MAIN_IN 300 is made up of such subsections as INPUTA 407, INPUTB 410 in FIG. 4. Also, relative to FIG. 3, the FPGA digital logic implements the main sections shown in FIG. 3 as MAIN_IN 300, CLEAR_IN 301, MOTORS_ON_IN 302, GO_IN 303, KILL_EQ 304, START_EQ 305, and part of STATUS_OUT 306. The locations of these sections in FIG. 4 will be called out here in the ensuing description. Following this, the individual subsections will be described in detail.

FIG. 4A illustrates how clocks used throughout the circuit are programmed. The internal subsection CLKDV 402 is shown and exists for the purposes of dividing by multiples of two the incoming clock CLK into a number of lower frequency clocks. This subsection uses standard clock divisor techniques to generate additional clocks that range in frequency from CLK/128 to CLK/16384. The programming of DEBOUNCE, DELAY-RISE digital filters, and various counters involves the association of dedicated clock signals with the desired lower frequency clock (e.g. computer watchdog timer clock CLK_WD is assigned to CLK/16384 and AC Line Sense clock CLK_AC is assigned to CLK/128).

Also shown in FIG. 4A, clock signals that are driven by the BUFG 403 symbol are global clocks, e.g. CLK and CLK_FILT, which is meaningful in the design because it helps in routing the FPGA. This means that these clocks (and their inverses) are readily available throughout the design process to clock any internal flip-flop. On the other hand, signals that are buffered by the BUF 404 symbol are done so in order to essentially assign different net names to the same signal, if that is desired. For example, in FIG. 4A, CLK_WD and CLK_DIE have both been assigned to the CLKDV output signal CLK/16384. Hence, in the event that they are reprogrammed, this preserves continuity elsewhere wherever the clocks are used. A final buffer is the OBUF 405, which is used here to send the CLK_CHECK signal off chip in order to validate the functioning of the oscillator (and this comes back as the local kill input OKCLK).

Figure 4B:
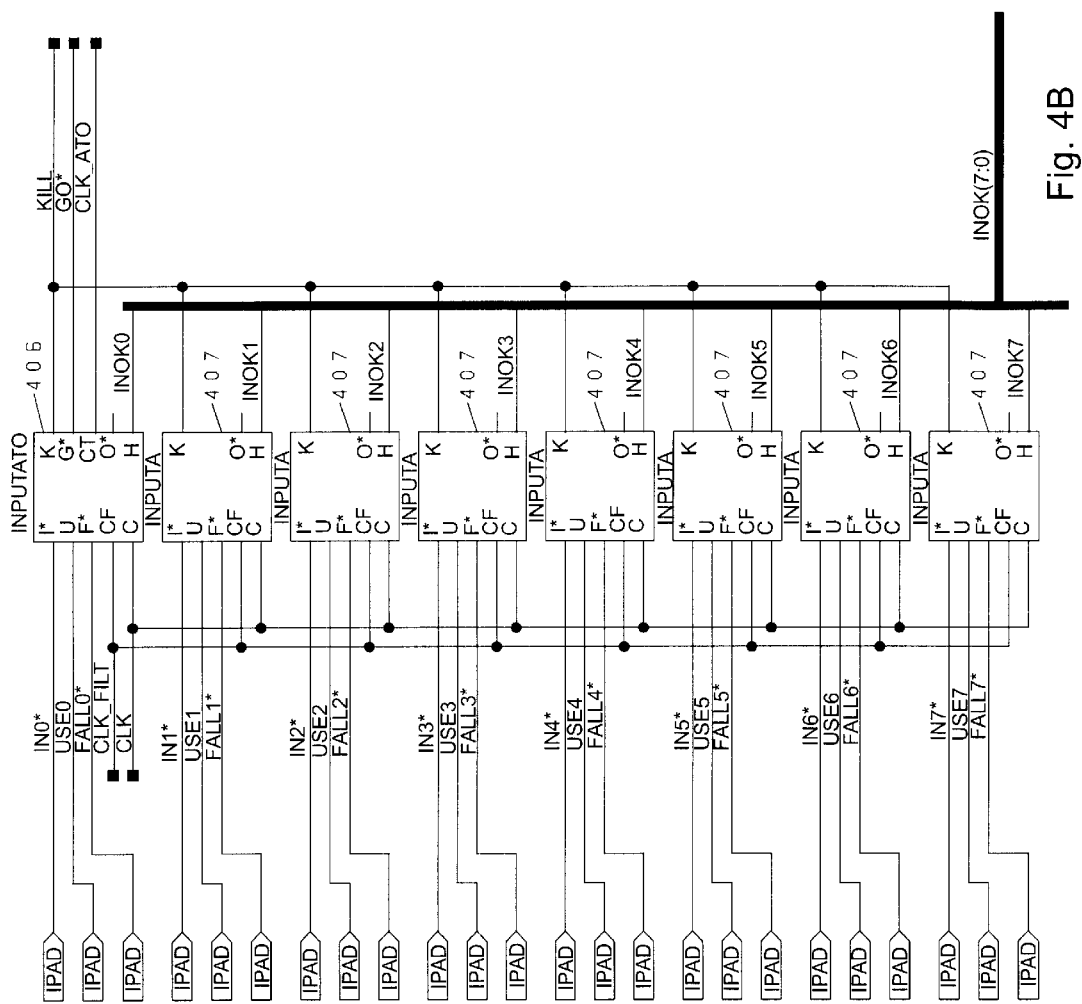
Figure 4F:
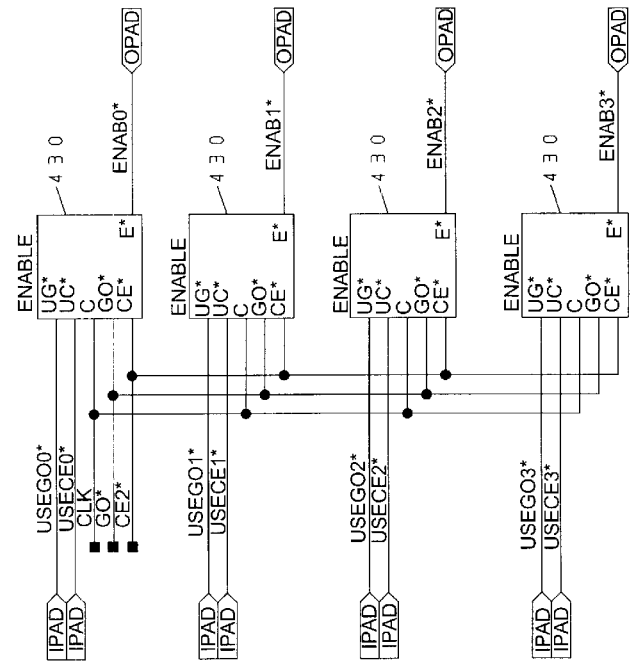
Figure 4C:
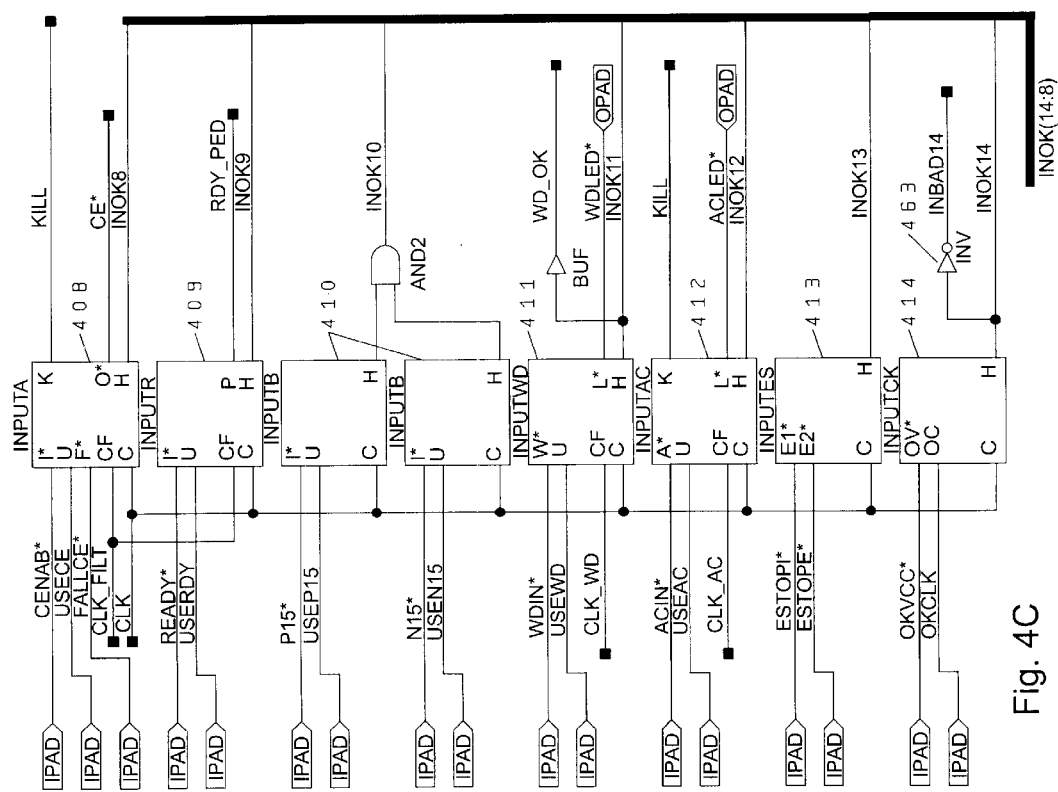

FIGS. 4B and 4C illustrate the MAIN_IN section, which for the FPGA design example contains 1 Type-ATO, 7 Type-A, 1 Type-CE, 1 Type-R, 2 Type-B, 1 Type-WD, 1 Type-AC, and 2 Type-ES input sections, which are exemplified by 406, 407, . . . , 413. The input subsection that checks circuit health is exemplified by the INPUTCK subsection 414. The figures illustrate how the kill input signals IN0*, . . . , IN7*, CENAB*, READY*, P15*, N15*, WDIN*, ACIN*, ESTOPI*, ESTOPE*, OKVCC*, and OKCLK are distributed to the INPUTATO, INPUTA, INPUTR, INPUTB, INPUTWD, INPUTAC, INPUTES, and INPUTCK subsections. The primary function of each of these subsections is to generate an "IN_OK" signal that provides an active high health status which is generated from the configuration signals and states of the corresponding inputted signals. Additional inputs to the sections are the programming pins USE0, . . . , USE7, USECE, USERDY, USEP15, USEN15, USEWD, USEAC, FALLO*, . . . , FALL7*, and FALLCE*, which establish how the individual subsections are to function. Another additional input into many of these subsections is KILL, which is used as a temporary inhibit by falling-type inputs. An input that goes to the INPUTATO subsection is GO*, which informs the subsection to begin a timeout count in order to kill the circuit in the event that IN0* does not become active within the eight bit count of the CLK_ATO signal. Finally, based on programming (see above), the generated clocks CLK, CLK_FILT, CLK_AC, and CLK_WD are inputs to the subsections.

Now, sixteen outputs from these internal input subsections form a fifteen-bit bus, INOK[14:0], which is used as a basis for the kill equations (KILL_EQ section). Other outputs from these sections are the RDY_PED signal from the INPUTR subsection, the CE* signal from the Computer Enable subsection, WD_OK, the LED drive signals (WDLED*, ACLED*), and the INBAD14 signal that is the inverted INOK14 signal.

FIG. 4D illustrates the MOTORS_ON_IN, GO_IN, and a portion of the START_EQ sections. Motors-on button signals MOE* and MOI* and go signal GO_IN* are routed to additional internal subsections, which are INPUTMO 415 and INPUTGO 416, respectively. The primary function of the INPUTMO section is to monitor the two motors-on signals MOE* and MOI* and generate a MOTORS_ON pulse in response to the pressing of one of the buttons. Note that the design demonstrates two motors-on signals (Type MO inputs) selected from the input sources and does not explicitly demonstrate a monitor contact signal (Type MC input) being used, but this addition will be discussed in the INPUTMO subsection description. The primary function of the INPUTGO section is to monitor the incoming GO IN* signal and generate a filtered, local, internal version, GO*.

FIG. 4D also shows that the primary output FPGA_GO* signal is generated from the buffered, inverted output of a flip-flop with clock enable, FDCE 417. The clock enable of the flip-flop is the MOTORS ON signal, and this signal may be inhibited by the MO_CLR signal (the CLR input to the INPUTMO subsection), which is provided by the NAND2 gate 421 whenever either POWER_UP* or DYING* is active.

Whenever the KILL signal is inactive, the enabling of the clock by the MOTORS_ON signal asserts the output of the FDCE 417, thereby asserting the output signal FPGA_GO*. Activation of the KILL signal, on the other hand, clears (de-asserts) the output of the flip-flop, thereby de-asserting the output signal FPGA_GO*. Descriptions for the generation of the KILL, POWER_UP*, and DYING* signals are forthcoming.

FIG. 4D also shows that an internal START signal is generated from filtered versions of the GO_IN* input signal subject to logic equations formed from other internal control signals. Specifically, the filtered versions, GO and its inverse GO*, are used as the clear and data inputs of the FDCE 418. An active GO signal simply clears the FDCE, thereby de-asserting its output and the output of the AND4B1 419, which in turn de-asserts the START signal. Note that the AND4B1 gate is an AND gate with four inputs, the lower input of which is inverted as shown in the figure by the bubble on the gate. (Hence, the "B1" is appended to the "AND4", which demonstrates an example of standard gate naming practice employed by the Xilinx component library.)

On the other hand, an inactive GO signal permits an inactive GO* signal (high) to be clocked through the FDCE whenever a RDY_PED clock enable pulse is present. The RDY_PED signal is a pulse of one clock period that is generated by the INPUTR subsection shown in FIG. 4C. (A complete description of this signal is provided in the INPUTR subsection description. Also, note that the "PED" suffix denotes "positive-edge detected", and the "NED"

suffix denotes "negative-edge detected." In general, either of the edges is conveniently found using two flip-flops and an AND2B1 gate.) Additional signals POWER_UP*, DYING*, and KILL_SW are inputs to the AND4B1, which is used with the FD 420 to generate START signal. The conditions that must exist in order for START to be active are given by the following:

a) GO (and hence GO*) is inactive;
b) RDY_PED is active for at least one CLK period so that the inactive (high) GO* signal is clocked through the FDCE;
c) POWER_UP* is inactive;
d) DYING* is inactive;
e) KILL_SW is inactive; and
f) The active output of the AND4B1 is clocked through the FD flip-flop. Descriptions regarding the use of the START and the generation of KILL_SW signals are forthcoming.

Finally, regarding FIG. 4D, it is important to recall that the output signal FPGA_GO* amounts to one condition required to energize the emergency-stop circuit. Additional conditions, embedded within redundant circuitry external to the FPGA (e.g. MAIN_OUT), combine with it to energize the circuit, the status of which is fed back to the FPGA at input pin GO_IN* . (Refer to FIG. 3.)

FIG. 4E illustrates a remaining portion of the START_EQ section. This is the circuit that generates the CE2* signal, which is the actual signal sent to the ENABLE secondary output sections (shown in FIG. 4F). The CE2* signal is the CE* signal that has been validated by a desired means that depends on the application at hand. The circuit can be programmed to disable CE2* whenever the computer watchdog is not healthy or whenever the state is not ENERGIZED or DYING. The selection of these two restrictions is made by programming the two pins CE_USE_WD and CE_USE_ST.

The signal 422 to the inverting input of the OR2B1 gate 423 controls whether CE* is passed on to CE2*. Whenever the signal is low, the output of the OR2B1 gate is high, which means that CE2* is disabled regardless of CE*. On the other hand, whenever the signal is high, the output of the OR2B1 gate is equal to CE*. Therefore, description of this part of the circuit will involve what makes the 422 signal high to pass CE* on to CE2* or low to disable CE2*.

The 422 signal is the output of the AND2 gate 424, which means that CE* is passed only when both outputs of the OR2B1 gates 425, 426 are high. The simplest case for this is when both CE_USE_WD and CE_USE_ST are inactive (low), because these signals propagate in an exclusive way through the inverted inputs of their respective OR2B1 gates to activate the corresponding outputs. As such, the remainder here is therefore devoted to the individual cases of where the two programming inputs are active.

First, consider that CE_USE_WD is active, which propagates through the IFD flip-flop 427 as active. This permits the WD_OK signal to be passed on to the upper input of the AND2 gate 424. The WD_OK signal and hence the output of the upper OR2B1 gate 425 is active only when the computer watchdog is active or configured for IGNORE. The motivation here is that while CE* may be active, the computer may have ceased functioning. In this case, the computer watchdog signal will cease to strobe, which will lead to the WD_OK signal becoming inactive. Note that the design accommodates the case where the computer watchdog is not used (set to IGNORE), which means that the WD_OK signals is continuously high (see INPUTWD subsection) thereby effectively removing the restriction placed by CE_USE_WD.

Secondly, consider that CE_USE_ST is active, which propagates through the IFD 427 as active. This permits the output of the FDCE flip-flop 428 to propagate to the lower input of the AND2 gate 424. Now, the output of the FDCE flip-flop is active and hence the output of the lower OR2B1 gate 426 is active only when the state of the circuit is either ENERGIZED or DYING. This is accomplished by using the NAND2 gate 429 as the data input for the FDCE 428, where the NAND2 output is high when either DYING* or GO* is active. The data input is subject to the state of the circuit not being POWER_UP, because the clear input to the 428 flip-flop is controlled by the inverted POWER_UP* signal. The motivation for this branch is twofold: (1) to specify the states when CE* has an effect, and (2) to provide the ability to place an upper limit on how long the power-loss period could last and hence, the reactionary period for devices programmed for USE_CE.

FIG. 4F illustrates the final portion of the START EQ main section, which is the four enable sections that output the ENAB0*, . . . , and ENAB3* signals based upon the input configuration signals USEGO0*, USECE0, . . . USEGO3*, and USECE3*. The ENABLE 430 sections use these inputs together with the GO*, CE2*, and CLK clock signals to generate the appropriate ENAB0*, . . . ENAB3* signals that control the secondary outputs of the circuit.

Figure 4H:
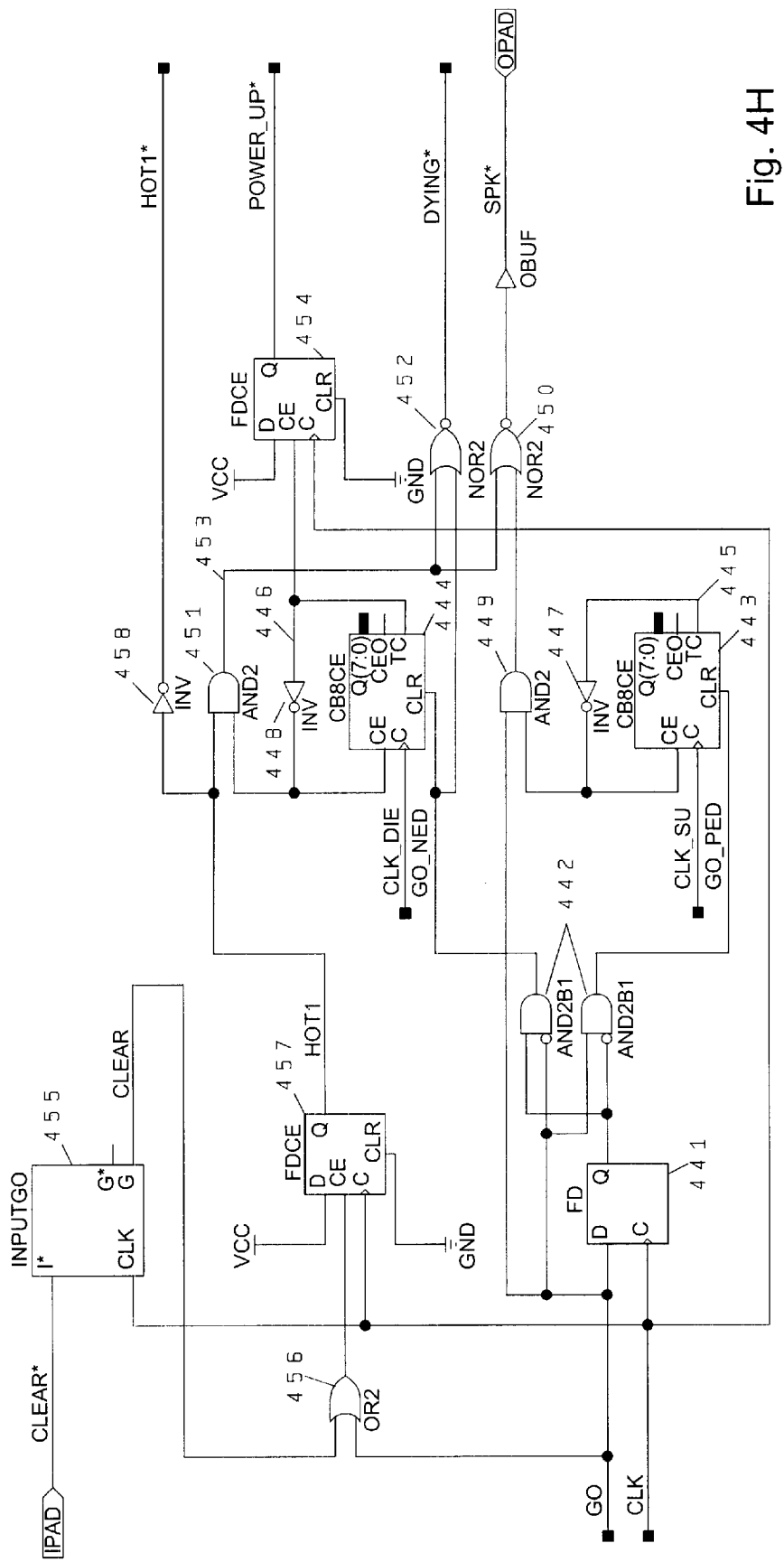
Figure 4L:
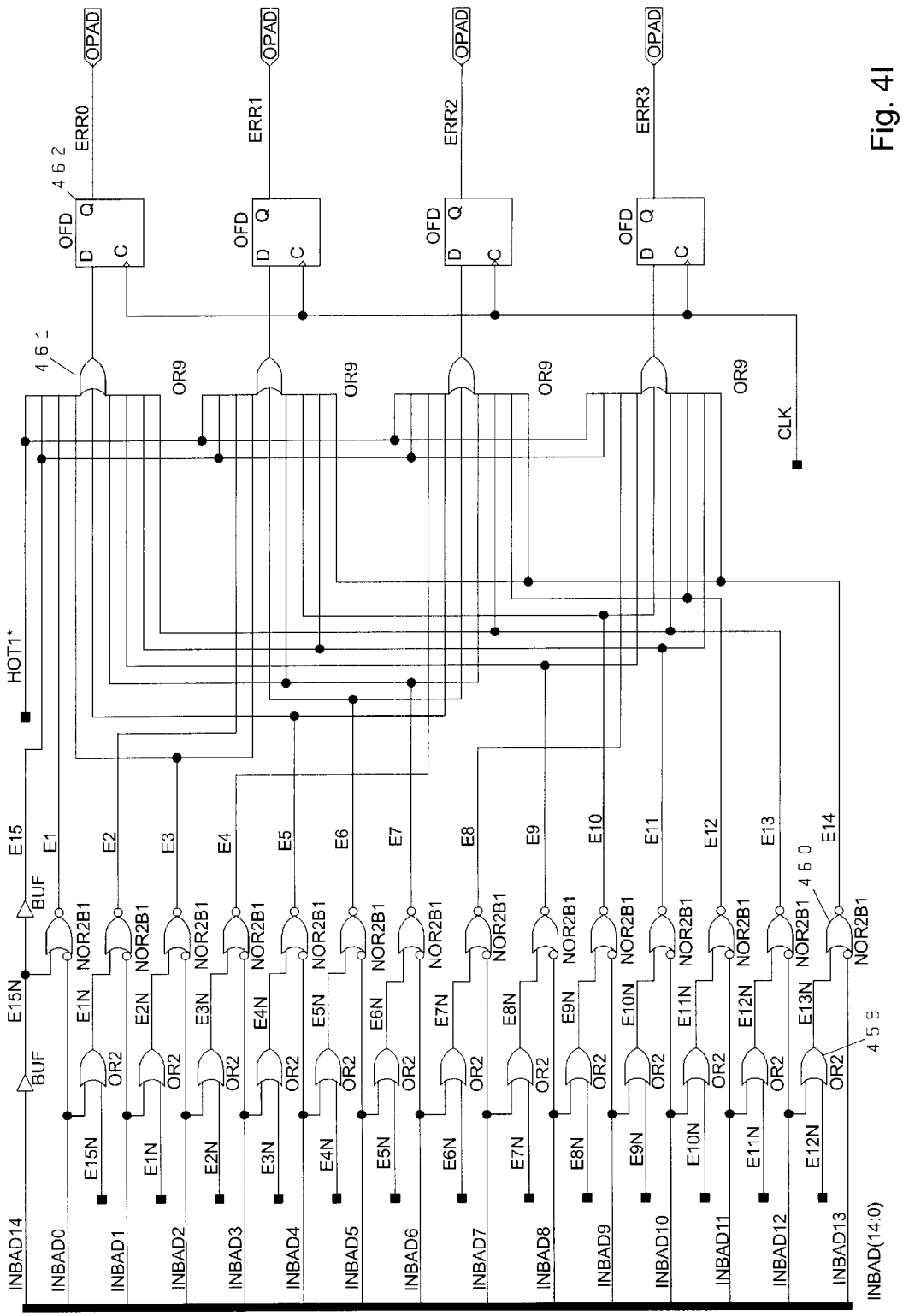

FIG. 4G illustrates a portion of the KILL_EQ main section, which is the logic required to generate the KILL, WAIT*, and INBAD[..] signals. At the far left, fourteen of the fifteen INOK signals are inputs to two AND7 gates 431, which drive the inputs of a NAND2 gate 432. The output of the NAND2 gate therefore is an active high signal that is indicative of the de-asserting of one or more of the INOK signals. This signal is then fed into a positive-edge detection circuit consisting of two FD flip-flops 433, 434, and an AND2B1 gate 435. The output of the positive-edge detection is the KILL_SW_PED signal, which is combined with CLEAR via an OR2 gate 436 in order to provide a clock enable signal necessary to latch the state of the INOK signals. The latching is accomplished by a fourteen-bit settable flip-flop FD14SE* 437, which inverts at output the signals to create fourteen bits of the fifteen-bit bus INBAD[14:0]. The FD14SE* circuit possesses a set input, GO_PED, which sets all of the flip-flops, thereby clearing the inverted outputs, INBAD[13:0]. (The GO_PED signal is shown in FIG. 4H.) The output of the first flip-flop 433 of the positive-edge detection circuit is combined with the fifteenth, non-latched bit INBAD14 using the OR2 gate 438 in order to create the KILL_SW signal. This signal when asserted indicates that at least one of the input subsections in MAIN_IN has an inactive INOK bit. The START and GO signals are combined using a NOR2 gate 439 to create a signal that is high whenever neither START nor GO is active. The output of the NOR2 gate combines with KILL_SW using an OR2 gate 440 in order to create the KILL signal, which is then buffered to create the WAIT* signal.

From the figure, it is clear that the KILL and WAIT* signals are not active at the same time since they are equivalent (buffered) and of opposite polarity. Furthermore, due to the circuitry, the KILL signal is de-asserted and the WAIT* is asserted if and only if all of the input subsections output active INOK signals and either the START or GO signal is active. Finally, note that the KILL signal is used in other portions of the logic to clear FDCE flip-flop 417 so that FPGA_GO* gets de-asserted, and it is used so that falling-type inputs (e.g. INPUTA 407) are reset in preparation for startup.

FIG. 4H illustrates the CLEAR_IN section and the remaining logic of the KILL EQ section that is used to create the CLEAR, HOT1*, POWER_UP*, DYING*, SPK* signals. The signals GO_PED and GO_NED are generated here, which are the one CLK clock period pulses that signal the rising and falling edges of the GO signal, respectively. These signals are generated using the output flip-flop of the INPUTGO 416 subsection, the FD 441, and the AND2B1 gates 442. The GO_PED and GO_NED signals are used to clear two eight-bit counters 443, 444, the first of which is used as a timer that runs when the circuit is energized and the second of which is used as a timer that runs when the circuit is killed. Both timers are configured to run until they reach the terminal count of 255, at which time the active high terminal count signals 445, 446 use the inverters 447, 448 to disable the clocks CLK_SU, CLK_DIE from counting further. Therefore the GO_PED, GO_NED signals initiate the counting by clearing the terminal count signals, which in turn re-enables counting, starting from zero. Programming the interval for the DYING state amounts to programming the CLK_DIE signal at the CLKDV 402 output or alternatively, selecting the number of bits for the counter. Finer resolution can be obtained by additional logic that halts the count a value other than 255.

The scenario of counting proceeds as follows. An inactive GO signal becomes active, which generates a GO_PED pulse that clears the eight-bit counter 443. The counter begins counting, and during this period, the terminal count signal is inactive but its inverse is high, which is combined with the GO signal at the AND2 gate 449 to create an active high speaker signal that proceeds to the NOR2 gate 450. This gate is a NOR gate to accommodate the active low speaker signal SPK*. The speaker signal therefore is active while the counter counts, and this based on the programmed clock CLK_SU provides a 2048*256/CLK duration chirp at energize time, which equates to approximately a ¼ second period for a 2 MHz CLK signal. This portion of the circuit basically remains dormant until such time as the GO signal becomes inactive, which generates a GO_NED pulse that clears the eight-bit counter 444. This counter begins counting, and during this period, the terminal count signal is inactive but its inverse is high, which is combined with the HOT1 signal at the AND2 gate 451 to create an active high speaker signal that proceeds to the NOR2 gate. 450. The second control into the NOR2 gate works in a way similar to the first, emitting a longer chirp in this case in response to the killing of the circuit. The duration of the kill sound is 16384*256/CLK, which is about a 2 second sound for a 2 MHz CLK signal.

A second responsibility for this portion of the logic is to generate the DYING* signal, which is used to prevent the immediate restarting of a freshly killed circuit (see above for asserting START and MOTORS_ON). The DYING* signal is generated by using the NOR2 gate 452 to combine the GO_NED signal with the kill speaker signal 453, which provides a dependable 2 second restart inhibit for the baseline 2 MHz CLK signal that prevents START and MOTORS_ON from being asserted.

A third responsibility for this portion of the logic is to generate a POWER_UP* signal, which is used to prevent immediate energizing following a power-up/reset event and also to inhibit the first motors-on until such time as all digital filters have been initialized. This signal is low (active) whenever the logic has been configured and has just begun operation following power-up/reset. This is because all flip-flops begin operation in a reset state. Also at power-up/reset, the counter 444 begins counting from zero, since all of its internal flip-flops are also reset. (Note that the speaker signal is not asserted immediately following power-up/reset because of the HOT1 signal which is not asserted until first motors-on.) The counter proceeds until it reaches its terminal count, which occurs at approximately 2 seconds from power-up/reset when using the 2 MHz CLK signal. The terminal signal then enables the clock on the FDCE 454, which de-asserts POWER_UP* for the remainder of the session. While asserted, the POWER_UP* prevents START and MOTORS_ON from becoming asserted (see above).

FIG. 4H also illustrates the logic used to generate the CLEAR and HOT1* signals. The CLEAR* signal comes from an input pad and is filtered by an INPUTGO 455 subsection, which provides the desired de-bounce filtering. The resulting inverted signal, CLEAR, is used as one of the sources that latch new INBAD signals at the fourteen-bit flip-flop 437 (see above), and it is also used as one of the sources that activates the HOT1* signal. The CLEAR and GO signals are inputs of an OR2 gate 456, the output of which enables the clock of the FDCE 457 flip-flop. With the clock enabled, the FDCE asserts the HOT1 signal, which since power-up/reset had been low. When active, the HOT1 signal and its inverse HOT1*, obtained by the inverter 458, signify that the circuit has been energized at least one time (first motors-on) or that the clear button has been pressed.

FIG. 4I illustrates a portion of the STATUS_OUT section, which is the manipulation of the fifteen-bit INBAD [14:0] bus into a fifteen-bit E[15:1] bus and subsequently into a four-bit ERR[3:0] bus. The transformation of INBAD into E is accomplished by a cascading technique that employs local signals E15N, E14N, . . . E1N together with the thirteen OR2 459 and fourteen NOR2B1 460 gates. The transformation permits only one E bit to be active at a time, by prioritizing the INBAD signals with INBAD14 having highest priority, INBAD0 having second highest priority, INBAD1 having third highest priority, and so on, until INBAD13 is found to have the least priority. Given that the highest priority active signal is INBADn, the corresponding, active signal is En+1.

As an example, consider that INBAD3 and INBAD5 are both active, and that no other INBAD signal is active. From the top of the figure, it can be seen that when INBAD14 is inactive, E15 and E15N are also inactive. On the next row, since INBAD0 is also inactive, then E1 is inactive, because a high output from the NOR2B1 gate requires low and high on the upper and lower inputs, respectively. In fact, at any given NOR2B1 gate, a low signal on the upper input denotes that no higher priority signal is active, while alternatively a high signal denotes that one is. The cascading OR2 gates provide this upper signal by successively OR-ing a new INBAD signal with the previously OR-ed signal of higher priority. Therefore in the example, E2N is low, since no higher priority INBAD signal is active. Now, because INBAD3 is active, then E4 and E4N are both active. The fact that E4N is active prohibits any of the lower priority En's from being active. For example, E6 is not active, even though INBAD5 is active in the example.

The transformation of E[15:1] into ERR[3:0] is a straightforward hexadecimal conversion using the OR9 461 gates and the OFD flip-flops 462, where ERR0 is the $2^0$ digit, ERR1 is the $2^1$ digit, ERR2 is the $2^2$ digit, and ERR3 is the $2^3$ digit. In the example, E4 asserts ERR2, and the other three bits are de-asserted. A deviation from this transformation exists whenever the HOT1* is inactive (high), which denotes that first motors-on has not yet occurred. In this case, the ERR[3:0] bus asserts all four bits, which drives the power-up/reset error code of 15. In the FPGA design example, the error code of 15 performs double duty by being active when HOT1* is active and also when there is an internal fault via the INPUTCK subsection 414, but of course, these could be separated, which would require an additional ERR bit in the example.

Two of the digital filters used in the invention are the DEBOUNCE and DELAY-RISE components. They are straightforward designs that are not illustrated, but their functionality is provided here. The non-inverting DEBOUNCE circuit outputs a signal that is synchronous with CLK and changes only in response to an incoming signal that is constant for a certain number of CLK2 clock periods (e.g. four). The non-inverting DELAY-RISE filter is explained in detail in the INPUTA subsection definition.

Figure 5:
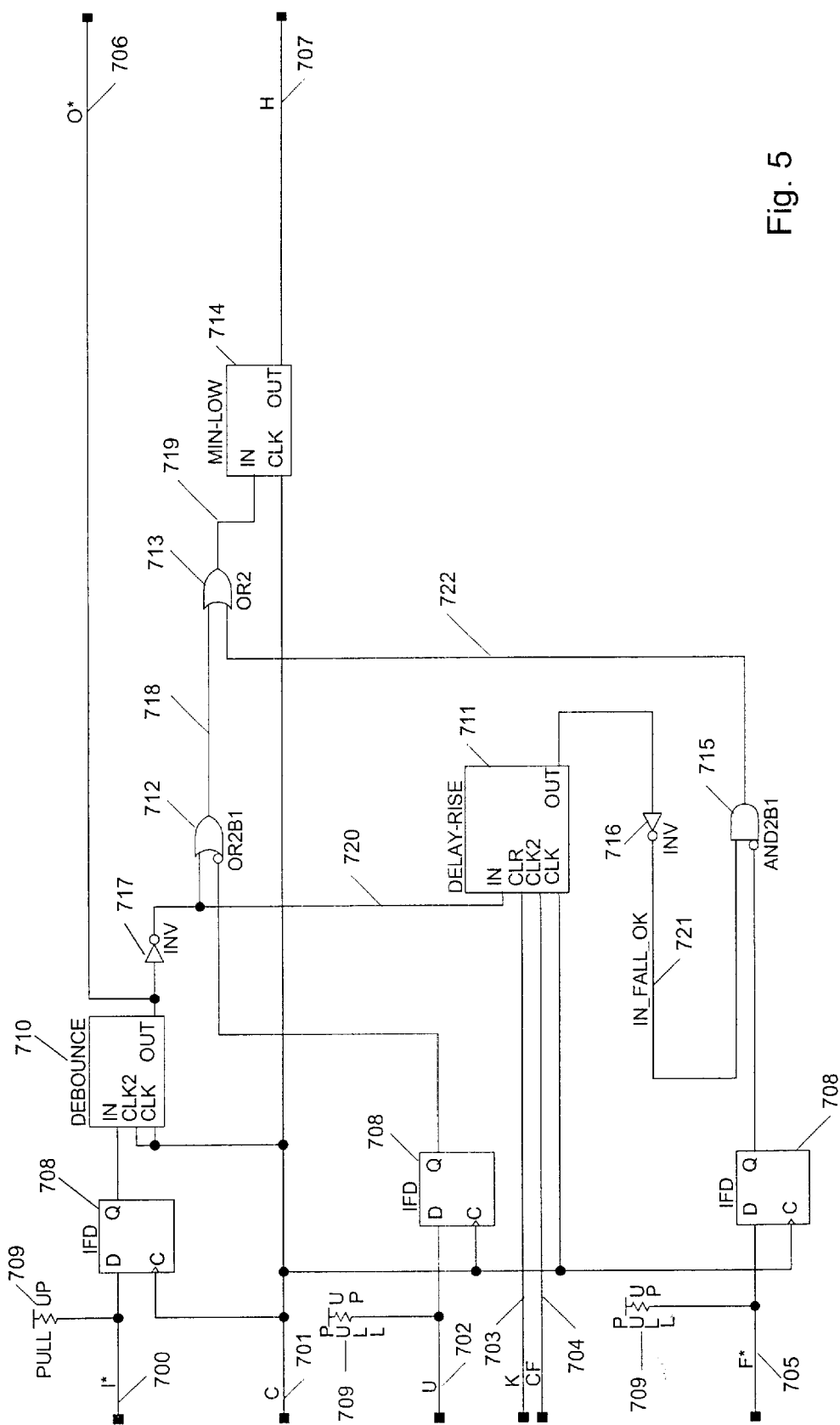
FIG. 5 illustrates the INPUTA FPGA subsection schematic of the preferred embodiment.

FIG. 5 illustrates the INPUTA subsection of the FPGA logic that is a circuit which monitors signals coming from a Type-A input in order to generate a representative health signal. Inputs to this subsection are the three input pads, I* 700, U 702, F* 705, two clock signals, C 701, CF 704, and the K 703 signal. The outputs from this subsection are the filtered O 706 signal and the health H 707 signal.

The setting for the U input determines the functionality of the INPUTA subsection. The inverting input of the OR2B1 gate 712 comes from the U 702 signal that is synchronized by IFD 708 and also is connected to a redundant, internal pull-up resistor 709. It is important to note that these internal resistors shown throughout the design are redundant, because in this example, an additional pull-up resistor resides within the circuit but external to the FPGA chip. The signals internal to the FPGA are pulled up in such a way as to kill the circuit should for some reason an incoming signal be lost.

Whenever the U input is configured to IGNORE, the synchronized, inactive U signal propagates to make the output 718 of the OR2B1 gate high, the output 719 of the OR2 gate 713 high, and finally the output of the MIN-LOW 714 high, which is the H 707 health signal. In this way, the health signal remains active as long as the U signal is inactive, regardless of the state of the other inputs. Otherwise, when the U input is active (configured for USE or FALL), it does not contribute to an active high health signal, which means that the source of the active H signal must come from the other inputs. In this regard, the remainder here is devoted to the case when U is active in order to specify how H is otherwise determined.

The I* signal is connected to a redundant pull-up resistor 709 and is clocked at the input pad by an input flip-flop IFD 708 in order to make the signal synchronous with the local clock. The registered signal then proceeds to a DEBOUNCE circuit 710 for filtering, which outputs the active-low output signal O* 706. This signal is also inverted 717 to provide an active high signal 720, which proceeds to two places in order to determine health: (1) the non-inverting input of the OR2B1 gate 712, and (2) a DELAY-RISE 711 circuit. For the first case, an active signal 720 propagates through the OR2B1 the make the output 718 high, through the OR2 gate 713 to make the output 719 high, and finally through the MIN-LOW filter 714 to make the H health signal high. In this way, the health signal remains active when the I* signal is active, regardless of the state of K, CF, and F*.

A second configuration signal, F* 705, determines whether the DELAY-RISE branch contributes to health, whenever the I* signal is not yet active. The F* signal is likewise connected to a redundant pull-up resistor 709 and registered using the IFD 708. The registered version of the F* signal then proceeds to the AND2B1 gate 715, where it controls whether the output of the DELAY-RISE proceeds to the OR2 gate 713. When the F* signal is active, the AND2B1 gate sends the IN_FALL_OK 721 signal through to the OR2 gate 713 enabling the DELAY-RISE branch, and when it is inactive, output 722 of the AND2B1 gate is forced low, which disables the DELAY-RISE branch.

Consider that the F* signal is active and that the IN_FALL_OK signal is generated from the inverse 716 of the output of the DELAY-RISE circuit 711. The objectives of the DELAY-RISE circuit are to (1) reset to low when the K signal is detected and (2) set to high after a two CF 704 period delay following the detection of the positive edge of the input signal 720. Because of the inverter, these objectives equate to (1) set IN_FALL_OK to high when the K signal is detected and (2) reset IN_FALL_OK to low after a two CF period delay following the detection of the positive edge of the 720 signal. Therefore, the K input (equates to KILL in FIG. 4) asserts the H signal by way of IN FALL_OK. But this is only temporary, since the IN_FALL_OK signal will deactivate once the inactive-to-active transition of the I* signal propagates through the DEBOUNCE and DELAY-RISE circuits. Note that the H health signal remains active through a transition phase where the upper input of the OR2 gate 713 becomes active before the lower input goes inactive, thereby preserving active health signals 719, 707.

It is important to note the rationale for employing the DELAY-RISE circuit. This circuit filters out low-frequency signal bouncing that may come through the DEBOUNCE filter during the inactive-to-active transition of the I* signal. The DEBOUNCE filter on its own works well in filtering out noise that contains a high frequency content (e.g. hundreds of kHz). Lower frequency filtering is not done by the DEBOUNCE, because any inactive edge detected for the upper branch of this circuit should de-assert the H signal whether or not neighboring active edges exist due to a slowly bouncing signal. However, for the lower branch, when a toggle switch is used as a falling-type kill input, an associated I* signal may take twenty to fifty microseconds to completely make an inactive-to-active transition, bouncing several times in the interim. This causes some instability in the 718 input of the 713 OR2 gate during the aforementioned transition phase. The DELAY-RISE circuit accommodates this by keeping the other OR2 input 722 asserted for a duration equal to the two CF period delay (4 milliseconds for a 2 MHz CLK, where CLK_FILT=CLK/4096).

The transfer function of the MIN-LOW circuit 714 is a non-inverting one that immediately passes an active-to-inactive (high-to-low) transition. The inactive-to-active (low-to-high) transition, on the other hand, is delayed to ensure that a minimum inactive (low) time is provided for the output H. In the design, an inactive pulse can be no less than a four C clock period. The motivation for this is to ensure that there is adequate time to latch the INBAD signals using the FD14SE* 437.

The FPGA internal circuit used for a Type-B input is similar to the INPUTA circuit, except that some parts are removed. Referring to FIG. 5, the K 703, CF 704, F* 705 inputs are removed, and the O 706 output is removed. The DELAY-RISE circuit 711 is omitted as well as the IFD 708 and pull-up resistor 709 for the F* signal. The AND2B1 715 and OR2 713 gates are removed, and the output feed 718 of the OR2B1 gate directly drives the MIN-LOW circuit 714 to produce the output health signal, H 707. These deletions remove the falling-type functionality from this type subsection but preserves the USE-vs.-IGNORE programmability.

Figure 6:
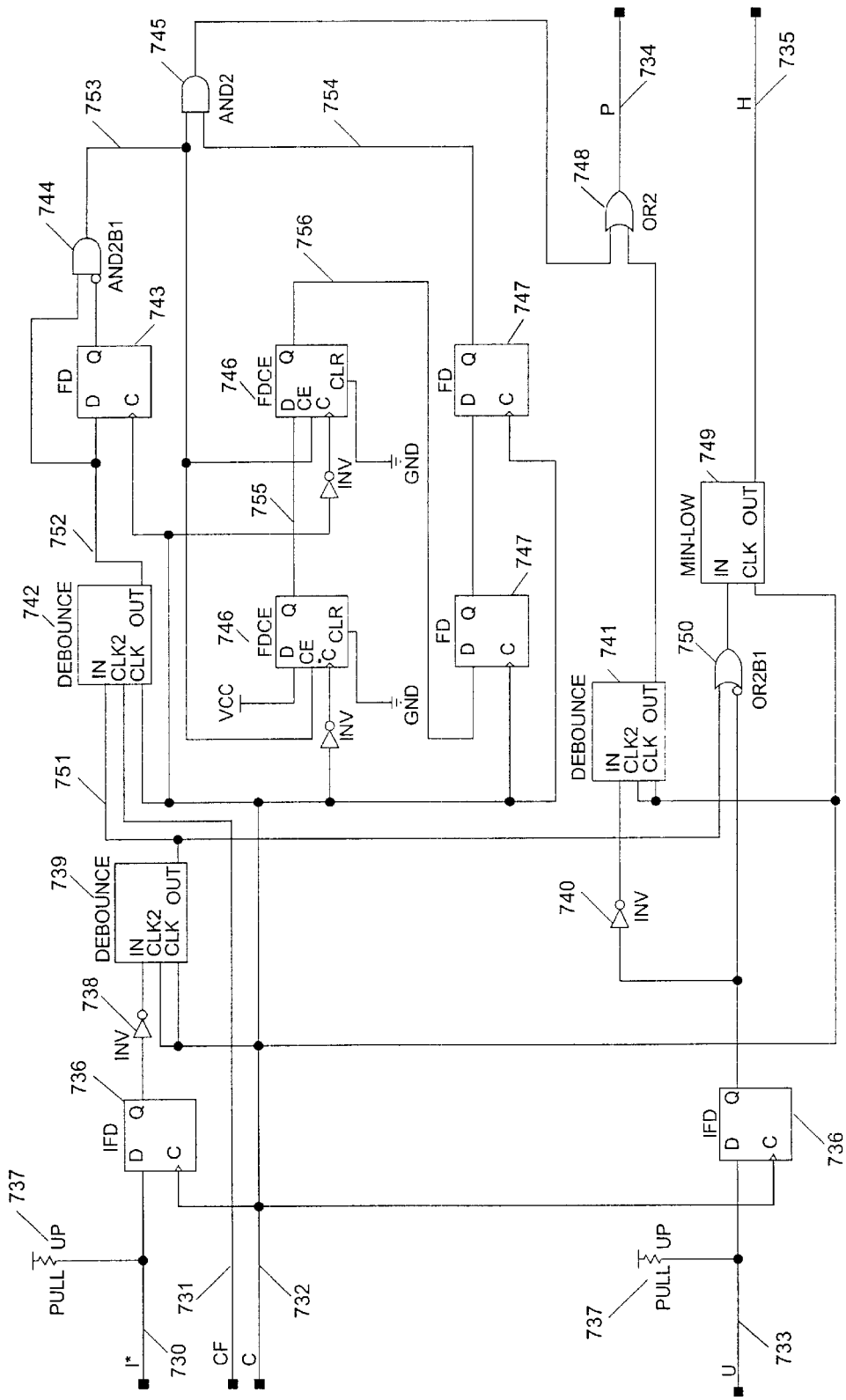
FIG. 6 illustrates the INPUTR FPGA subsection schematic of the preferred embodiment.

FIG. 6 illustrates the INPUTR subsection, which provides the functionality of a Type-B input with the added feature of positive-edge detection for a computer ready signal. The positive-edge detection circuitry here generates a one C clock period pulse at P 734 that is used to start the process of energizing the emergency-stop circuit (see above). The inputs to the circuit are the I* 730, CF 731, C 732, and U 733 signals, and the outputs are the P 734 and H 735 signals.

The functionality of the INPUTR subsection relating to the generation of a health signal, H, is the same as that provided by the INPUTB subsection. The key components that provide this comparable functionality are the I* 730, C 732, U 733, H 735, and DEBOUNCE filter output 751 signals, together with the IFD 736, PULLUP 737, Inverter 738, DEBOUNCE 739, OR2B1 gate 750, and MIN-LOW 749 circuits.

Whenever this circuit is not being used, i.e. U is inactive, the P signal is active continuously due to the propagation of an inverted U signal to the lower input of the OR2 gate 748. This propagation is due to the PULLUP 737, IFD 736, inverter 740 and DEBOUNCE 741 circuits. In this regard, the remainder here is devoted to the case when U is active in order to specify how P otherwise becomes active.

The active-low I* signal propagates to create an active-high signal 751 that is provided by the first DEBOUNCE circuit 739. The active-high signal is used after additional filtering to generate the positive-edge detecting signal, P 734. For the same reason that the DELAY-RISE circuit was used in the INPUTA subsection, a second DEBOUNCE circuit is employed here that utilizes a lower clock frequency (CF 731) for de-bounce filtering so that the positive-edge detection circuitry does not report multiple positive-edges in response to the bouncing input from a toggle-type switch. The output 752 of the second DEBOUNCE circuit is the actual signal that is analyzed for inactive-to-active transitions.

Because the output 752 is synchronous with clock C (it is the output of the DEBOUNCE circuit 742), the combination shown of it with the FD 743 and the AND2B1 gate 744 yields a one C clock period pulse 753 whenever a positive edge is detected. This pulse is the upper input of an AND2 gate 745, which requires the asserting of a lower input 754 in order to output a pulse at P 734. The lower input begins operation in a low state in response to a power-up/reset event, as do the upstream FD 747 and FDCE 746 flip-flops. This part of the circuitry for the INPUTR subsection is responsible for requiring the three positive-edges from the computer ready signal after a power-up/reset event.

Specifically, the 753 signal is the clock enable for both FDCE flip-flops, and when the first positive edge occurs, the output signal 755 becomes high, which drives the input of the second FDCE flip-flop. Once the second positive edge occurs, the output 756 of the second FDCE flip-flop also becomes high, which after some delay propagates to the AND2 gate. The delay is provided by the FD flip-flops 747 in order to ensure that the 754 signal does not become active while 753 is active in response to the second positive edge. Once the 754 signal is high, it remains high for the remainder of the session, and further positive edges detected 753 propagate to provide the active P signal 734 required to start the emergency-stop circuit.

Figure 7:
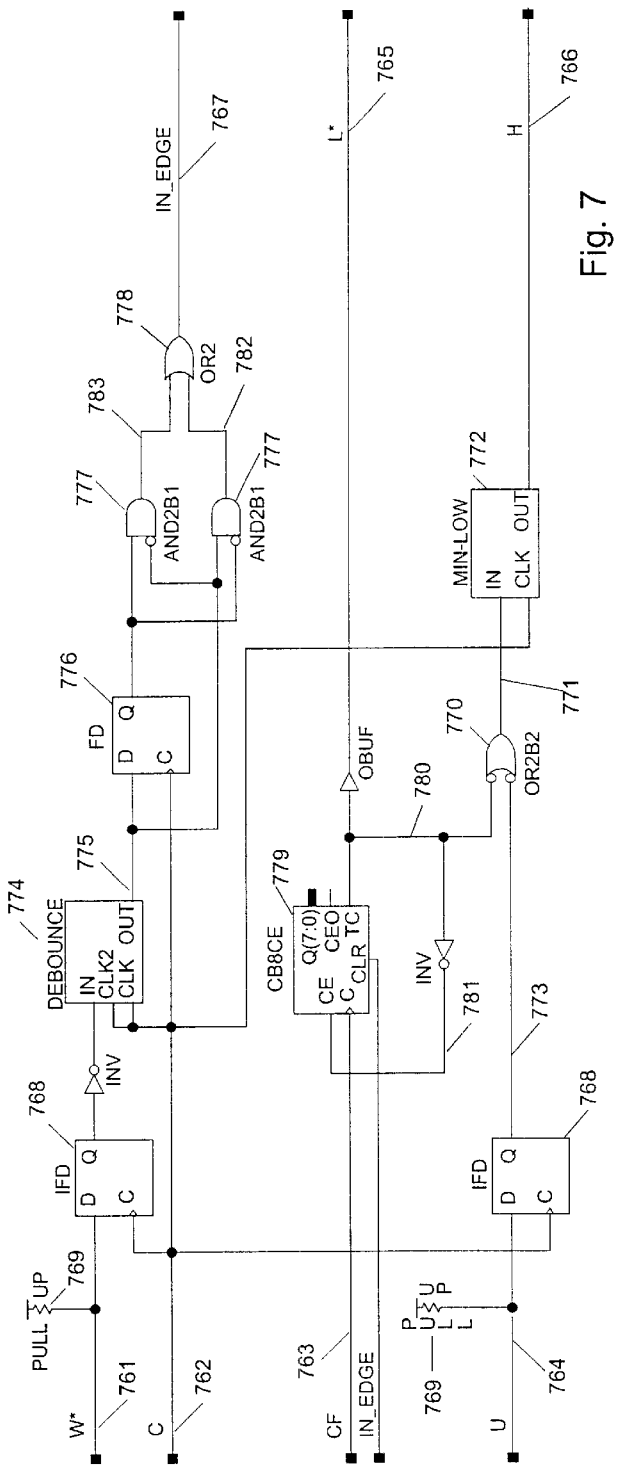
FIG. 7 illustrates the INPUTWD FPGA subsection schematic of the preferred embodiment.

FIG. 7 illustrates the INPUTWD subsection of the FPGA digital logic. This subsection handles the computer watchdog inputs in order to generate an associated H health signal. The inputs to the subsection are the W* 761, C 762, CF 763, and U 764 signals, and the outputs are the L* status signal 765 and the H health signal 766.

In a manner similar to the other input subsections, the U signal is connected to an internal PULLUP resistor 769 and is synchronized by an IFD flip-flop 768. The resulting signal feeds the an inverting input 773 to an OR2B2 gate 770. Whenever the computer watchdog is not used (U is inactive), the signal 773 is low, which propagates through the OR2B2 gate as high 771 and through the MIN-LOW circuit 772. This is done in order to set the H health signal to a continuous high value that does not depend on the strobing of the W* signal. In this regard, the remainder here is devoted to the case when U is active in order to specify the conditions necessary for a strobing W* to set the health signal H.

In a manner similar to the other input subsections, the input signal, W*, is connected to a pull-up resistor 769 and is synchronized by an IFD flip-flop 768. The resulting signal is inverted and sent through a DEBOUNCE filter 774 to create a filtered active high signal 775. (Note that the actual value (high or low) of this signal is actually irrelevant, since only the transitions are monitored.) The output flip-flop of the DEBOUNCE filter together with the FD flip-flop 776, the two AND2B1 gates 777 and the OR2 gate 778 create an IN_EDGE signal 767, which provides a one C clock period pulse in response to either a positive 782 or a negative 783 edge of the filtered, active-high input signal 775.

The IN_EDGE signal is used to clear the counting of an eight-bit counter 779 that is clocked using the CF signal 763. As long as the counter does not reach the value of 255, its terminal count signal 780 maintains a low value, which is used to drive the L* signal necessary to illuminate an LED in the circuit, external to the FPGA. The health of the watchdog circuit depends on the terminal count signal maintaining a low value. This signal is therefore inverted by the upper inverting input to the OR2B2 gate 770 in order to create the active-high signal 771 and subsequently the active-high health signal H 766.

Therefore, in response to a W* signal that strobes at a sufficient rate, the terminal count signal 780 remains low. If, however, the input signal does not change, and the counter is able to attain the terminal value, then the terminal count signal goes high and its inverse 781 goes low to disable the counter. This locks in the high state of the terminal count signal until such time as another W* edge arrives. The high terminal count then propagates through to deliver a inactive (low) H health signal. For the design where CF is 2 MHz/16384, the eight-bit counter will expire in about 2 seconds.

Figure 8:
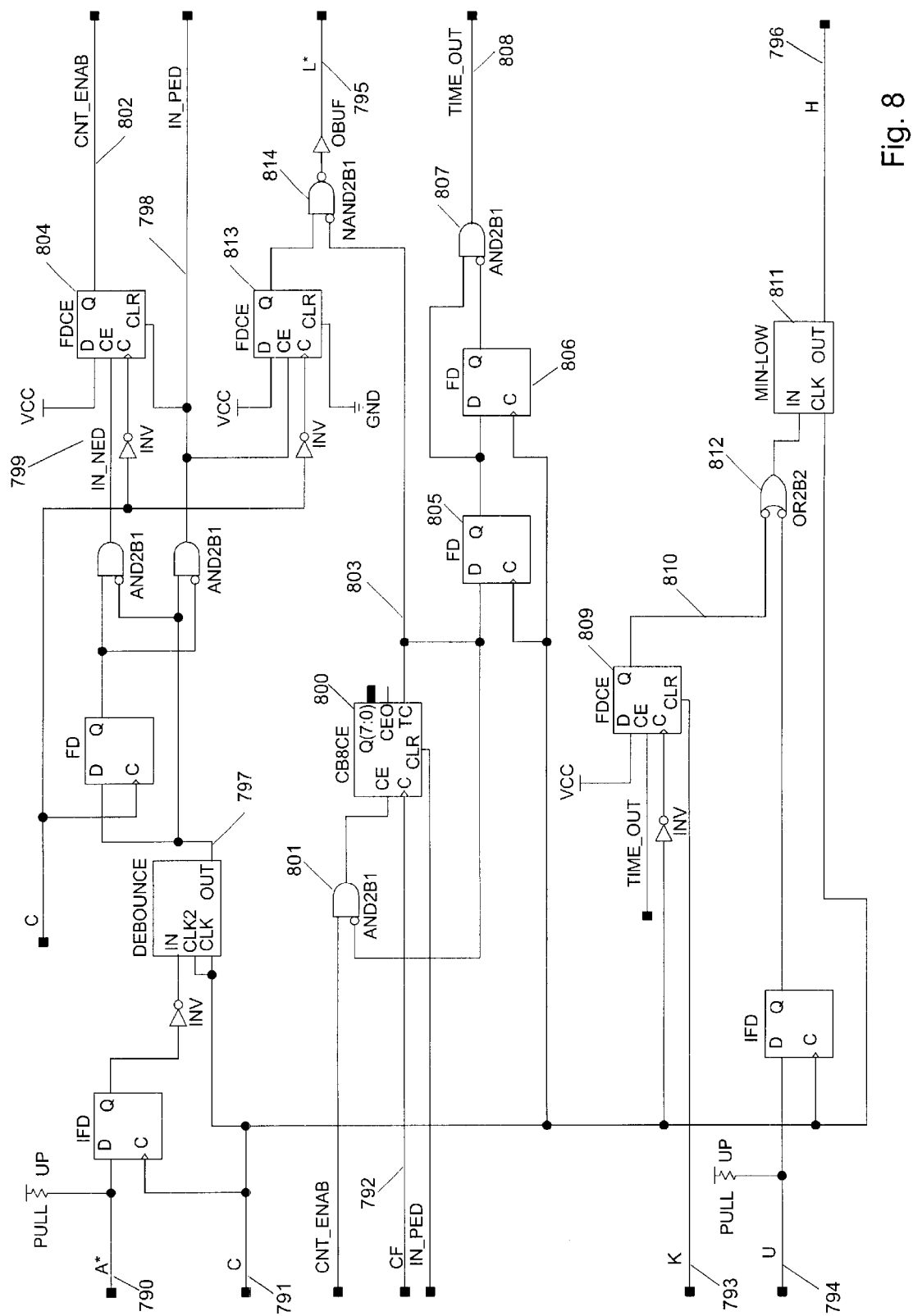
FIG. 8 illustrates the INPUTAC FPGA subsection schematic of the preferred embodiment.

FIG. 8 illustrates the INPUTAC subsection of the FPGA digital logic. This subsection handles the line sense for the AC motor power relay in order to generate an associated H health signal. The inputs to the subsection are the A* 790, C 791, CF 792, K 793 and U 794 signals, and the outputs are the L* status signal 795 and the H health signal 796.

In the same way that the U input controlled the INPUTWD subsection, the U signal here, when inactive, effectively disables this subsection by setting the H signal to a continuously high value. In this regard, the remainder here is devoted to the case when U is active in order to specify the requirements on the A* signal to generate and maintain a valid health signal H.

In the same way that W* was filtered to generate positive edge 782 and negative edge 783 detection, the A* is also filtered to generate positive edge 798 and negative edge 799 detection. However, the two circuits deviate in functionality at this point. For example, the value (high or low) of the input signal A* is relevant here, whereas the value of the signal W* in the INPUTWD subsection was not relevant.

Valid AC power is sensed whenever the incoming A* signal is active (low). However, an inactive A* by itself is not indicative of a failure in sensed AC power. For example, this is because the origin of the A* signal comes from an HCPL3700 optical isolator that may be experiencing a normal zero crossover period which is a period when the instantaneous value of the AC power is too low to generate an active A* (the LEDs of the optical isolator do not conduct, see D3 of FIG. 1). This period is brief in the AC power cycle, and so it is the function of this subsection to time the period of non-conduction in case it takes inordinately too long, which would be indicative of a genuine AC power failure. Now, because of the inversion of the incoming A* signal to create the filtered, inverted signal 797, the active period of AC power starts with an IN__PED pulse 798 and ends with an IN__NED pulse 799. Therefore, the period that must be timed begins with the IN__NED pulse.

An eight-bit counter 800 is used to time the period of non-conduction, and it uses the CF input clock 792 that is set to 2 MHz/128 for the design, which equates to a 16 millisecond timeout period whenever the counter reaches the terminal count of 255. The counter is not enabled at power-up/reset, even though the terminal count signal 803 starts low. This is due to the additional requirement of the AND2B1 gate 801 that the CNT__ENAB signal 802 should be high.

The CNT__ENAB signal is controlled by the edge detection signals 798, 799. Once a negative edge is detected, the IN__NED pulse asserts the clock enable of an FDCE 804 so that the CNT__ENAB signal 802 is asserted. The signal remains asserted until the next positive edge, when IN__PED clears the FDCE. Once the CNT__ENAB is enabled, the eight-bit counter begins counting from zero and continues until either it reaches the terminal count (at which time it stops) or until the next positive edge occurs, which simultaneously clears and disables the counter.

The portion of the subsection consisting of two FD flip-flops 805, 806 and an AND2B1 gate 807 is used to generate a one C clock period pulse TIME__OUT 808 in response to sensing the positive edge of the terminal count signal 803 of the eight-bit counter. The TIME__OUT signal is used to enable the clock of the FDCE flip-flop 809, which forces its output 810 high. This high signal propagates through the inverting input of the OR2B2 gate 812 to create an inactive (low) health signal H.

An active (high) health signal H is re-obtained only through the use of the K signal 793 (equates to the KILL signal in FIG. 4). The K signal is used to clear the FDCE flip-flop 809 so that its output 810 is low and so that it propagates through the inverting input of the OR2B2 gate 812 and MIN-LOW circuit 811 to create the active (high) health signal H. The H signal maintains its high value until such time as a TIME__OUT pulse occurs, which propagates as previously discussed.

A peripheral portion of the subsection controls the L* signal that is dedicated to drive the LED that is in the circuit but external to the FPGA. The terminal count signal 803 of the counter is the main source used, which should be low in order for the L* to be active. The additional components, FDCE flip-flop 813 and NAND2B1 gate 814, are required only to cover the case following a power-up/reset event, when the terminal count signal is low but no AC power is being sensed. The output of the FDCE is only high after at least one IN__PED pulse has occurred, which means that AC power is being sensed. The NAND2B1 gate combines the terminal count signal together with the signal that is indicative of the occurrence of at least one IN__PED pulse in order to create an always correct LED status signal.

The INPUTES subsection of the FPGA digital logic is straightforward and follows the same basic structure as an INPUTB that has had its programmability removed (i.e. no U signal). The subsection is used to filter and combine two emergency-stop button kill inputs that cannot be ignored.

The INPUTCK subsection of the FPGA digital logic is straightforward and follows the same basic structure as the INPUTES subsection but does not register the OC signal (no flip-flops used on the top-level OKCLK signal). For example, the purpose of the subsection is to monitor the logic power voltage and the oscillator that generates the top-level CLK signal, so that an over-voltage condition or a no-clock condition kills the emergency-stop circuit. Because the OKCLK signal should not be registered, the output of the INPUTCK subsection that propagates in FIG. 4 to INBAD14 cannot be registered and is generated from directly from INOK14 using the inverter 463 instead of the FD14SE* flip-flop bus 437. Note that the oscillator is checked off-chip by some means that monitors the CLK__CHECK signal and sends back the OKCLK signal to the FPGA. (See FIG. 4C.)

Figure 9:
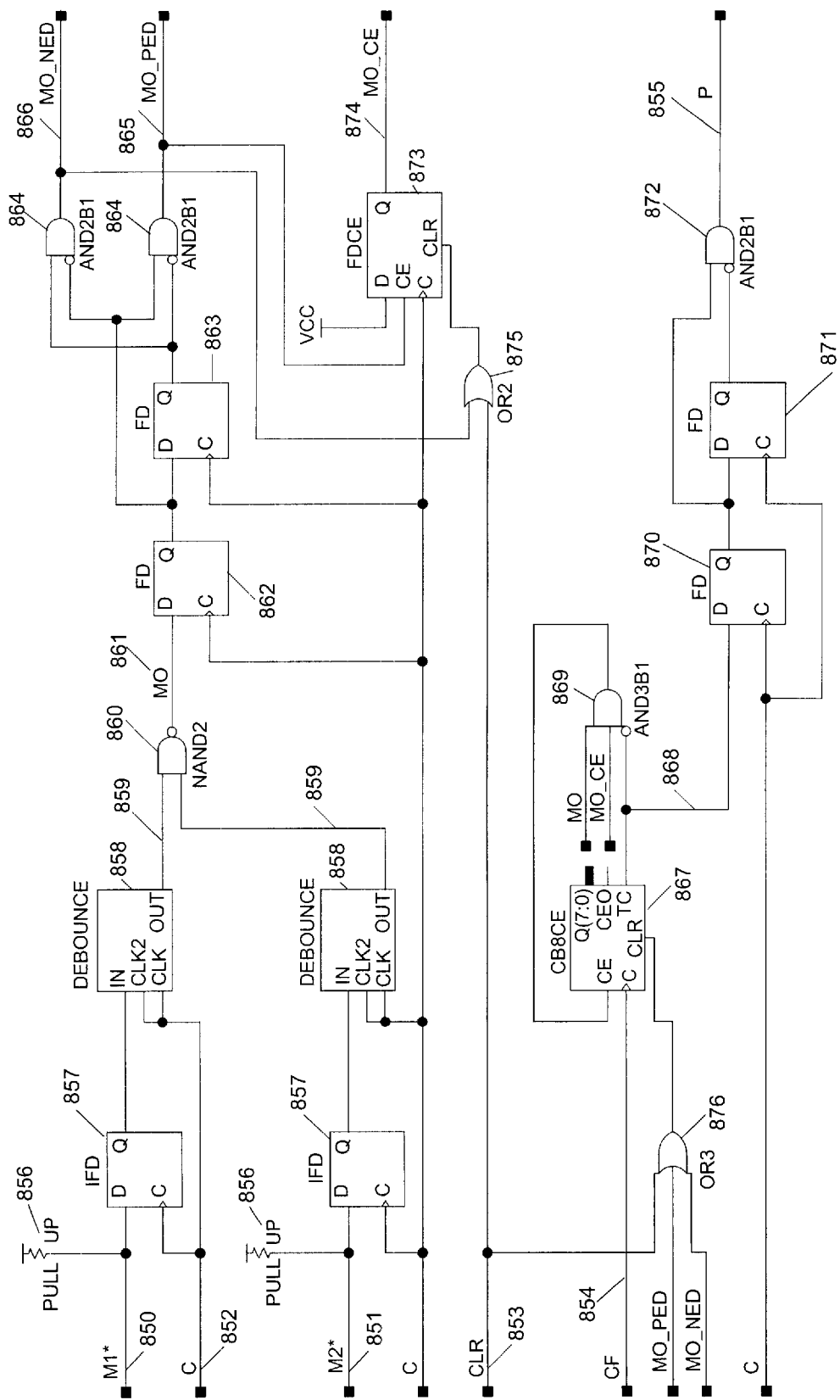
FIG. 9 illustrates the INPUTMO FPGA subsection schematic of the preferred embodiment.

FIG. 9 illustrates the INPUTMO subsection of the FPGA digital logic. This subsection monitors the incoming motors-on button signals and clear (inhibit) signal and generates a one C clock period pulse needed in order to start the emergency-stop circuit. The inputs to the circuit are the M1* 850, M2* 851, C 852, CLR 853, and CF 854, and the output is the pulse P 855.

Each of the incoming motors-on button signals M1*, M2* is connected to a pull-up resistor 856, is synchronized to C by an IFD flip-flop 857, and is subsequently filtered by a DEBOUNCE circuit 858. The two output signals 859 of the DEBOUNCE circuits are combined by a NAND2 gate to create an active-high MO signal 861 that goes high whenever either of the motors-on buttons is pressed.

The FD flip-flops 862, 863 and the two AND2B1 gates 864 are used to generate a positive-edge detected pulse MO__PED 865 and a negative-edge detected pulse MO__NED 866. The MO__PED pulse starts the period when the momentary motors-on button is pushed, and the MO__NED pulse ends this period. It is this period that will be timed in order to confirm that the button has been pushed for a specified time.

The eight-bit counter 867 is used to time the period between positive and negative edges of the MO signal counts based on the input clock CF. (For the design, CF is a 2 MHz/4096 signal which when counting to 255 equates to a 0.5 second period.) When the terminal count of 255 is reached, the terminal count signal 868 goes high and disables the counter by way of the AND3B1 gate 869. It is the rising edge of this terminal count signal that is captured by a positive-edge detection circuit consisting of the FD flip-flops 870, 871, the AND2B1 gate 872, and the output pulse P 855.

The enabling of the eight-bit counter commences with the MO signal becoming active, and this generates the MO__PED signal that enables the clock of the FDCE flip-flop 873, which in turn activates the MO CE signal 874. The MO__PED pulse, having cleared the counter, forces the terminal count signal 868 low, and this coupled with the current states of MO and MO__CE enables counting by way of the output signal of the AND3B1 869.

The MO__CE signal is set low whenever a MO__NED pulse occurs or the CLR 853 input is activated. The CLR input also clears the counter and disables counting. The CLR input therefore acts as an inhibit, preventing pushed motors-on buttons from generating the output pulse P.

Straightforward changes may be made to FIG. 9 to incorporate additional functionality such as using a monitor contact (a Type MC input) and to provide programmability for it. If used, a monitor contact must be active before the output pulse of the INPUTMO subsection can be generated. This can be done in a manner similar to that shown for the other subsections possessing programmability. For example, a Type MC input signal (e.g. MC*) could be filtered, inverted and using an OR2B1 gate could be combined with an associated programming signal (USEMC) to create another signal that when inactive would inhibit the deactivating edge of the CLR 853 signal from propagating to the OR2 875 and OR3 876 gates shown in the figure, thereby prohibiting the circuit from energizing. Additional programmability may also be incorporated within the design to provide a choice as to whether the inactive-to-active transition on the motors-on signal is required, and when not required, the motors-on signal could be tied active to emulate an automatic re-energizing function. Specifically, this can be done by incorporating another programming signal (e.g. USE_MO_PED) together with a second additional OR2B1 gate driven by the MO_PED and USE_MO_PED signals. The output of the second OR2B1 gate would then be used to drive the clock enable signal of the FDCE 873. Neither of these changes affects the minimum active time requirement for the motors-on signal, however.

The INPUTGO subsection of the FPGA digital logic section employs filtering that is the same as that shown in other sections, and therefore the subsection is not illustrated here. The design for it incorporates a pull-up resistor, an IFD flip-flop, a DEBOUNCE circuit, and an inverter to generate active-high G and active-low G* signals in response to an active-low I* input signal.

Figure 10:
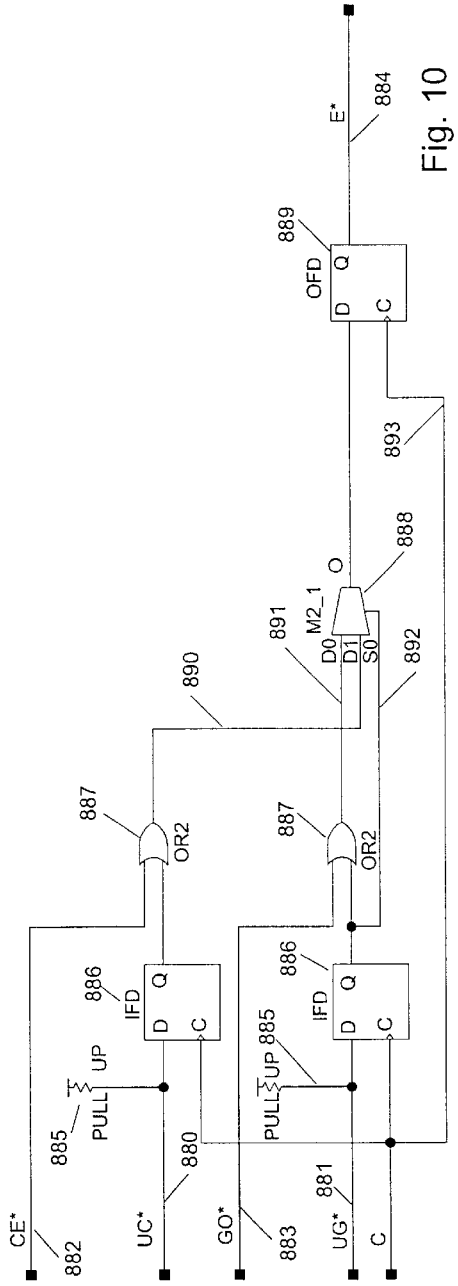
FIG. 10 illustrates the ENABLE FPGA subsection schematic of the preferred embodiment.

FIG. 10 illustrates the ENABLE subsection of the FPGA digital logic section, which controls the E* signal, secondary output. The inputs to the subsection are the UC* 880, UG* 881, CE* 882, GO* 883, and C 893 signals, and the output is the E* 884 signal. Note that the local CE* signal shown here is equivalent to the CE2* signal in FIG. 4.

The two configuration signals, UC* and UG*, are each connected to a pull-up resistor 885, an input flip-flop IFD 886, and subsequently to the lower input of an OR2 gate 887. Whenever one of the configuration signals is active (low), the respective value of CE* or GO* controls the output 890 or 891 of the OR2 gates. Which OR2 gate value, 890 or 891, that propagates to E* is specified by the two-input multiplexor M2_1 888, which is controlled by the buffered UG* signal 892. When this signal is low, the upper signal 891 propagates to E* 884. Alternatively, when the control signal is high, then 890 propagates through. The output of the multiplexor goes through the output OFD flip-flop 889, which is clocked by local clock C 893.

It is useful to note what happens when both configuration signals are inactive. In this case, both OR2 output signals are high 890, 891, and based on the multiplexor, the 890 signal propagates through to make the E* signal high (inactive) as well. This has the effect of disabling the attached machinery.

Figure 11:
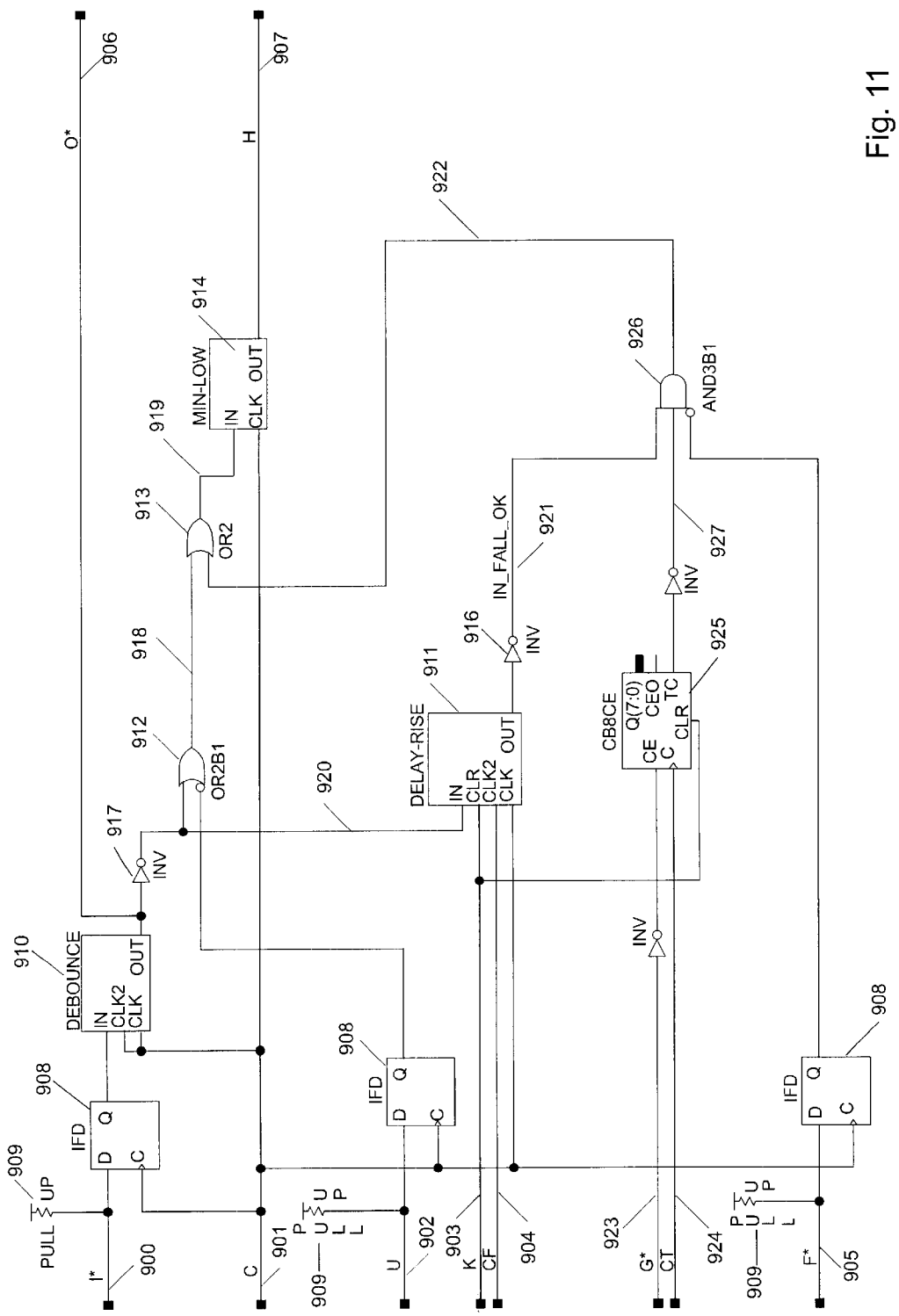
FIG. 11 illustrates the INPUTATO FPGA subsection schematic of the preferred embodiment.

FIG. 11 shows the INPUTATO subsection. In certain situations, it is desirable that the freshly energized circuit be killed when a certain falling-type kill input does not go active within a programmed interval. To accommodate this, an INPUTATO subsection has been designed based on the INPUTA subsection of the FPGA logic. It is the INPUTA subsection, modified to accept additional input signals G* 923 and CT 924. The designations for the other inputs and outputs are preserved in the extension of INPUTA to INPUTATO: the inputs are I* 900, U 902, F* 905, C 901, K 903, and CF 904. The outputs of the section are the H 907 signal and the O* 906 signal. (See FIG. 11.)

When analyzing the implications of this modification, one must consider that U 902 and F* 905 are both active and that the lower branch of the circuit contributes to health whenever I* 900 is not yet active. Similar to the manner in which the INPUTA subsection operates, the IN_FALL_OK 921 signal activates in response to an active K 903 signal (equates to KILL in FIG. 4), and the IN_FALL_OK signal is an input to the AND3B1 gate 926, which has replaced the AND2B1 gate 715 of the INPUTA subsection. It is the middle input 927 to AND3B1 gate that controls the timeout feature of the new subsection.

The middle input 927 of the AND3B1 gate becomes asserted whenever the K signal is asserted, because the middle input is the inverted output of the terminal count signal of the eight-bit counter 925, and the K signal clears that counter. If the signal is asserted together with the asserted IN_FALL_OK and active F*, then the internal health signal 922 (output of the AND3B1 gate) is active, and this in turn propagates to provide an asserted H health signal.

In order to implement the timeout feature, consider that the eight-bit timer begins counting when G* becomes active, which occurs when the circuit becomes energized. Now, after 255 CT clock periods, the internal health signal 927 deactivates. The internal health signal 922 then deactivates, and in the case when the I* signal has not yet become active in the interim (i.e. the other internal health signal 918 remains inactive), this means that the output H 907 goes inactive, which subsequently kills the circuit. For the other case, when I* signal does become active in the interim, this means that the other internal health signal 918 takes over to ensure health, thereby making irrelevant the lowering of the other internal health signal 922.

This is how the timeout branch of the new circuit contributes to the health of the subsection. Note that the other branches inherent in the INPUTATO subsection remain in effect, namely the DEBOUNCE branch (signal 918) and the DELAY_RISE branch (signal 921). In other words, they also must contribute to health, and they could conceivably kill the circuit prior to the overrunning of the eight-bit timer. Specifically, the input signal I* could go active quickly after G* goes active, and then it could go inactive before the counter terminates. The functionality of this scenario is made possible because the IN_FALL_OK signal deactivates two CF clock periods after the inactive-to-active transition of the I* signal, and this subsequently deactivates the lower branch 922 of the subsection. This forces the health of the subsection to depend on the other internal health signal 918.

The current design requires that the timer be programmed within the FPGA logic in order for a given falling-type kill input to utilize the time-out feature. Specifically, when a given kill input is programmed to be a "falling-type", then the corresponding kill input is or is not a time-out version based on how the logic is programmed into the configuration data for the FPGA. This depends on whether the kill input is connected to a INPUTA or INPUTATO style subsection within the FPGA logic, e. g. where FIG. 4B has been modified to reflect the change. Furthermore, it is noted that the INPUTATO subsection behaves the same as an INPUTA subsection when the kill input is programmed to USE or IGNORE. Accordingly, an INPUTATO subsection in the current design possesses three configuration options: (a) USE, (b) IGNORE, or (c) FALL-TO.

In practice, a circuit would be programmed with the desired number of INPUTATO subsections in the FPGA logic (e.g. see FIG. 4B, which shows one). For example, of the eight numbered kill inputs (IN0, . . . , IN7), four of them could be INPUTATO. The flexibility of the FPGA does permit, however, that this configuration be changed which requires new configuration data. Also, the time-out interval can be specified and changed for each individual INPUTATO subsection.

It is certainly conceivable that an additional low-level programming option (e.g. extra jumper position) be employed and an additional input signal routed to the FPGA for each kill input. In this case, the FPGA could then permit one of four options for each kill input: (a) USE (b) IGNORE, (c) FALL, or (d) FALL-TO. This is an obvious addition to the above design and is not further discussed here.

Finally, given the described INPUTATO subsection and how it relates to the INPUTA subsection description, it is straightforward how to create an INPUTACTO subsection. The INPUTACTO is created from the INPUTAC subsection by adding a timeout feature in a similar way. It is also anticipated that in practice the INPUTACTO subsection is implemented in the same manner as the INPUTATO, i.e. programmed into the FPGA and directly associated with a given input.

Daisy-Chaining Emergency-Stop Circuits

Until now, one circuit has been described which consists of the circuit being described in conjunction with a motors-on button, an emergency-stop button, and an AC motor power relay as well as application specific kill switches. The purpose here is to analyze the inherent expandability that is present in the circuit's design. Here, it will be shown how two or more circuit boards can be connected together, in conjunction with a single motors-on button, one or more emergency-stop buttons, and one or more AC motor power relays.

Consider that the motors-on connection of board #2 is connected to a normally open secondary output of board #1 (configured for USE_GO*). Also consider that the same secondary output of board #1 is connected to a falling-type kill input on board #2. These signals permit board #1 to be the master of board #2, since board #1 commands board #2.

Next, consider that the waiting-for-motors-on lamp driver (WAITL+/−) of board #2 is connected to a kill input which is configured for USE on board #1. Further consider that the motors-on lamp driver (GOL+/−) of board #2 is connected to a falling-type kill input of board #1. This falling-type kill input should be of the time-out variety (e.g. a Type-ATO). These signals permit board #2 to be the slave of board #1, since board #2 reports its status to board #1.

The motors-on lamp driver feedback signal could conceivably be omitted with a reduction in confidence that all downstream connected boards have been energized within a programmed interval. Moreover, an addition or an alternative to using the motors-on lamp driver feedback signal is to route the AC Line Sense signals to board #1. In order to ensure that all boards are energized within a programmed interval, however, this requires a time-out feature employed within the FPGA logic for the AC input (i.e. an INPUTACTO subsection). Substituting such a configured AC Line Sense for the motors-on lamp driver feedback signal not only provides the assurance that all boards energize within a programmed interval, but it also frees up the second kill input on board #1.

Finally, actual lamps and motors-on button are connected to board #1, and the AC motor power relay is connected to the primary output (RELAY+/−) of board #2. Emergency-stop buttons can be connected to either or both boards.

When the kill inputs connected to board #2 are consistent with their respective configurations, then the board is "healthy", and the waiting-for-motors-on lamp driver for board #2 conducts. ("Healthy" means the board is in a WAITING state where the inputs that are configured for USE are active and the Computer Ready signal has been recycled if it is configured for USE.) The board #1 requires this, since it used as a kill input configured for USE on board #1. Now, when board #1 is healthy and both boards are in the WAITING state, then pressing of the motors-on button on board #1 energizes board #1, which in turn activates its secondary outputs. Recall that one of these outputs is used to drive the motors-on input on board #2, which in turn energizes board #2 and subsequently the attached AC motor power relay. Next, the two falling-type kill inputs, one on each board (see above), recognize their respective inactive-to-active transitions, and they are now poised to kill the circuits.

Now that both boards are energized in theory, let us examine scenarios existing that kill the boards. Obviously, when one board is killed, it is desirable that the other board is also killed, and this is guaranteed to be the case. Recall that the secondary output of board #1 used to energize board #2 is also connected to a falling-type kill input of board #2. After the signal goes active to energize board #2 (motors-on), it can go inactive to kill board #2 (falling-type kill input). Therefore, whenever board #1 is killed as a result of an incompatibility of kill inputs with kill input configuration, then board #2 will also be killed as a result of the connections.

The case of board #2 being killed first will now be examined. This is when board #2 is killed as a result of an incompatibility of its kill inputs with its kill input configuration. Now, when board #2 is killed, it deactivates its waiting-for-motors-on and motors-on lamp driver, which both had been active. Recall that these signals are connected to used-type and falling-type board #1 kill inputs, respectively. The deactivation of (either of) these signals therefore kills board #1.

Having established the connection topology of two circuit boards, adding additional circuit boards is straightforward and results in an overall system with the same desirable behavior. Specifically, this means that all boards need to be healthy prior to motors-on and that when motors-on occurs for the first board, the other boards are subsequently energized one at a time. Also, it means that when one of the boards possesses a faulty kill input and is thereby killed, then the other boards are subsequently killed as a result. Here, the $1^{st}$ board in the chain possesses the motors-on button and the last board in the chain possesses the AC motor power relay.

As an example, consider adding board #3, so that board #2 is the master of it. In this case, a secondary output of board #2 is connected to board #3 in the same way that the secondary output of board #1 is connected to board #2. The daisy chaining of secondary outputs provides a vehicle for an upstream board to both energize and kill its downstream neighbor, and energizing therefore begins with the $1^{st}$ board and propagates one board at a time until the last board in the chain is energized.

The waiting-for-motors-on lamp drivers for the boards also need to be daisy chained. One of the contacts of the driver for the distal most board (#3) should be powered, while the other proceeds to the positive contact for the waiting-for-motors-on lamp driver of its upstream neighboring board (#2). The negative contact then proceeds to the positive contact of the waiting-for-motors-on lamp driver of the next upstream neighbor, and so on, until the $1^{st}$ board is reached at which point the signal is instead connected to the positive contact of the used-type kill input. The negative contact for the kill input is grounded so that the input is active when all downstream boards are healthy (each of their respective waiting-for-motors-on lamp drivers conducts). When the $1^{st}$ board becomes healthy, the motors-on button can be used to energize the $1^{st}$ board and subsequently all downstream boards via the secondary output daisy chain.

The motors-on lamp driver, on the other hand, is not daisy chained. Instead, it is connected from the most distal board (#3) directly to the falling-type kill input of the $1^{st}$ board. This kill input needs to be of the time-out variety to ensure that all boards become energized within a programmed interval.

De-energizing of the boards likewise occurs sequentially but propagates in general from two boards: the $1^{st}$ board in the chain and another board that possesses an offending kill input. Once all boards are energized, an incompatibility on any given board between its kill inputs and its kill input configuration causes that particular board to de-energize. The neighboring downstream boards sequentially de-energize one at a time due to the propagation of deactivating secondary outputs. Simultaneously, the waiting-for-motors-on lamp driver deactivates. This breaks the circuit feeding the used-type kill input of the $1^{st}$ board in the chain and therefore kills it. Subsequently, the $2^{nd}$ board in the chain and its downstream neighbors de-energize one board at a time likewise due to the propagation of deactivating secondary outputs. Boards continue to de-energize based on the two propagating threads of deactivating secondary outputs until all boards are dead.

Daisy chaining the circuit boards in this way provides a means to design a safe emergency-stop circuit for a very large and distributed assembly line consisting of a plurality of independent machines.

Connector Pin-outs and Error Codes for Preferred Design

Tables 7–13 comprise the pin-outs for the connectors of the preferred design, and Table 14 lists the error codes for the preferred design.

TABLE 7

Pin-out of Connector P1 (Main Power).

| Pin # | Description | Notes |
|---|---|---|
| 1 | VCC (logic power) | 5VDC logic power for emergency-stop circuit logic. |
| 2 | GND (logic ground) | |

TABLE 8

Pin-out of Connector P2 (Kill Inputs, Motors On, and Computer Interface).

| Pin # | Description | Notes |
|---|---|---|
| 1 | Input #0 (+) | 4-25 VDC isolated inputs |
| 2 | Input #0 (−) | " |
| 3 | Input #1 (+) | " |
| 4 | Input #1 (−) | " |
| 5 | Input #2 (+) | " |
| 6 | Input #2 (−) | " |
| 7 | Input #3 (+) | " |
| 8 | Input #3 (−) | " |
| 9 | Input #4 (+) | " |

TABLE 8-continued

Pin-out of Connector P2 (Kill Inputs, Motors On, and Computer Interface).

| Pin # | Description | Notes |
|---|---|---|
| 10 | Input #4 (−) | " |
| 11 | Input #5 (+) | " |
| 12 | Input #5 (−) | " |
| 13 | Input #6 (+) | " |
| 14 | Input #6 (−) | " |
| 15 | Input #7 (+) | " |
| 16 | Input #7 (−) | " |
| 17 | Secondary DC Supply (+15 VDC) | Use depends on 3PDT switch position |
| 18 | Secondary DC COM | " |
| 19 | Secondary DC Supply (−15 VDC) | " |
| 20 | Computer VCC (CVCC) | Reference power supply from computer (input, typ. 5VDC) |
| 21 | Computer Error Code Bit 0 | Error status bits |
| 22 | Computer Error Code Bit 1 | " |
| 23 | Computer Error Code Bit 2 | " |
| 24 | Computer Error Code Bit 3 | " |
| 25 | Computer Go (CGO*) | Primary Output of e-stop circuit |
| 26 | Computer Waiting-for-Motors-On (CWAIT*) | Primary Output of e-stop circuit |
| 27 | Computer GND (CGND) | Reference ground from computer (input) |
| 28 | Computer Ready (CRDY*) | Input that must be recycled (inactive-then-back-active) when emergency-stop circuit is killed so that computer acknowledges the killed circuit. |
| 29 | Computer Watchdog (CWD*) | Strobing input signal from computer whenever the computer is properly executing software. |
| 30 | Computer Enable (CE*) | Input from computer that is an extra kill signal or a signal that is to be fed through to enable/inhibit secondary outputs. |
| 31 | E-Stop, external (+) | 4-25 VDC isolated e-stop input |
| 32 | E-Stop, external (−) | " |
| 33 | Motors-On, external (+) | 4-25 VDC isolated motors-on input |
| 34 | Motors-On, external (−) | " |

TABLE 9

Pin-out of Connector P3 (Drivers).

| Pin # | Description | Notes |
|---|---|---|
| 1 | Enable #0 (+) | Secondary Output (isolated, normally open) |
| 2 | Enable #0 (−) | Secondary Output (isolated, normally open) |
| 3 | Enable #1 (+) | Secondary Output (isolated, normally open) |
| 4 | Enable #1 (−) | Secondary Output (isolated, normally open) |
| 5 | Enable #2 (+) | Secondary Output (isolated, normally open) |
| 6 | Enable #2 (−) | Secondary Output (isolated, normally open) |
| 7 | Enable #3 (+) | Secondary Output (isolated, normally open) |
| 8 | Enable #3 (−) | Secondary Output (isolated, normally open) |

TABLE 9-continued

Pin-out of Connector P3 (Drivers).

| Pin # | Description | Notes |
|---|---|---|
| 9 | Inhibit #4 (+) | Secondary Output (isolated, normally closed) |
| 10 | Inhibit #4 (−) | Secondary Output (isolated, normally closed) |
| 11 | Inhibit #5 (+) | Secondary Output (isolated, normally closed) |
| 12 | Inhibit #5 (−) | Secondary Output (isolated, normally closed) |
| 13 | Inhibit #6 (+) | Secondary Output (isolated, normally closed) |
| 14 | Inhibit #6 (−) | Secondary Output (isolated, normally closed) |
| 15 | Inhibit #7 (+) | Secondary Output (isolated, normally closed) |
| 16 | Inhibit #7 (−) | Secondary Output (isolated, normally closed) |
| 17 | Speaker, external (+) | Primary Output status (non-isolated) |
| 18 | Speaker, external (−) | " |
| 19 | Motors-On Lamp (+) | Primary Output status (isolated) |
| 20 | Motors-On Lamp (−) | " |
| 21 | Waiting-for-Motors-On Lamp (+) | " |
| 22 | Waiting-for-Motors-On Lamp (−) | " |
| 23 | Reserved | Reserved |
| 24 | Reserved | " |
| 25 | Reserved | " |
| 26 | Reserved | " |

TABLE 10

Pin-out of Connector P4 (Local Functions).

| Pin # | Description | Notes |
|---|---|---|
| 1 | Motors-On, internal (MOI*) | Non-isolated motors-on input |
| 2 | E-Stop, internal (ESTOPI*) | Non-isolated e-stop input |
| 3 | GND (logic ground) | Reference for above signals |
| 4 | WAITL+ | Waiting-for-Motors-On Lamp (+) |
| 5 | GOL+ | Motors-On Lamp (+) |
| 6 | WAITL− | Waiting-for-Motors-On Lamp (−) |
| 7 | GOL− | Motors-On Lamp (−) |
| 8 | Secondary DC Supply (+15 VDC) | Use depends on 3PDT switch position |
| 9 | Secondary DC COM | Use depends on 3PDT switch position |
| 10 | Secondary DC Supply (−15 VDC) | Use depends on 3PDT switch position |

TABLE 11

Pin-out of Connector P5 (AC Line Sense).

| Pin # | Description | Notes |
|---|---|---|
| 1 | AC Input (+) | Isolated input from contacts of AC Motor Power Relay |
| 2 | NC | No connection |
| 3 | AC Input (−) | Isolated input from contacts of AC Motor Power Relay |

TABLE 12

Pin-out of Connector P6 (AC Motor Power Relay Coil Driver).

| Pin # | Description | Notes |
|---|---|---|
| 1 | RELAY+ | AC Motor Power Relay Coil Driver (+) |
| 2 | NC | No connection |
| 3 | NC | No connection |
| 4 | RELAY− | AC Motor Power Relay Coil Driver (−) |

TABLE 13

Pin-out of Connector P7 (Optional Xilinx Configuration Port).

| Pin # | Description | Notes |
|---|---|---|
| 1 | Logic Power | VCC |
| 2 | Logic Power Ground | GND |
| 3 | Xilinx Configuration Clock | CCLK |
| 4 | Xilinx Configuration Data | DIN |
| 5 | Xilinx Initialization Signal | INIT* |
| 6 | Xilinx Done Signal | DONE |
| 7 | Xilinx Program Signal | PROG* |

TABLE 14

Error Codes for the Preferred Design

| Error Code | Description | Display Priority |
|---|---|---|
| 0 | No Error (circuit waiting or hot) | N/A |
| 1 | Input #0 fault | $2^{nd}$ Priority |
| 2 | Input #1 fault | $3^{rd}$ |
| 3 | Input #2 fault | $4^{th}$ |
| 4 | Input #3 fault | $5^{th}$ |
| 5 | Input #4 fault | $6^{th}$ |
| 6 | Input #5 fault | $7^{th}$ |
| 7 | Input #6 fault | $8^{th}$ |
| 8 | Input #7 fault | $9^{th}$ |
| 9 | Computer Enable fault | $10^{th}$ |
| 10 | Computer Ready fault | $11^{th}$ |
| 11 | Secondary Power Supply fault | $12^{th}$ |
| 12 | Computer Watchdog fault | $13^{th}$ |
| 13 | AC Input fault | $14^{th}$ |
| 14 | ESTOP Button fault | Lowest, $15^{th}$ |
| 15 | Logic Power Supply fault (power-up/reset) | Highest, $1^{st}$ |

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. An electronic control system for controlling the flow of bulk power to a plurality of loads through at least one switch having a first and second position to start and stop the flow of bulk power, respectively, comprising:

a) an emergency-stop circuit for receiving a plurality of input signals from a plurality of input sources and for providing a primary output signal to control said switch, wherein said first and second position of said switch are responsive to said emergency-stop circuit being energized or de-energized, respectively;

b) a means for determining whether or not a first energizing cycle has occurred since application of power to logic of said emergency-stop circuit, and, c) a means to drive a dedicated error code whenever said first energizing cycle has not yet occurred, said dedicated error code superseding any other error code generated from any of said plurality of input sources.

2. The electronic control system of claim 1, further comprising;
  a) at least one clear-type input (CLEAR) signal selected from said plurality of input signals, said CLEAR signal having an active and inactive state; and
  b) a means to clear said dedicated error code whenever said CLEAR signal becomes active prior to said first energizing cycle to reveal said superseded error code, and wherein said means to clear said dedicated error code also refreshes said superseded error code whenever said CLEAR signal thereafter becomes active.

3. An electronic control system for controlling the flow of bulk power to a plurality of loads through at least one switch having a first and second position to start and stop the flow of bulk power, respectively, comprising:
  a) an emergency-stop circuit for receiving a plurality of input signals from a plurality of input sources and for providing a primary output signal to control said switch, wherein said first and second position of said switch are responsive to said emergency-stop circuit being energized or de-energized, respectively;
  b) at least one internal ready-type start (RS) signal, said RS signal having an active and inactive state;
  c) a means to activate said RS signal in response to a final cycle or a surplus cycle of a selectively programmable first number of deactivation and reactivation cycles of a corresponding ready-type input (RI) signal that is selected from said plurality of input signals, said RI signal having an active and inactive state;
  d) a means to deactivate said RS signal in response to the deactivating of said corresponding RI signal or whenever said emergency-stop circuit is energized, wherein said means to deactivate said RS signal also resets the accumulated count of said deactivation and reactivation cycles whenever said emergency-stop circuit is energized;
  e) a means to optionally utilize said RS signal to inhibit said emergency-stop circuit from energizing whenever said RS signal is inactive; and
  f) a means to optionally utilize said RI signal to de-energize said emergency-stop circuit in response to the deactivating of said RI signal.

4. The electronic control system of claim 3, further comprising a means for determining when a first energizing cycle has not yet occurred since application of power to logic of said emergency-stop circuit, said means for determining when a first energizing cycle has not yet occurred initializing said RS signal in the inactive state, resetting for the first energizing cycle the accumulated count of said deactivation and reactivation cycles, and altering for the first energizing cycle the requirement of said first number of deactivation and reactivation cycles of said RI signal to a selectively programmable second number, said second number being greater than said first.

5. An electronic control system for controlling the flow of bulk power to a plurality of loads through at least one switch having a first and second position to start and stop the flow of bulk power, respectively, comprising:
  a) an emergency-stop circuit for receiving a plurality of input signals from a plurality of input sources and for providing a primary output signal to control said switch, wherein said first and second position of said switch are responsive to said emergency-stop circuit being energized or de-energized, respectively, wherein said emergency-stop circuit is de-energized and waiting to energize; and wherein at least one motors-on-type input (MO) signal is selected from said plurality of input signals, said MO signal having an active and inactive state;
  b) a means for energizing said emergency-stop circuit only when said MO signal is active and remains active for at least a predetermined interval of time;
  c) at least one monitor-contact-type input (MC) signal selected from said plurality of input signals, said MC signal having an active and inactive state, wherein said MC signal is active only when said emergency-stop circuit is de-energized and a monitored downstream relay controlled by said primary output signal has fully disengaged; and,
  d) a means to optionally utilize said MC signal to inhibit said emergency-stop circuit from energizing whenever said MC signal is otherwise inactive.

6. The electronic control system of claim 5, wherein said means for energizing said emergency-stop circuit includes a selectively programmed condition of said MO signal being initially inactive.

7. The electronic control system of claim 5, wherein said predetermined interval of time is selectively programmable.

8. The electronic control system of claim 5, wherein said switch is an electromagnetic relay.

9. An electronic control system for controlling the flow of bulk power to a plurality of loads through at least one switch having a first and second position to start and stop the flow of bulk power, respectively, comprising;
  a) an emergency-stop circuit for receiving a plurality of input signals from a plurality of input sources and for providing a primary output signal to control said switch, wherein said first and second position of said switch are responsive to said emergency-stop circuit being energized or de-energized, respectively;
  b) a means for determining whether or not a first energizing cycle has occurred since application of power to logic of said emergency-stop circuit;
  c) at least one internal start-type (START) signal, said START signal having an active and inactive state, wherein said means for determining whether or not a first energizing cycle has occurred also initializes said START signal in an inactive state;
  d) a corresponding plurality of kill-type input (B) signals, each said B signal being selected from said plurality of input signals, and each said B signal having an active and inactive state responsive to an associated input source being in a safe or healthy condition or not, respectively;
  e) a means to generate a delay for at least a selected interval of time, wherein said means to generate a delay is activated immediately following de-energizing of said emergency-stop circuit therefore creating a dying period for said emergency-stop circuit, and wherein said means for determining whether or not a first energizing cycle has occurred also activates said means to generate a delay for the first energizing cycle therefore creating a power-up-delay period for said emergency-stop circuit;
  f) a means to activate said START signal (1) whenever said power-up-delay period has passed prior to first energizing cycle or alternatively whenever said emergency-stop circuit has de-energized and said dying period has passed and (2) when all said B signals are active;
  g) a means to deactivate said START signal (1) whenever said emergency-stop circuit is energized or (2) at least one B signal is inactive; and h) a means to inhibit said emergency-stop circuit from energizing whenever said START signal is inactive.

10. The electronic control system of claim 9 wherein at least one of said B signals is a watchdog-type kill input (WD) signal, having an active and inactive state, wherein said WD signal is active only when its rate of toggling exceeds a predetermined value.

11. The electronic control system of claim 10, wherein said predetermined value is selectively programmable.

12. The electronic control system of claim 9, wherein said means to activate said START signal and said means to deactivate said START signal also utilizes like a B signal at least one internal health-type (OK) signal representing internal circuit health, wherein said OK signal is active or inactive responsive to the existence of no errors or errors, respectively.

13. An electronic control system for controlling the flow of bulk power to a plurality of loads through at least one switch having a first and second position to start and stop the flow of bulk power, respectively, comprising:
   a) an emergency-stop circuit for receiving a plurality of input signals from a plurality of input sources and for providing a primary output signal to control said switch, wherein said first and second position of said switch are responsive to said emergency-stop circuit being energized or de-energized, respectively;
   b) at least one internal kill-type (KILL) signal, said KILL signal having an active and inactive state;
   c) a corresponding plurality of kill-type input (B) signals, each said B signal being selected from said plurality of input signals, and each said B signal having an active and inactive state responsive to an associated first input source being in a safe or healthy condition or not, respectively;
   d) a means to de-energize and keep de-energized said emergency-stop circuit whenever said KILL signal is active;
   e) a means to generate said KILL signal by activating said KILL signal whenever at least one said B signal is inactive and de-activating said KILL signal whenever all said B signals become active.

14. The electronic control system of claim 13, wherein at least one of said B signals is a watchdog-type kill input (WD) signal, having an active and inactive state, wherein said WD signal is active only when its rate of toggling exceeds a predetermined value.

15. The electronic control system of claim 14, wherein said predetermined value is selectively programmable.

16. The electronic control system of claim 13, wherein said means to generate said KILL signal also utilizes like a B signal at least one internal health-type (OK) signal representing internal circuit health, wherein said OK signal is active or inactive responsive to the existence of no errors or errors, respectively.

17. The electronic control system of claim 13, further comprising:
   a) at least one kill-type input (A) signal, said A signal being selected from said plurality of input signals, and said A signal having an active and inactive state responsive to an associated second input source being in a safe or healthy condition or not, respectively;
   b) a means for dynamically adding said A signal upon or after energizing said emergency-stop circuit and dynamically removing it upon or after de-energizing, wherein said means to generate said KILL signal also utilizes like a B signal said A signal during the period it is added.

18. The electronic control system of claim 17, wherein said A signal is added upon its transition from inactive to active.

19. The electronic control system of claim 18, wherein said A signal is associated with a dedicated input source for sensing the presence of said bulk power.

20. The electronic control system of claim 19, wherein said dedicated input source generates an alternating-type (AC) signal for said A signal, wherein said AC signal is active only when it strobes at a rate faster than a predetermined value.

21. The electronic control system of claim 20, wherein said predetermined value is selectively programmable.

22. The electronic control system of claim 17 wherein said A signal is added either upon its transition from inactive to active or after a predetermined interval of time following energizing of said circuit, whichever comes first; wherein said means to de-energize and keep de-energized said emergency-stop circuit and said means to generate said KILL signal immediately de-energizes said emergency-stop circuit in the event that said A signal is inactive at the moment it is added.

23. The electronic control system of claim 22, wherein said predetermined interval of time is selectively programmable.

24. The electronic control system of claim 22, wherein said A signal is associated with a dedicated input source for sensing the presence of said bulk power.

25. The electronic control system of claim 24, wherein said dedicated input source generates an alternating-type (AC) signal for said A signal, wherein said AC signal is active only when it strobes at a rate faster than a predetermined value.

26. The electronic control system of claim 25, wherein said predetermined value is selectively programmable.

27. An electronic control system for controlling the flow of bulk power to a plurality of loads through at least one switch having a first and second position to start and stop the flow of bulk power, respectively, comprising:
   a) an emergency-stop circuit for receiving a plurality of input signals from a plurality of input sources and for providing a primary output signal to control said switch, wherein said first and second position of said switch are responsive to said emergency-stop circuit being energized or de-energized, respectively; wherein said emergency-stop circuit also provides at least one secondary output channel comprising a secondary output (SO) signal, being connected to at least one external device, wherein said external device is enabled or inhibited responsive to said SO signal being active or inactive, respectively;
   b) at least one enable-type input (CE) signal, said CE signal being selected from said plurality of input signals, and said CE signal having an active and inactive state responsive to an associated first input source desiring said external device to be enabled or inhibited, respectively;
   c) means to generate said SO signal by (1) driving said SO signal inactive continuously when corresponding said secondary output channel is selectively programmed to be continuously inhibited, (2) driving said SO signal inactive whenever said emergency-stop circuit is de-energized and corresponding said secondary output channel is alternatively selectively programmed to be inhibited whenever said emergency-stop circuit is de-energized, (3) driving said SO signal inactive whenever said CE signal is inactive and corresponding said secondary output channel is alternatively selectively programmed to be inhibited whenever said CE signal is inactive, and (4) otherwise driving said SO signal active.

28. The electronic control system of claim 27, further comprising a means to inhibit said emergency-stop circuit from energizing for at least a selected interval of time, wherein said means to inhibit said emergency-stop circuit from energizing is activated immediately following de-energizing of said emergency-stop circuit therefore creating a dying period; wherein said means to generate said SO signal further drives said SO signal inactive when (1) said secondary output channel is selectively programmed to be inhibited whenever said CE signal is inactive, (2) said secondary output channel is further selectively programmed to be inhibited whenever said emergency-stop circuit is de-energized and said dying period has passed, and (3) either said CE signal is inactive or said emergency-stop circuit is de-energized and said dying period has passed.

29. The electronic control system of claim 27, further comprising at least one watchdog-type input (WD) signal, said WD signal being selected from said plurality of input signals, and said WD signal having an active and inactive state responsive to a corresponding second input source verifying that said first input source is operating properly or not, respectively, said WD signal toggling at a rate faster than a selected value being the condition that said WD signal is active; wherein said means to generate said SO signal further drives said SO signal inactive when (1) said secondary output channel is selectively programmed to be inhibited whenever said CE signal is inactive, (2) said secondary output channel is further selectively programmed to be inhibited whenever said WD signal is inactive, and (3) either said CE signal is inactive or said WD signal is inactive.

30. An electronic control system for controlling the flow of bulk power to a plurality of loads through at least one switch having a first and second position to start and stop the flow of bulk power, respectively, comprising:

a) an emergency-stop circuit for receiving a plurality of input signals from a plurality of input sources and for providing a primary output signal to control said switch, wherein said first and second position of said switch are responsive to said emergency-stop circuit being energized or de-energized, respectively;

b) a means for determining whether or not a first energizing cycle has occurred since application of power to logic of said emergency-stop circuit;

c) a means to drive a dedicated error code whenever said first energizing cycle has not yet occurred, said dedicated error code superseding any other error code generated from any of said plurality of input sources;

d) a first number of clear-type input (CLEAR) signals selected from said plurality of input signals, each said CLEAR signal having an active and inactive state;

e) a means to clear said dedicated error code whenever said CLEAR signal becomes active prior to said first energizing cycle to reveal said superseded error code, and wherein said means to clear said dedicated error code also refreshes said superseded error code whenever said CLEAR signal thereafter becomes active;

f) a second number of internal ready-type start (RS) signals, each said RS signal having an active and inactive state, wherein said means for determining whether or not a first energizing cycle has occurred also initializes said RS signal in the inactive state;

g) a means to activate said RS signal in response to a final cycle or a surplus cycle of a third selected number of deactivation and reactivation cycles of a corresponding ready-type input (RI) signal that is selected from said plurality of input signals, said RI signal having an active and inactive state, wherein said means for determining whether or not a first energizing cycle has occurred also alters the requirement of said third number of deactivation and reactivation cycles of said RI signal to a fourth selected number to be required for first energizing cycle, said fourth number being greater than said third, wherein said means for determining whether or not a first energizing cycle has occurred also resets the accumulated count of said deactivation and reactivation cycles for the first energizing cycle;

h) a means to deactivate said RS signal in response to the deactivating of said corresponding RI signal or whenever said emergency-stop circuit is energized, wherein said means to deactivate said RS signal also resets the accumulated count of said deactivation and reactivation cycles whenever said emergency stop circuit is energized;

i) at least one motors-on-type input (MO) signal selected from said plurality of input signals, said MO signal having an active and inactive state;

j) at least one internal start-type (START) signal, said START signal having an active and inactive state, wherein said means for determining whether or not a first energizing cycle has occurred also initializes said START signal in an inactive state;

k) at least one internal kill-type (KILL) signal, said KILL signal having an active and inactive state, and a corresponding fifth number of kill-type input (B) signals, each said B signal being selected from said plurality of input signals, and each said B signal having an active and inactive state responsive to an associated first input source being in a safe or healthy condition or not, respectively;

l) a means to generate said KILL signal by activating said KILL signal whenever at least one said B signal is inactive and de-activating said KILL signal whenever all said B signals become active;

m) a means to generate a delay for at least a first selected interval of time, wherein said means to generate a delay is activated immediately following de-energizing of said emergency-stop circuit therefore creating a dying period for said emergency-stop circuit, and wherein said means for determining whether or not a first energizing cycle has occurred also activates said means to generate a delay for the first energizing cycle therefore creating a power-up-delay period for said emergency-stop circuit;

n) a means to activate said START signal (1) whenever said power-up-delay period has passed prior to first energizing cycle or alternatively whenever said emergency-stop circuit has de-energized and said dying period has passed, (2) whenever said KILL signal is inactive, and (3) whenever optionally utilized said RS signal is not used or is used and active;

o) a means to deactivate said START signal (1) whenever said emergency-stop circuit is energized, (2) whenever said KILL signal is active, or (3) whenever optionally utilized said RS signal is used and inactive;

p) a means to inhibit said emergency-stop circuit from energizing whenever said START signal is inactive;

q) a means to display a first status indicator in visual or audio form or in the form of an electrical output signal whenever said START signal is active to signify said emergency-stop circuit is waiting to energize and to display a second status indicator in visual or audio form or in the form of an electrical output signal whenever said emergency-stop circuit is energized, wherein said first status indicator remains further displayed whenever said second is displayed;

r) a means to energize said emergency-stop circuit when START signal is active and said MO signal is active and remains active for at least a second selected interval of time;

s) a means to de-energize said emergency-stop circuit whenever said KILL signal is active or whenever optionally utilized said RI signal is used and inactive; and t) wherein uncommitted input signals remaining from said plurality of input signals are ignored.

31. The electronic control system of claim 30, further comprising:

a) a sixth number of kill-type input (A) signals, each said A signal being selected from said uncommitted input signals, and each said A signal having an active and inactive state responsive to an associated second input source being in a safe or healthy condition or not, respectively;

b) a means for dynamically adding said A signal upon or after energizing said emergency-stop circuit and dynamically removing it upon or after de-energizing, wherein said means to generate said KILL signal also utilizes like a B signal said A signal during the period it is added; and c) wherein remaining uncommitted input signals from said uncommitted input signals are ignored.

32. The electronic control system of claim 31, further comprising:

a) a seventh number of monitor-contact-type input (MC) signals, each said MC signal being selected from said remaining uncommitted input signals, each said MC signal having an active and inactive state, and wherein each said MC signal is active only when the circuit is de-energized and a monitored downstream relay controlled by said primary output signal of the emergency stop circuit has fully disengaged;

b) a means to optionally utilize said MC signal to inhibit said emergency-stop circuit from energizing whenever said MC signal is inactive;

c) at least one secondary output channel providing a secondary output (SO) signal, being connected to at least one external device, wherein said external device is enabled or inhibited responsive to said SO signal being active or inactive, respectively;

d) an eighth number of enable-type input (CE) signals, each said CE signal being selected from said remaining uncommitted input signals, and each said CE signal having an active and inactive state responsive to an associated third input source desiring said external device to be enabled or inhibited, respectively;

e) a ninth number of watchdog-type input (WD) signals, each said WD signal being selected from said remaining uncommitted input signals, and each said WED signal having an active and inactive state responsive to a corresponding fourth input source verifying that said third input source is operating properly or not, respectively, said WD signal toggling at a rate faster than a selected value being the condition that said WD signal is active;

f) a means to generate said SO signal by (1) driving said SO signal inactive continuously whenever corresponding said secondary output channel is selectively programmed to be continuously inhibited, (2) driving said SO signal inactive whenever said emergency-stop circuit is de-energized and corresponding said secondary output channel is alternatively selectively programmed to be inhibited whenever said emergency-stop circuit is de-energized, (3) driving said SO signal inactive whenever said CE signal is inactive and corresponding said secondary output channel is alternatively selectively programmed to be inhibited whenever said CE signal is inactive, (4) driving said SO signal inactive whenever said secondary output channel is selectively programmed to be inhibited whenever said CE signal is inactive, said secondary output channel is further selectively programmed to be inhibited whenever said WD signal is inactive, and either said CE signal is inactive or said WD signal is inactive, and (5) otherwise driving said SO signal active;

g) wherein said means to generate said KILL signal optionally utilizes said WD signal as a B signal;

h) wherein said means to generate said KILL signal optionally utilizes said CE signal as a B signal; and i) wherein further remaining uncommitted input signals from said remaining uncommitted input signals are ignored.

33. The electronic control system of claim 32, further comprising:

a) a programming means to alter said first, second, fifth, sixth, seventh, eighth, and ninth numbers so that they are each greater than or equal to zero and redefine functionality of utilized and uncommitted said plurality of input signals so that each is either a CLEAR signal, an RI signal, an MO signal, a B signal, an A signal, an MC signal, a CE signal, a WD signal, or an uncommitted signal that is ignored;

b) a programming means to alter said third and fourth numbers, said first and second intervals of time, said selected value for rate of said WD signal, and programming of said secondary output channel; and c) a programming means to re-establish or omit utilization of said RS signal for said means to activate said START signal and said means to deactivate said START signal, of said RI signal for said means to de-energize said emergency-stop circuit, of said MC signal for said means to optionally utilize said MC signal to inhibit said emergency-stop circuit, of said WD signal for said means to generate said KILL signal, and of said CE signal for said means to generate said KILL signal.

34. The electronic control system of claim 30, further comprising:

a) a sixth number of monitor-contact-type input (MC) signals, each said MC signal being selected from said uncommitted input signals, each said MC signal having an active and inactive state, and wherein each said MC signal is active only when the circuit is de-energized and a monitored downstream relay controlled by said primary output signal of the emergency stop circuit has fully disengaged;

b) a means to optionally utilize said MC signal to inhibit said emergency-stop circuit from energizing whenever said MC signal is inactive; and c) wherein remaining uncommitted input signals from said uncommitted input signals are ignored.

35. The electronic control system of claim 30, further comprising:

a) at least one secondary output channel providing a secondary output (SO) signal, being connected to at least one external device, wherein said external device is enabled or inhibited responsive to said SO signal being active or inactive, respectively;

b) a sixth number of enable-type input (CE) signals, each said CE signal being selected from said uncommitted input signals, and each said CE signal having an active and inactive state responsive to an associated second input source desiring said external device to be enabled or inhibited, respectively;

c) a means to generate said SO signal by (1) driving said SO signal inactive continuously when corresponding said secondary output channel is selectively programmed to be continuously inhibited, (2) driving said SO signal inactive whenever said emergency-stop circuit is de-energized and corresponding said secondary output channel is alternatively selectively programmed to be inhibited whenever said emergency-stop circuit is de-energized, (3) driving said SO signal inactive whenever said CE signal is inactive and corresponding said secondary output channel is alternatively selectively programmed to be inhibited whenever said CE signal is inactive, and (4) otherwise driving said SO signal active; and d) wherein remaining uncommitted input signals from said uncommitted input signals are ignored.

36. A method for controlling the flow of bulk power to a plurality of loads through at least one switch having a first and second position to start and stop the flow of bulk power, respectively, comprising an emergency-stop circuit for receiving a plurality of input signals from a plurality of input sources and for providing a primary output signal to control said switch, wherein said first and second position of said switch are responsive to said emergency-stop circuit being energized or de-energized, respectively; comprising the steps:

(1) being in a power-up state for a selected first interval of time following application of power to logic of emergency-stop circuit, wherein said emergency-stop circuit is inhibited from energizing;

(2) being in a killed state, wherein said emergency-stop circuit is inhibited from energizing, and providing status for such including which if any input signal caused said emergency-stop circuit to de-energize or is preventing said emergency-stop circuit from energizing; and remaining in said killed state until (a) all of the said input signals that have been selected for use in said killed state are active, (b) said emergency-stop circuit does not have any internal errors, and (c) any ready-type input signals that have been selected for use have each been deactivated and reactivated a selected number of times, said selected number for first energizing cycle being greater than that for successive energizing cycles;

(3) being in a waiting state, wherein said emergency-stop circuit is ready to energize, and providing status for such; and remaining in said waiting state until a valid motors-on signal has been recognized at which time said method goes to step (4), or until one of the said input signals that has been selected for use in said killed state is inactive or said emergency-stop circuit finds an internal error at which time said method returns to step (2);

(4) going to an energized state, wherein said emergency-stop circuit becomes energized, and providing status for such;

dynamically adding a selected first number of selected input signals from said plurality of input signals as each becomes active, so that each remaining active becomes a condition for said emergency-stop circuit to remain energized;

dynamically adding a selected second number of selected input signals from said plurality of input signals as elected second interval of time elapses since said emergency-stop circuit energized, so that being active at time of addition and remaining active becomes a condition for said emergency-stop circuit to remain energized; and remaining in the energized state, wherein said emergency-stop circuit remains energized until said emergency-stop circuit finds an internal error, one of the said input signals that has been selected for use in said killed state is inactive, or one of the dynamically added input signals is inactive, wherein said dynamically added input signals are removed when said emergency-stop circuit de-energizes;

(5) being in a dying state for a selected third interval of time, where in the emergency-stop circuit is de-energized and inhibited from re-energizing, and providing status for such after which time said method returns to step (2).

37. The method of claim 36, further comprising in step (4) the task of dynamically adding a third number from said first or second number of said selected input signals to be dedicated to sensing the presence of said bulk power, so that the failure of building power de-energizes said emergency-stop circuit in the same way as the inactivation of any other utilized input signal; and including in steps (1), (2), (3), (4), and (5) the task controlling at least one secondary output signal connected to at least one external device for the purpose of enabling and inhibiting said external device, wherein the said external device is enabled or inhibited based on programming, the current step, and current values of said plurality of input signals, wherein specifically in step 5 certain external devices so programmed remain enabled so that they may continue or react in a controlled fashion by utilizing residual paid electronic control system as long as it remains.

* * * * *

UNITED STATES PATENT AND TRADEMARK OFFICE
CERTIFICATE OF CORRECTION

PATENT NO.   : 6,392,318 B1
DATED        : May 21, 2002
INVENTOR(S)  : Michael Griffis It is certified that error appears in the above-identified patent and that said Letters Patent is hereby corrected as shown below:

Column 2,
Line 34, change "It well established." to -- it is well established. --

Column 6,
Line 63, change "to provided" to -- to provide --.

Column 7,
Line 55, change "to emp e circuitry" to -- to employ solid-state circuitry --.

Column 11,
Line 13, change "PPGA" to -- FPGA --.
Last line, change "circuits" to -- circuit's --.

Column 20,
Lines 17 and 18, "controlled an industry" to -- controlled by an industry --.

Column 21,
Line 46, change "will discussed" to -- will be discussed --.

Column 24,
Line 24, change "rally address" to -- fully address --.
Line 65, (Table 2, line 13) delete "ON".

Column 25,
Line 7, change "his state" to -- this state --.

Column 28,
Line 17, change "KILL_QEQ" to -- -KILL_EQ --.

Column 36,
Line 19, change "START EQ" to -- START_EQ --.

Column 37,
Line 2, change "KILL EQ" to -- KILL_EQ --.

UNITED STATES PATENT AND TRADEMARK OFFICE
CERTIFICATE OF CORRECTION

PATENT NO. : 6,392,318 B1
DATED : May 21, 2002
INVENTOR(S) : Michael Griffis

It is certified that error appears in the above-identified patent and that said Letters Patent is hereby corrected as shown below:

Column 38,
Line 52, change "E2N" to -- E3N --.

Column 39,
Line 21, change "0 076" to -- 0* 706 --.
Lines 55-56, change "OR2B1 the make" to -- OR2B1 to make --.

Column 40,
Lines 17-18, change "IN FALL_OK" to -- IN_FALL_OK --.
Line 58, change "0 076" to -- 0* 706 --.

Column 42,
Line 2, change "feeds the an inverting" to -- feeds an inverting --.

Column 44,
Lines 14-15, change "generated from directly from" to -- generated directly from --.
Line 56, change "MO CE" to -- MO_CE --.

Column 59,
Line 59, change "WED" to -- WD --.

Column 62,
Line 17, change "as elected second" to -- as a selected second --.
Lines 50-51, change "residual paid electronic control system as long as it remains" to -- residual power within said electronic control system as long as it remains --.

Signed and Sealed this

Twenty-eighth Day of January, 2003

JAMES E. ROGAN
*Director of the United States Patent and Trademark Office*